(12) United States Patent
Yoo et al.

(10) Patent No.: US 11,069,957 B2
(45) Date of Patent: Jul. 20, 2021

(54) ELECTRONIC DEVICE INCLUDING ANTENNA MODULE

(71) Applicant: Samsung Electronics Co., Ltd., Suwon-si (KR)

(72) Inventors: Sungcheol Yoo, Suwon-si (KR); Chihwei Lee, Suwon-si (KR); Jungmin Park, Suwon-si (KR); Chonghwa Seo, Suwon-si (KR); Jongwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/924,863

(22) Filed: Jul. 9, 2020

(65) Prior Publication Data

US 2021/0013588 A1 Jan. 14, 2021

(30) Foreign Application Priority Data

Jul. 9, 2019 (KR) .......................... 10-2019-0082719
Mar. 4, 2020 (KR) .......................... 10-2020-0027269

(51) Int. Cl.
*H04M 1/00* (2006.01)
*H01Q 1/24* (2006.01)
(Continued)

(52) U.S. Cl.
CPC .............. *H01Q 1/243* (2013.01); *H01Q 1/38* (2013.01); *H01Q 7/00* (2013.01)

(58) Field of Classification Search
CPC ............ H01Q 1/243; H01Q 1/38; H01Q 7/00; H01Q 1/241; H01Q 9/04; H01Q 13/10; H01Q 19/005; H01Q 21/00; H01Q 5/48
See application file for complete search history.

(56) References Cited

U.S. PATENT DOCUMENTS 9,379,433 B2 6/2016 Ying
2014/0112511 A1 4/2014 Corbin et al.
(Continued)

FOREIGN PATENT DOCUMENTS

| EP | 3490059 A1 | 5/2019 |
|---|---|---|
| KR | 10-2019-0020349 a | 3/2019 |
| KR | 10-2019-0060283 A | 6/2019 |

OTHER PUBLICATIONS

Extended European Search Report dated Dec. 2, 2020, issued in a counterpart European Application No. 20184922.1-1205.
(Continued)

*Primary Examiner* — Nhan T Le
(74) *Attorney, Agent, or Firm* — Jefferson IP Law, LLP

(57) ABSTRACT

A portable communication device is provided. The portable communication device includes a display defining a front surface of the portable communication device, a plate defining a rear surface of the portable communication device and including a nonconductive material, the plate including a first surface facing an outside of the portable communication device and a second surface facing an inside of the portable communication device, a first antenna module attached to a first area of the second surface or disposed adjacent to the first area, a second antenna module attached to a second area of the second surface or disposed adjacent to the second area, and a conductive member disposed in or attached to a third area between the first area and the second area, wherein the conductive member at least partially interrupts some electric waves, among electric waves radiated from the first antenna module, that travel towards the second antenna module through the plate.

17 Claims, 33 Drawing Sheets

(51) Int. Cl.
*H01Q 1/38* (2006.01)
*H01Q 7/00* (2006.01)

(56) References Cited

U.S. PATENT DOCUMENTS

| | | |
|---|---|---|
| 2017/0237149 A1 | 8/2017 | Lee et al. |
| 2018/0294859 A1 | 10/2018 | Niu et al. |
| 2019/0020100 A1 | 1/2019 | Jong et al. |
| 2019/0132430 A1* | 5/2019 | Yoo .......................... H01Q 9/30 |
| 2019/0252766 A1* | 8/2019 | Jeon .......................... H01Q 3/26 |
| 2019/0380231 A1* | 12/2019 | Nakata ................. H05K 9/0024 |

OTHER PUBLICATIONS

International Search Report dated Oct. 22, 2020, issued in an International Application No. PCT/KR2020/008963.
European Office Action dated Jun. 15, 2021, issued in a counterpart European Application No. 20184922.1-1205.

* cited by examiner

ELECTRONIC DEVICE INCLUDING ANTENNA MODULE

CROSS-REFERENCE TO RELATED APPLICATION(S)

This application is based on and claims priority under 35 U.S.C. § 119(a) of a Korean patent application number 10-2019-0082719, filed on Jul. 9, 2019, in the Korean Intellectual Property Office, and of a Korean patent application number 10-2020-0027269, filed on Mar. 4, 2020, in the Korean Intellectual Property Office, the disclosure of each of which is incorporated by reference herein in its entirety.

BACKGROUND

1. Field

The disclosure relates to an electronic device including an antenna module.

2. Description of Related Art

As digital technologies have developed, electronic devices have been provided in various forms such as smartphones, tablet personal computers (PCs), or personal digital assistants (PDAs). The electronic devices also have been developed to be carried by or mounted on users so as to improve portability and accessibility to the users. As wireless communication technologies have been developed, electronic devices (e.g., communication electronic devices) have been generally used in everyday lives, and accordingly, contents have been increasingly used.

As high-speed wireless communication technologies of high frequency bands have been developed, phased array antennas (e.g., antenna arrays) of high directivity may be used for operations of the electronic devices in mobile environments that correspond to wireless communication systems such as satellite communication, broadcasting, mobile communication, or ground communication. A beam forming system for transmitting or receiving signals may be utilized for the electronic devices such that energy radiated from a phased array antenna is concentrated in a specific direction.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device. The electronic device may include a housing that defines an external appearance thereof, and at least a portion of the housing, for example, may be formed of an insulator or a dielectric material such as glass or a polymer. At least a portion of the housing is a waveguide, through which electromagnetic waves formed in a phased array antenna flow, and for example, may be operated as a path for a medium, by which the electromagnetic waves flow by using a total reflection property. The antenna radiation characteristics, for example, may include an antenna radiation pattern or a beam pattern that is a directional function that represents a relative distribution of electric power radiated from an antenna element, and a polarization state (or an antenna polarization) of electromagnetic waves radiated from the antenna element. When the at least a portion of the housing is operated as a waveguide, the antenna radiation characteristics for the phased array antenna become different (e.g., distorted) from the antenna radiation characteristics corresponding to a selected or specified frequency, which may deteriorate the performance of the antenna. When the electromagnetic waves formed in the phased array antenna flow through the at least a portion of the housing, another electrical element (e.g., at least one antenna provided separately from the phased array antenna) may be electrically influenced so that the performance thereof deteriorates.

Aspects of the disclosure, are to address at least the above-mentioned problems and/or disadvantages and to provide at least the advantages described below. Accordingly, an aspect of the disclosure is to provide an electronic device is provided. The electronic device may include an antenna module, for reducing an electrical influence, by a structure such as a housing, on the antenna radiation characteristics (e.g., a polarization state of a beam pattern or electromagnetic waves) of a phased array antenna and an electrical influence, by the electromagnetic waves of the phased array antenna, on another electrical element through the structure.

Additional aspects will be set forth in part in the description which follows and, in part, will be apparent from the description, or may be learned by practice of the presented embodiments.

In accordance with an aspect of the disclosure, a portable communication device is provided. The portable communication device includes a display defining a front surface of the portable communication device, a plate defining a rear surface of the portable communication device and including a nonconductive material, wherein the plate is configured to have a first surface facing an outside of the portable communication device and a second surface facing an inside of the portable communication device, a first antenna module attached to a first area of the second surface or disposed adjacent to the first area, a second antenna module attached to a second area of the second surface or disposed adjacent to the second area, and a conductive member disposed in or attached to a third area between the first area and the second area, wherein the conductive member at least partially interrupts some electric waves, among electric waves radiated from the first antenna module, that travel towards the second antenna module through the plate.

In accordance with another aspect of the disclosure, a portable communication device is provided. The portable communication device includes a display defining a front surface of the portable communication device, a plate defining a rear surface of the portable communication device and including a nonconductive material, wherein the plate is configured to have a first surface facing an outside of the portable communication device and a second surface facing an inside of the portable communication device, an antenna disposed in or attached to a first area of the second surface or disposed adjacent to the first area, an electronic component disposed in or attached to a second area of the second surface, and a conductive member disposed in or attached to a third area between the first area and the second area, wherein the conductive member at least partially interrupts some electric waves, among electric waves radiated from the antenna, that travel toward the electronic component through the plate.

According to various embodiments of the disclosure, the antenna performance of an antenna module may be secured by reducing an electrical influence, by a structure such as a housing, on the antenna radiation characteristics (e.g., a polarization state of a beam pattern or electromagnetic waves). According to various embodiments of the disclosure, an electrical influence, by electromagnetic waves formed in an antenna module, on another electrical element through a structure can be reduced, and thus the performance of the other electrical element can be secured.

In addition, the effects that may be obtained or expected by various embodiments of the disclosure will be directly or implicitly disclosed in a detailed description of the embodiments of the disclosure. For example, various effects expected according to various embodiments of the disclosure will be disclosed in the detailed description of the disclosure, which will be described below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
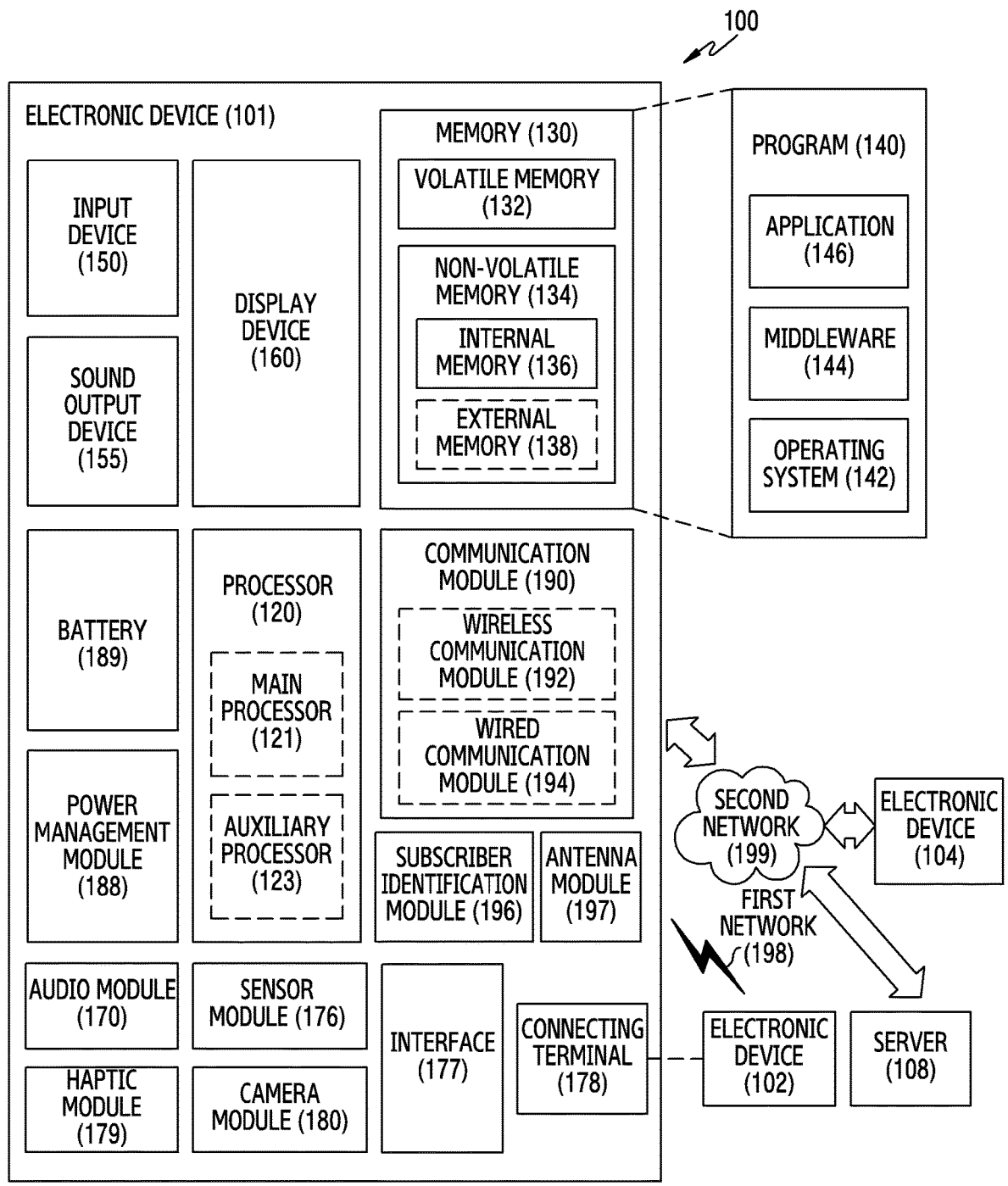
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency (RF) integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
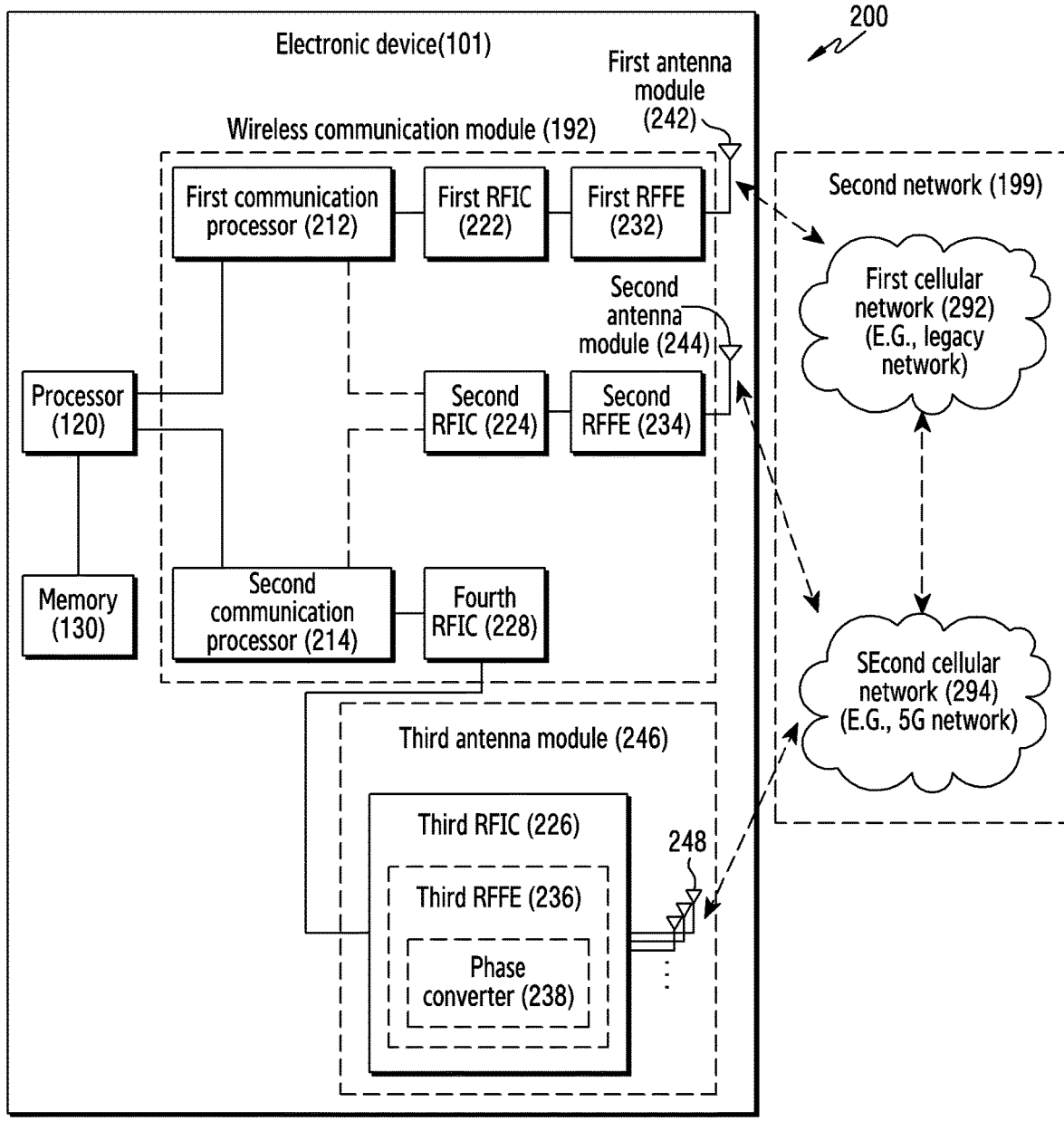
FIG. 2 is a block diagram of an electronic device in a network environment including a plurality of cellular networks according to an embodiment of the disclosure.

FIG. 2 is a block diagram 200 illustrating an example electronic device 101 in a network environment including multiple cellular networks according to an embodiment of the disclosure.

Referring to FIG. 2, the electronic device 101 may include a first communication processor (e.g., including processing circuitry) 212, a second communication processor (e.g., including processing circuitry) 214, a first RFIC 222, a second RFIC 224, a third RFIC 226, a fourth RFIC 228, a first radio frequency front end (RFFE) (e.g., including radio frequency circuitry) 232, a second RFFE (e.g., including radio frequency circuitry) 234, a first antenna module (e.g., including an antenna) 242, a second antenna module (e.g., including an antenna) 244, and an antenna 248. The electronic device 101 may further include a processor (e.g., including processing circuitry) 120 and memory 130. The second network 199 may include a first cellular network 292 and a second cellular network 294. According to another embodiment, the electronic device 101 may further include at least one of the components illustrated in FIG. 2, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may comprise at least a part of a wireless (e.g., RF) communication module 192. According to another embodiment, the fourth RFIC 228 may be omitted, or may be included as a part of the third RFIC 226.

According to various embodiments, the first communication processor 212 may include various communication processing circuitry and establish a communication channel in a band to be used for RF communication with the first cellular network 292, and may support legacy network communication over the established communication channel. According to various embodiments, the first cellular network may be a legacy network including, for example, and without limitation, a second generation (2G), 3G, 4G, long-term-evolution (LTE) network, or the like. The second communication processor 214 may include various communication processing circuitry and establish a communication channel corresponding to a designated band (e.g., about 6 GHz to about 60 GHz) in a band to be used for RF communication with the second cellular network 294, and may support 5G network communication through the established communication channel According to various embodiments, the second cellular network 294 may, for example, and without limitation, be a 5G network defined in the 3GPP. In addition, according to an embodiment, the first communication processor 212 and/or the second communication processor 214 may establish a communication channel corresponding to another designated band (e.g., about 6 GHz or lower) in the band to be used for RF communication with the second cellular network 294, and may support 5G network communication through the established communication channel According to an embodiment, the first communication processor 212 and the second communication processor 214 may be implemented in a single chip or in a single package. According to various embodiments, the first communication processor 212 and/or the second communication processor 214 may be formed in a single chip or a single package with the processor 120, an auxiliary processor 123, and/or a communication module 190.

According to an embodiment, during transmission, the first RFIC 222 may convert a baseband signal generated by the first communication processor 212 into an RF signal ranging, for example, from about 700 MHz to about 3 GHz to be used in the first cellular network 292 (e.g., a legacy network). During reception, an RF signal may be acquired from the first cellular network 292 (e.g., the legacy network) through an antenna (e.g., the first antenna module 242) and may be pre-processed through an RFFE (e.g., the first RFFE 232). The first RFIC 222 may convert the pre-processed RF signal into a baseband signal to be processed by the first communication processor 212.

According to an embodiment, during transmission, the second RFIC 224 may convert the baseband signal generated by the first communication processor 212 and/or the second communication processor 214 into an RF signal in, for example, a Sub6 band (e.g., about 6 GHz or lower) (hereinafter, referred to as "5G Sub6 RF signal") to be used in the second cellular network 294 (e.g., a 5G network). During reception, the 5G Sub6 RF signal may be acquired from the second cellular network 294 (e.g., a 5G network) through an antenna (e.g., the second antenna module 244), and may be pre-processed through an RFFE (e.g., the second RFFE 234). The second RFIC 224 may convert the pre-processed 5G Sub6 RF signal into a baseband signal so as to be processed by a corresponding one of the first communication processor 212 and the second communication processor 214.

According to an embodiment, the third RFIC 226 may convert the baseband signal generated by the second communication processor 214 into an RF signal in a 5G Above6 band (e.g., about 6 GHz to about 60 GHz) (hereinafter, referred to as "5G Above6 RF signal") to be used in the second cellular network 294 (e.g., a 5G network). During reception, the 5G Above6 RF signal may be acquired from the second cellular network 294 (e.g., a 5G network) through an antenna (e.g., the second antenna module 244), and may be pre-processed through the third RFFE 236. The third RFIC 226 may convert the pre-processed 5G Above6 RF signal into a baseband signal to be processed by the second communication processor 214. According to an embodiment, the third RFFE 236 may be formed as a part of the third RFIC 226.

According to an embodiment, the electronic device 101 may include a fourth RFIC 228 separately from or as at least a part of the third RFIC 226. In this case, the fourth RFIC 228 may convert a baseband signal generated by the second communication processor 214 into an RF signal (hereinafter, referred to as "IF signal") in an intermediate frequency band (e.g., about 9 GHz to about 11 GHz), and may then deliver the IF signal to the third RFIC 226. The third RFIC 226 may convert the IF signal into a 5G Above6 RF signal. During reception, the 5G Above6 RF signal may be acquired from the second cellular network 294 (e.g., a 5G network) through an antenna (e.g., the antenna 248), and may be configured into an IF signal through the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 and the second antenna module 244 may be omitted or combined with another antenna module so as to process RF signals of multiple corresponding bands.

According to an embodiment, the third RFIC 226 and the antenna 248 may be disposed on the same substrate to comprise a third antenna module 246. For example, the wireless (e.g., RF) communication module 192 and/or the processor 120 may be placed on a first substrate (e.g., a main PCB). In such a case, the third RFIC 226 may be disposed on a partial area (e.g., a lower face) of a second substrate (e.g., a sub-PCB) separate from the first substrate, and the antenna 248 may be disposed on another partial area (e.g., an upper face), thereby forming the third antenna module 246. By disposing the third RFIC 226 and the antenna 248 on the same substrate, it is possible to reduce the length of the transmission line therebetween. Thus, it may be possible to reduce the loss (e.g., attenuation) of a signal in an RF band (e.g., about 6 GHz to about 60 GHz) to be used, for example, for 5G network communication by the transmission line. As a result, the electronic device 101 is able to improve the quality or speed of communication with the second cellular network 294 (e.g., a 5G network).

According to an embodiment, the antenna 248 may be an antenna array including multiple antenna elements that are capable of being used for beamforming. In this case, the third RFIC 226 may include multiple phase shifters (i.e., phase converters) 238 corresponding to the multiple antenna elements, for example, as a part of the third RFFE 236. During transmission, each of the multiple phase shifters 238 may convert the phase of a 5G Above6 RF signal to be transmitted to the outside of the electronic device 101 (e.g., a base station of a 5G network) through a corresponding antenna element. During reception, each of the multiple phase shifters 238 may convert the phase of the 5G Above6 RF signal received from the outside into the same or substantially the same phase through the corresponding antenna element. This enables transmission or reception through beamforming between the electronic device 101 and the outside.

According to various embodiments, the second cellular network 294 (e.g., a 5G network) may be operated independently from the first cellular network 292 (e.g., a legacy network) (e.g., Stand-Alone (SA)), or may be operated in the state of being connected to the first cellular network 292 (e.g., Non-Stand Alone (NSA)). For example, in a 5G network, only an access network (e.g., a 5G radio access network (RAN) or a next-generation RAN (NG RAN)) may exist but a core network (e.g., a next-generation core (NGC)) may not exist. In this case, after accessing the access network of the 5G network, the electronic device 101 may access an external network (e.g., the Internet) under the control of the core network (e.g., an evolved packet core (EPC)) of a legacy network. Protocol information for communication with a legacy network (e.g., LTE protocol information) or protocol information for communication with a 5G network (e.g., new radio (NR) protocol information) may be stored in the memory 230, and may be accessed by another component (e.g., the processor 120, the first communication processor 212, or the second communication processor 214).

Figure 3A:
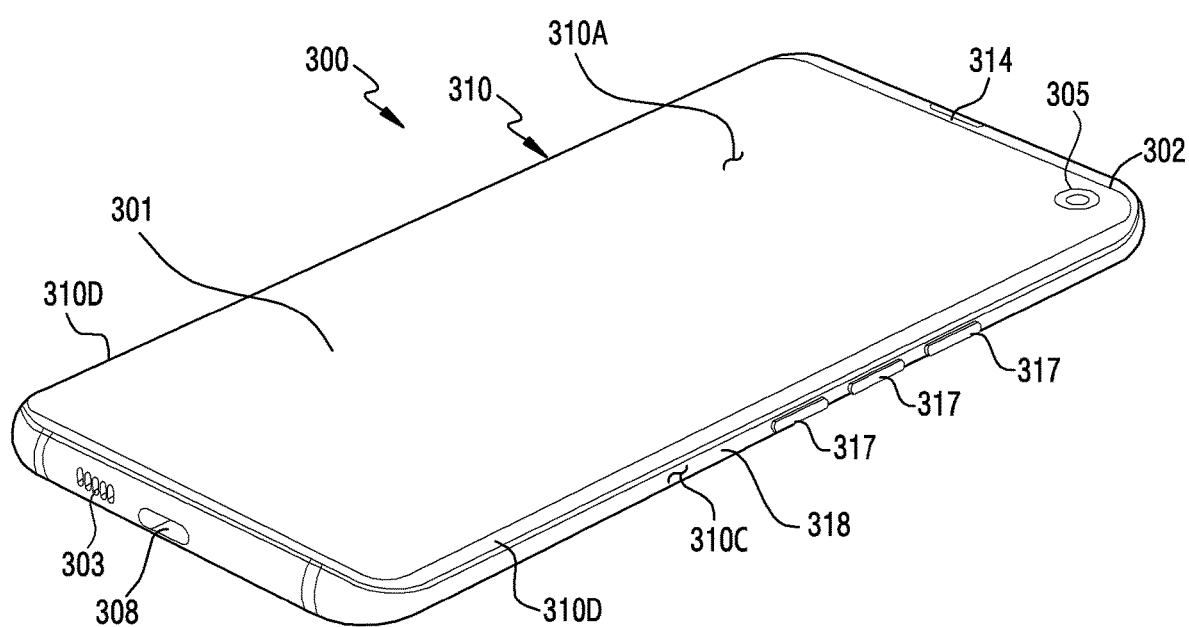
FIG. 3A is a front perspective view of a mobile electronic device according to an embodiment of the disclosure.
Figure 3B:
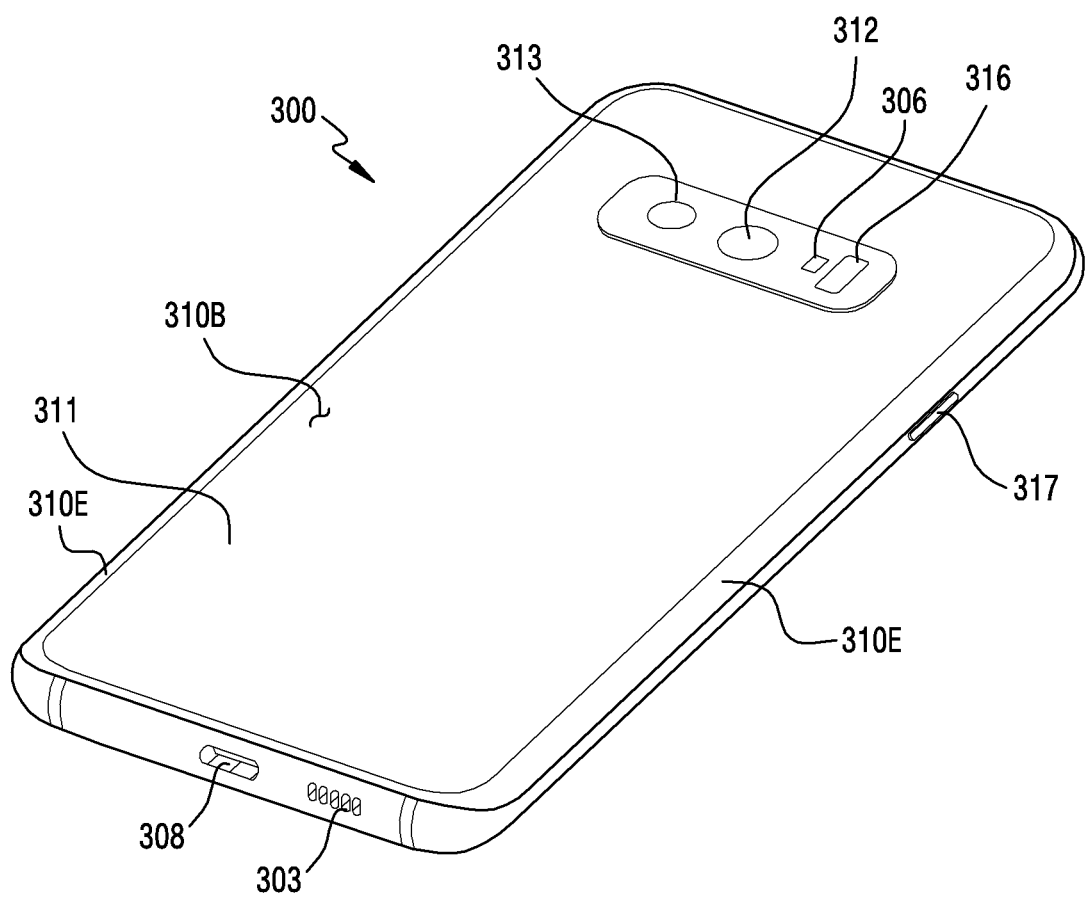
FIG. 3B is a rear perspective view of the electronic device of FIG. 3A according to an embodiment of the disclosure.

FIG. 3A is a perspective view illustrating a front side of an example mobile electronic device according to an embodiment of the disclosure, FIG. 3B is a perspective view illustrating a back side of an example electronic device of FIG. 3A according to an embodiment of the disclosure.

FIG. 3A is a front perspective view illustrating an example mobile electronic device according to an embodiment of the disclosure.

FIG. 3B is a rear perspective view illustrating an example mobile electronic device of FIG. 3A according to an embodiment of the disclosure.

Referring to FIGS. 3A and 3B, an electronic device 300 according to an embodiment may include a housing 310 including a first side (or a front side) 310A, a second side (or a rear side) 310B, and a lateral side (surface) 310C surrounding a space between the first side 310A and the second side 310B. In another embodiment (not shown), the housing may refer to a structure which includes part of the first side 310A, the second side 310B, and the third side 310C of FIGS. 3A and 3B.

According to an embodiment, the first side 310A may be constructed of a front plate 302 (or a front cover) (e.g., a polymer plate or a glass plate having various coating layers) which is at least partially transparent. The front plate 302 may include a curved portion that extends smoothly from at least one side edge portion toward the rear plate 311 from the first surface 310A.

The second side 310B may be constructed of a rear plate 311 (or a rear cover) which may be opaque. The rear plate 311 may be constructed, for example, and without limitation, of coated or colored glass, ceramic, polymer, metallic materials (e.g. aluminum, stainless steel (STS), or magnesium), a combination of at least two of these materials, or the like. According to an embodiment, the rear plate 311 may include a curved portion that is bent toward the front plate 302 from the second side 310B at at least one end portion and extends seamlessly.

The lateral side 310C (or a side member or side surface) may be constructed of a side (e.g., lateral) bezel structure (or a lateral member) 318 bonded to the front plate 302 and the rear plate 311 and including, for example, and without limitation, metal and/or polymer. In some embodiments, the rear plate 311 and the side (lateral) bezel structure 318 may be constructed integrally and may include the same material (e.g., a metallic material such as aluminum).

According to various embodiments, the electronic device 300 may include at least one of a display 301, an audio module corresponding to an audio module hole 303, 314, a sensor module, a camera module 305, a key input device 317, and a connector hole 308. It may include the above. In some embodiments, the electronic device 300 may omit at least one of the components (for example, the key input device 317) or additionally include other components. For example, the electronic device 300 may include a sensor module (not shown). For example, within an area provided by the front plate 302, a sensor such as a proximity sensor or an illuminance sensor may be integrated into the display 301, or may be disposed at a position adjacent to the display 301. In some embodiments, the electronic device 300 may further include a light-emitting device, and the light-emitting device may be disposed at a position adjacent to the display 301 within an area provided by the front plate 302. The light-emitting device may provide, for example, status information of the electronic device 300 in the form of light. In another embodiment, the light-emitting device may provide, for example, a light source interlocked with the operation of the camera module 305. The light-emitting element may include, for example, an LED, an IR LED, and a xenon lamp.

The display 301 can be exposed, for example, through a significant portion of the front plate 302. In some embodiments, the edge of the display 301 may be formed to be substantially the same as the adjacent outer shape (e.g., a curved surface) of the front plate 302. In another embodiment (not shown), in order to expand the area where the display 301 is exposed, the distance between the outer edge of the display 301 and the outer edge of the front plate 302 may be substantially the same. In another embodiment (not shown), a recess or opening is formed in a part of a screen display area of the display 301, and other electronic components aligned with the recess or the opening, for example, may include a camera module 305, a proximity sensor (not shown) or an illuminance sensor.

In another embodiment (not shown), at least one of the camera modules 312 and 313, the fingerprint sensor 316, and the flash 306 may be included on the rear surface of the screen display area of the display 301. In another embodiment (not shown), the display 301 is coupled to or adjacent to a touch sensing circuit, a pressure sensor capable of measuring the intensity (pressure) of the touch, and/or a digitizer detecting a magnetic field type stylus pen.

The audio modules located at holes 303 and 314 may include a microphone hole 303 and a speaker hole 314. In the microphone hole 303, a microphone for acquiring external sound may be arranged inside, and in some embodiments, a plurality of microphones may be arranged to sense the direction of sound. In some embodiments, a speaker hole and a microphone hole may be implemented as one hole 303, or a speaker may be included without a speaker hole (e.g., a piezo speaker). The speaker hole may include an external speaker hole and a call receiver hole 314.

The electronic device 300 may generate an electrical signal or data value corresponding to an internal operating state or an external environmental state by including a sensor module (not shown). The sensor module may be, for example, a proximity sensor disposed on the first surface 310A of the housing 310, a fingerprint sensor integrated or adjacent to the display 301, and/or a product of the housing 310. A biometric sensor (e.g., an HRM sensor) disposed on the two surfaces 310A and 310B may be further included. The electronic device 300 includes a sensor module (not shown), for example, a gesture sensor, a gyro sensor, an air pressure sensor, a magnetic sensor, an acceleration sensor, a grip sensor, a color sensor, an infrared (IR) sensor, a bio sensor, a temperature sensor, It may further include at least one of a humidity sensor or an illuminance sensor.

The camera modules 305, 312, and 313, and flash 306 may include a first camera device 305 disposed on the first surface 310A of the electronic device 300, and a second camera device disposed on the second surface 310B (e.g., cameras 312, 313, and/or flash 306). The camera devices 305, 312, and 313 may include one or more lenses, an image sensor, and/or an image signal processor. The flash 306 may include, for example, a light-emitting diode or a xenon lamp. In some embodiments, two or more lenses (infrared camera, wide-angle and telephoto lenses) and image sensors may be disposed on one side of the electronic device 300.

The key input device 317 may be disposed on the side surface 310C of the housing 310. In another embodiment, the electronic device 300 may not include some or all of the key input devices 317 mentioned above, and the key input devices 317 that are not included may include other soft keys on the display 301. It can be implemented in the form. In some embodiments, the key input device can include at least a portion of the fingerprint sensor 316 disposed on the second side 310B of the housing 310.

The connector hole 308 may accommodate a connector for transmitting and receiving power and/or data to and from the external electronic device, and/or a connector for transmitting and receiving audio signals to and from the external electronic device. For example, the connector hole 308 may include a USB connector or an earphone jack.

Figure 4:
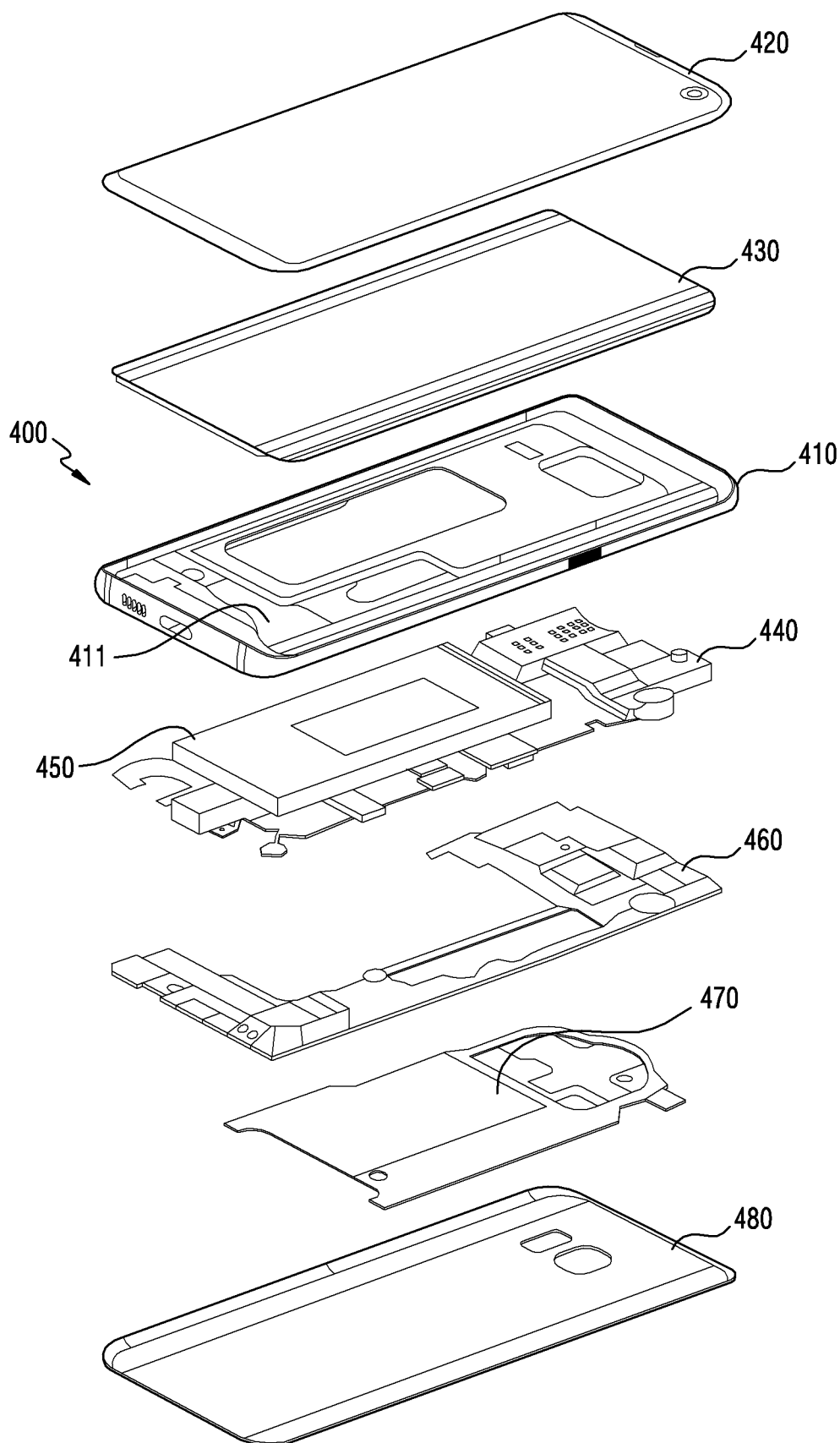
FIG. 4 is an exploded perspective view of an electronic device according to an embodiment of the disclosure.

FIG. 4 is an exploded perspective view of an electronic device according to an embodiment of the disclosure.

Referring to FIG. 4, the electronic device 400 according to an embodiment (e.g., the electronic device 300 of FIG. 3A or 3B) includes a side bezel structure 410 (e.g., the side bezel structure 318 of FIG. 3A)), first support member 411 (e.g., a bracket), front plate 420 (e.g., front plate 302 in FIG. 3A), display 430 (e.g., display 301 in FIG. 3A)), printed circuit board 440, battery 450, second support member 460 (e.g., rear case), antenna 470, or rear plate 480 (e.g., rear plate 311 in FIG. 3B)). In some embodiments, the electronic device 400 may omit at least one of the components (e.g., the first support member 411 or the second support member 460) or additionally include other components. At least one of the components of the electronic device 400 may be the same or similar to at least one of the components of the electronic device 300 of FIG. 3A or 3B, and overlapping descriptions are omitted below.

The first support member 411 may be disposed inside the electronic device 400 and connected to the side bezel structure 410 or may be integrally formed with the side bezel structure 410. The first support member 411 may be formed of, for example, a metal material and/or a non-metal (e.g., polymer) material. In the first support member 411, a display 430 may be coupled to one surface and a printed circuit board 440 may be coupled to the other surface. The printed circuit board 440 may be equipped with a processor, memory, and/or interface. The processor may include, for example, one or more of a central processing unit, an application processor, a graphic processing unit, an image signal processor, a sensor hub processor, or a communication processor.

The memory may include, for example, volatile memory or nonvolatile memory.

The interface may include, for example, a high definition multimedia interface (HDMI), a universal serial bus (USB) interface, an SD card interface, and/or an audio interface. The interface may electrically or physically connect the electronic device 400 to an external electronic device, for example, and include a USB connector, an SD card/MMC connector, or an audio connector.

The battery 450 is, for example, a device for supplying power to at least one component of the electronic device 400, for example, a non-rechargeable primary cell, or a rechargeable secondary cell, or a fuel cell it may include. At least a portion of the battery 450 may be disposed, for example, on a substantially coplanar surface with the printed circuit board 440. The battery 450 may be integrally disposed within the electronic device 400 or may be detachably disposed with the electronic device 400.

The antenna 470 may be disposed between the rear plate 480 and the battery 450 in one embodiment. The antenna 470 may include, for example, a near field communication (NFC) antenna, a wireless charging antenna, and/or a magnetic secure transmission (MST) antenna. The antenna 470 may, for example, perform short-range communication with an external device or wirelessly transmit and receive power required for charging. In another embodiment, the antenna structure may be formed by a side bezel structure 410 and/or a portion of the first support member 411 or a combination thereof.

Figure 5A:
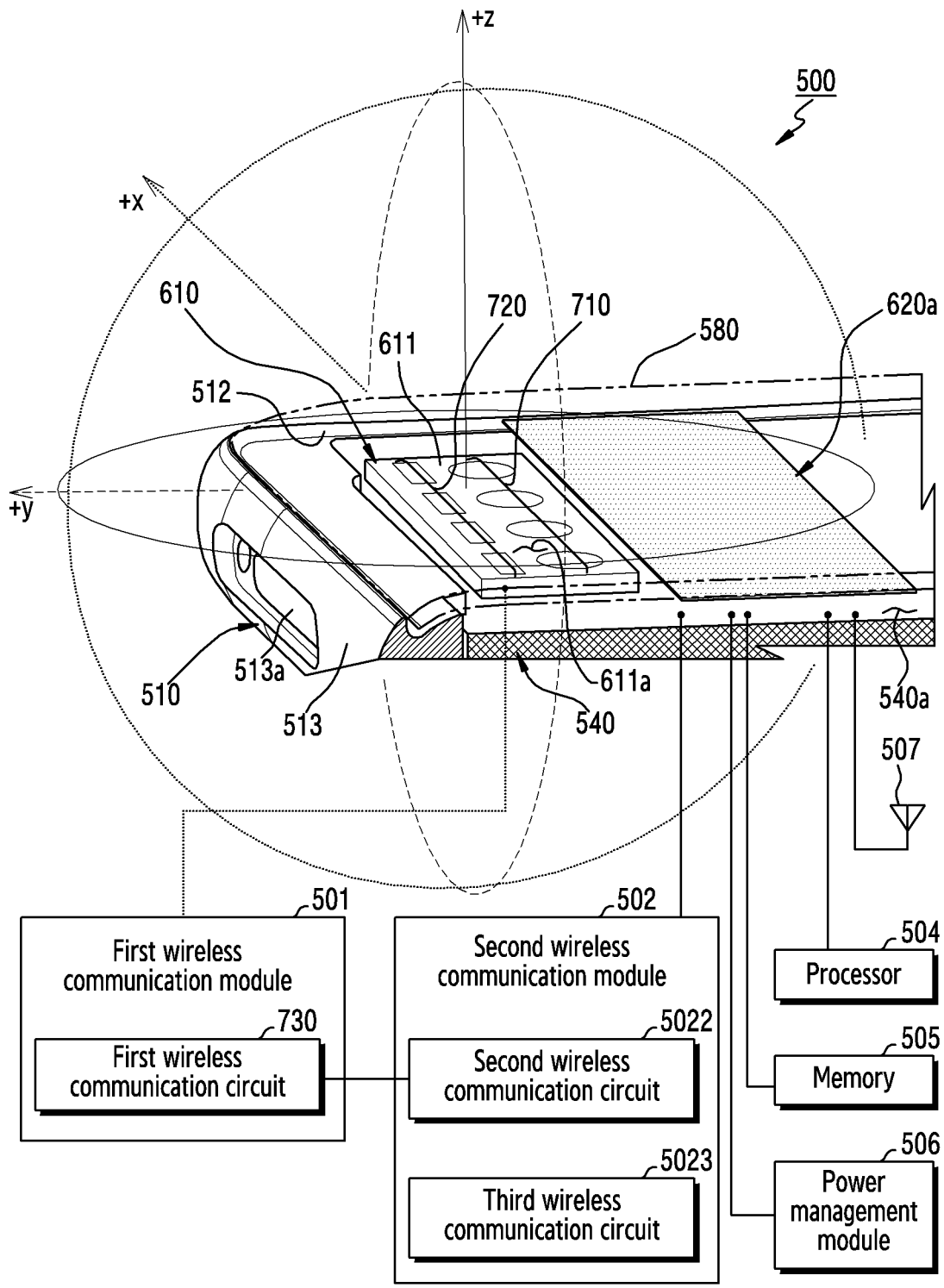
FIG. 5A illustrates an electronic device including an antenna module according to an embodiment of the disclosure.
Figure 5B:
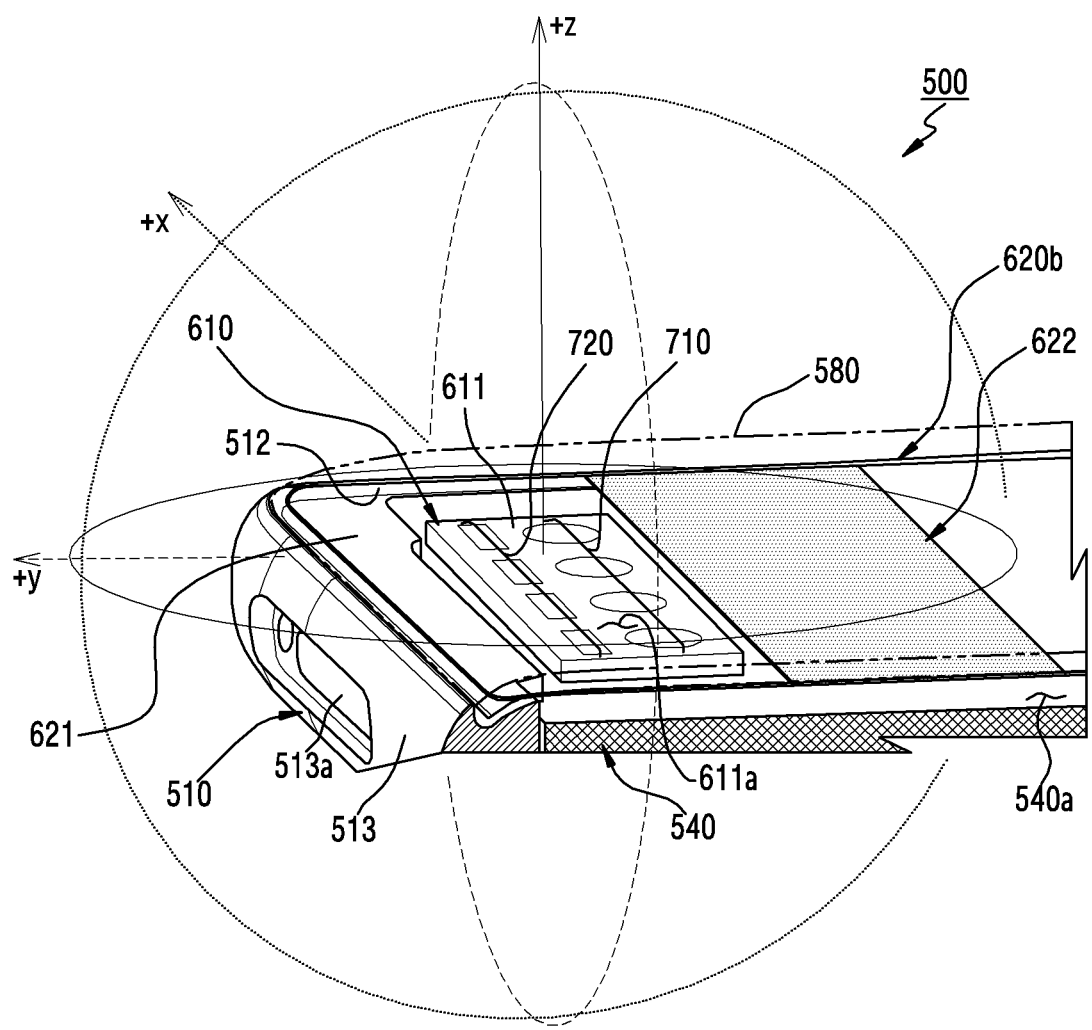
FIG. 5B illustrates an electronic device including an antenna module according to an embodiment of the disclosure.

FIG. 5A illustrates an electronic device including an antenna module according to an embodiment of the disclosure, and FIG. 5B illustrates an electronic device including an antenna module according to an embodiment of the disclosure.

Figure 6:
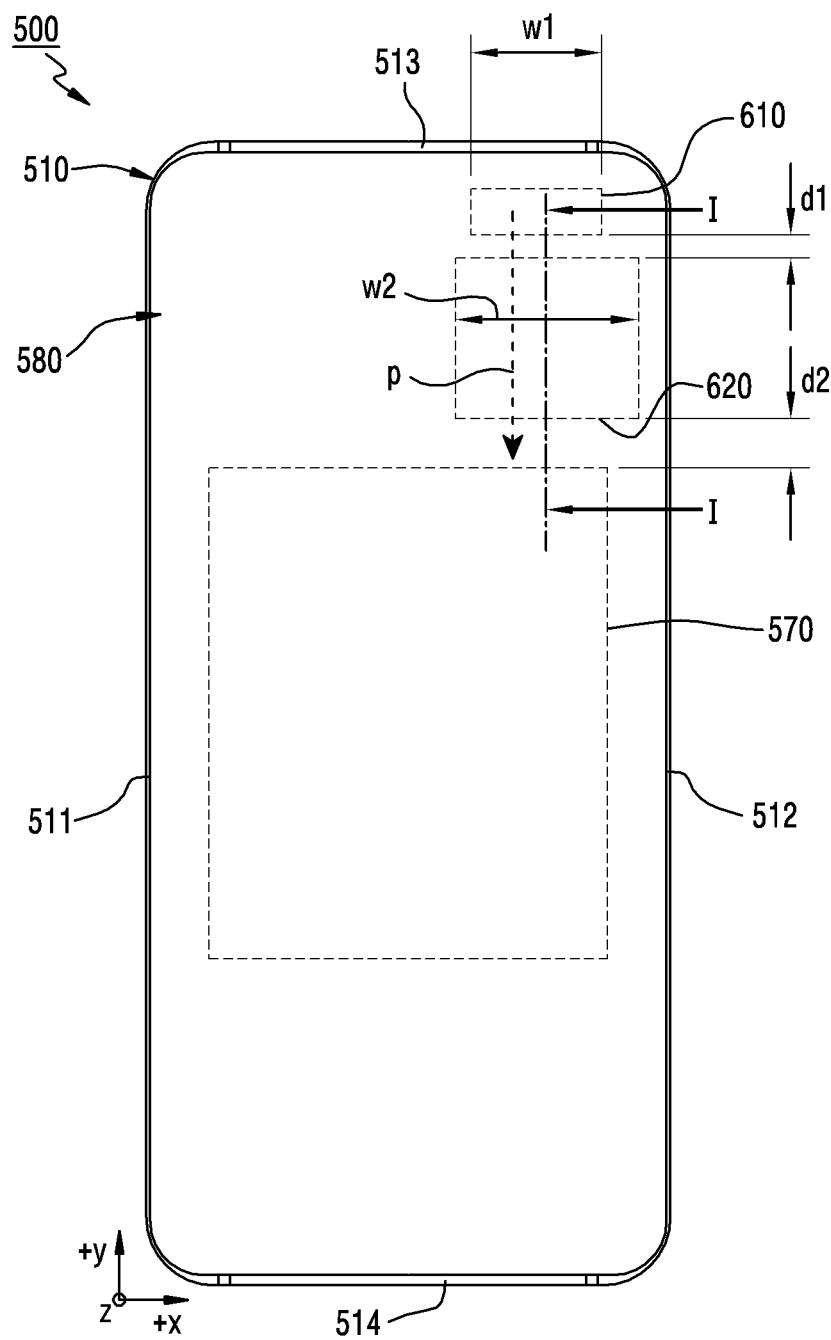
FIG. 6 is a view of the electronic device of FIG. 5A viewed from the top of a rear plate according to an embodiment of the disclosure.

FIG. 6 is a view of the electronic device of FIG. 5A viewed from the top of a rear plate according to an embodiment of the disclosure.

Figure 7A:
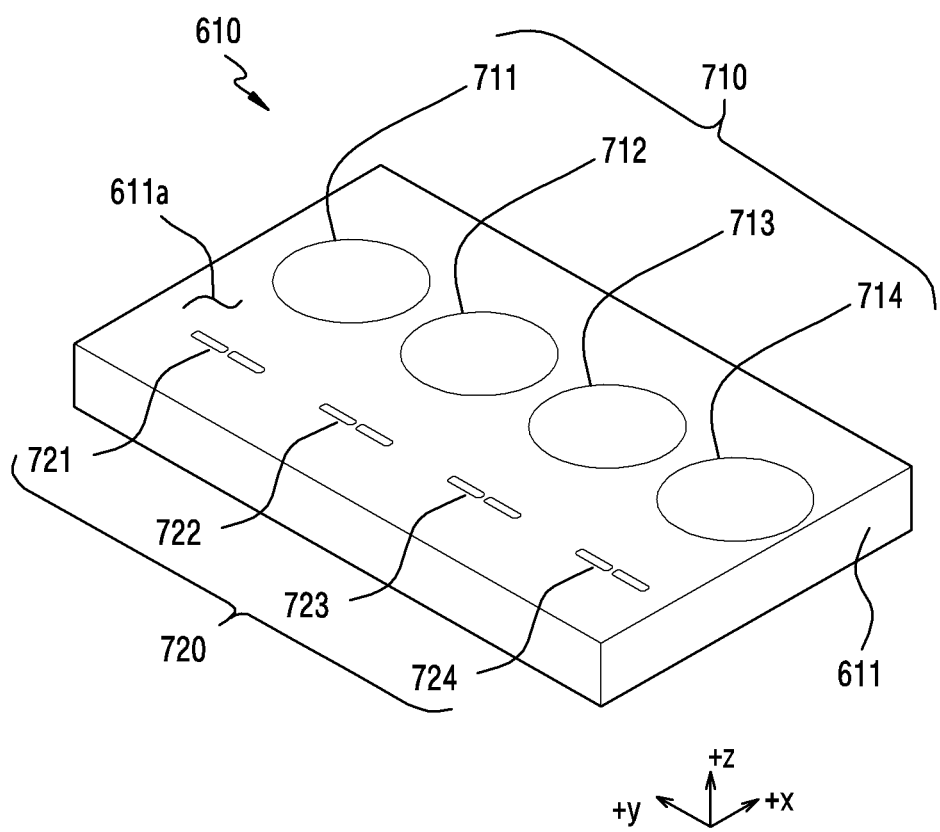
FIG. 7A is a perspective view of an antenna module according to an embodiment of the disclosure.
Figure 7B:
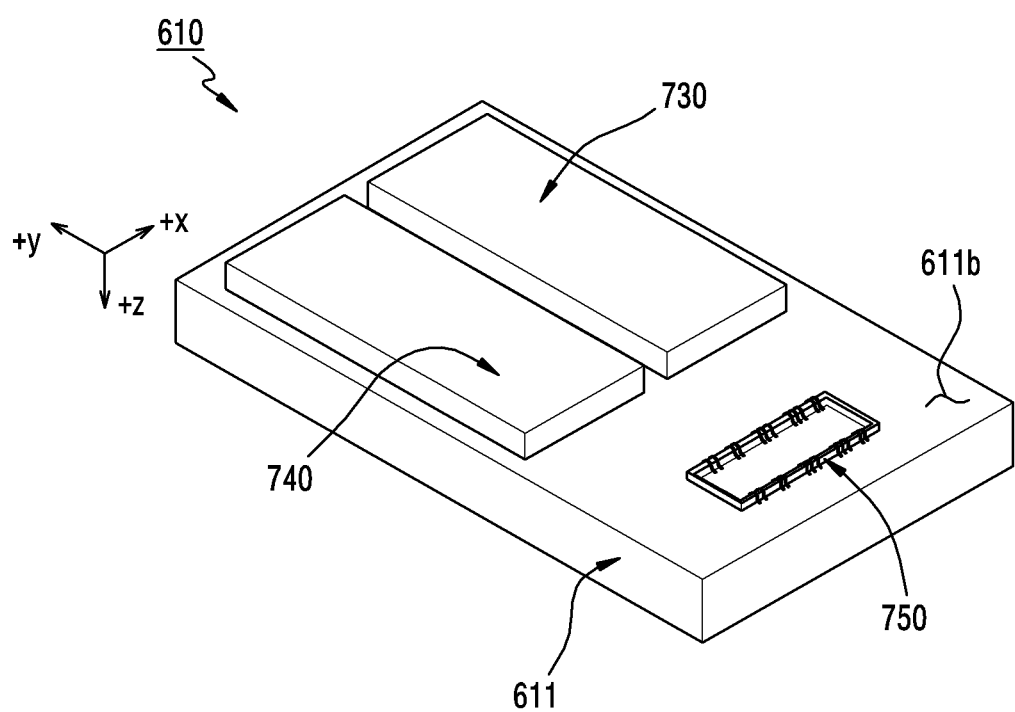
FIG. 7B is a perspective view of an antenna module according to an embodiment of the disclosure.

FIG. 7A is a perspective view of an antenna module according to an embodiment of the disclosure, and FIG. 7B is a perspective view of an antenna module according to an embodiment of the disclosure.

Referring to FIG. 5A, an electronic device 500 (e.g., the electronic device 101 of FIG. 1 or 2, the electronic device 300 of FIG. 3A, or the electronic device 400 of FIG. 4) may include a side bezel structure 510, a rear plate 580, an antenna module (or an antenna structure) 610, a second printed circuit board 540, or a conductive layer (or a conductive film) 620a.

At least one of the components of the electronic device 500 may be the same as or similar to at least one of the components of the electronic device 300 of FIG. 3A or 3B or the electronic device 400 of FIG. 4, and a repeated description thereof will be omitted hereinafter.

Referring to FIGS. 5A, 5B, and 6, in an embodiment, the side bezel structure 510 (e.g., the side bezel structure 318 of FIG. 3A or the side bezel structure 410 of FIG. 4) may include a first side surface part 511, a second side surface part 512, a third side surface part 513, and a fourth side surface part 514. The first side surface part 511 and the second side surface part 512 may be disposed on opposite sides and may be parallel to each other. The third side surface part 513 and the fourth side surface part 514 may be disposed on opposite sides and may be parallel to each other. The third side surface part 513 may be perpendicular to the first side surface part 511 (or the second side surface part 512), and may connect one end (not illustrated) of the first side surface part 511 and one end (not illustrated) of the second side surface part 512. The fourth side surface part 514 may be perpendicular to the first side surface part 511 (or the second side surface part 512), and may connect an opposite end (not illustrated) of the first side surface part 511 and an opposite end (not illustrated) of the second side surface part 512.

The first side surface part 511 may define a first side surface (not illustrated) of the electronic device 500, and the second side surface part 512 may define a second side surface (not illustrated) of the electronic device 500, which is disposed on an opposite side to the first side surface. The third side surface part 513 may define a third side surface (not illustrated) of the electronic device 500, and the fourth side surface part 514 may define a fourth side surface (not illustrated) of the electronic device 500, which is disposed on an opposite side to the third side surface.

For example, when viewed from the top of the rear plate 580, the first side surface and the second side surface may have a first length extending in the y axis direction, and the third side surface and the fourth side surface may have a second length extending in the +x axis direction and that is smaller than the first length. A connection part (not illustrated) between the first side surface part 511 and the third side surface part 513, a connection part (not illustrated) between the first side surface part 511 and the fourth side surface part 514, a connection part (not illustrated) between the second side surface part 512 and the third side surface part 513, and/or a connection part (not illustrated) between the second side surface part 512 and the fourth side surface part 514 may define corners in the form of curves.

Referring to FIGS. 5A, 5B, 7A, and 7B, in an embodiment, the antenna module 610 (e.g., the second antenna module 244 or the third antenna module 246 of FIG. 2) may include at least one of a first printed circuit board 611, a first wireless communication circuit 730, a power management circuit 740, or a first connector 750.

The first printed circuit board 611, for example, may include a first surface 611a, and a second surface 611b disposed on an opposite side to the first surface 611a. According to an embodiment, the first printed circuit board 611 may be disposed between the rear plate 580 and the second printed circuit board 540 such that the first surface 611a faces the rear plate 580 and the second surface 611b faces the second printed circuit board 540. The first printed circuit board 611 may be disposed to be parallel to the second printed circuit board 540. For example, the first printed circuit board 611 may be directly soldered to the second printed circuit board 612. As another example, the first printed circuit board 611 and the second printed circuit board 612 may be coupled to each other by an interposer (not illustrated) interposed between the first printed circuit board 611 and the second printed circuit board 612. As another example, the first printed circuit board 611 may disposed on one surface of the second printed circuit board 612, and may be connected to the second printed circuit board 612 by a separate cable.

Referring to FIG. 6, in an embodiment, the antenna module 610 may be disposed closer to the third side surface part 513 than to the fourth side surface part 514. According to an embodiment, the antenna module 610 may be disposed closer to the second side surface part 512 than to the first side surface part 511. For example, the antenna module 610 may be disposed around a corner between the second side surface part 512 and the third side surface part 513. Referring to FIG. 5, in an embodiment, the antenna module 610 may be disposed around an opening 513a (e.g., the memory card connector of FIG. 9 (e.g., the SIM card connector 595)) disposed in the third side surface part 513.

According to various embodiments (not illustrated), the antenna module 610 may be disposed at other various locations. For example, the antenna module 610 may be disposed closer to the fourth side surface part 514 than to the third side surface part 513. For example, the antenna module 610 may be disposed closer to the first side surface part 511 than to the second side surface part 512. According to various embodiments (not illustrated), the antenna module 610 may be disposed around a corner between the first side surface part 511 and the third side surface part 513, around a corner between the first side surface part 511 and the fourth side surface part 514, or around a corner between the second side surface part 512 and the fourth side surface part 514.

According to an embodiment, the first printed circuit board 611 may include one or more antennas. For example, the one or more antennas may be realized by at least some of a plurality of conductive layers (e.g., a plurality of conductive pattern layers or a plurality of circuit layers) included in the first printed circuit board 611. According to an embodiment, the one or more antennas may include at least one of a first antenna array 710 or a second antenna array 720. The first antenna array 710 or the second antenna array 720 may include a structure in which a plurality of antenna element having substantially the same form are arranged or a structure in which a plurality of antenna elements are arranged at a predetermined interval. According to various embodiments, the locations and the number of the antenna arrays are not limited to the example illustrated in FIG. 5A, 5B, or 7A, and may be variously set. According to various embodiments, the locations or the number of the antenna elements included in the first antenna array 710 or the second antenna array 720 are not limited to the example illustrated in FIG. 5A, 5B, or 7A, and may be variously set. According to another embodiment, the second antenna array 720 (e.g., a dipole antenna) may be omitted from the antenna module 610. For example, the antenna module 610 may include only the first antenna array 710.

The plurality of antenna elements included in the first antenna array 710 or the second antenna array 720, for example, may include patch antennas, loop antennas, or dipole antennas. According to an embodiment, the plurality of antennas 711, 712, 713, and 714 included in the first antenna array 710 may be patch antennas, and the plurality of antenna elements 721, 722, 723, and 724 included in the second antenna array 720 may be dipole antennas. According to an embodiment, the plurality of antenna elements included in the first antenna array 710 and/or the second antenna array 720 may be electrically connected to the first wireless communication circuit 730.

According to an embodiment, the first antenna array 710 and/or the second antenna array 720 may be disposed closer to the first surface 611a than to the second surface 611b or may be disposed on the first surface 611a. Referring to FIGS. 5A, 5B, 6, and 7A, in an embodiment, when viewed from the top of the rear plate 580 (e.g., the rear plate 311 of FIG. 3B or the rear plate 480 of FIG. 4), the plurality of antenna elements 711, 712, 713, and 714 of the first antenna array 710 and the plurality of antenna elements 721, 722, 723, and 724 of the second antenna array 720 may be arranged in a direction (e.g., the +x axis direction) facing the second side surface part 512 from the first side surface part 511. According to an embodiment, when viewed from the top of the rear plate 520, the second antenna array 720 may be disposed closer to the third side surface part 513 than to the first antenna array 710.

Referring to FIGS. 7A and 7B, in an embodiment, the first wireless communication circuit 730 may be disposed on the second surface 611b of the first printed circuit board 611 through a conductive bonding member such as solder, and may be electrically connected to the first printed circuit board 611. The first wireless communication circuit 730 may be electrically connected to the first antenna array 710 and the second antenna array 720 through wiring lines included in the first printed circuit board 611. For example, the first wireless communication circuit 730 may include a circuit element (e.g., an RFIC) mounted on the first printed circuit board 611.

According to an embodiment, the first wireless communication circuit 730 may transmit and/or receive a first signal of at least some frequency bands (e.g., a frequency band of about 24 GHz to about 100 GHz, a frequency band of about 24 GHz to about 30 GHz, or a frequency band of about 37 GHz to about 40 GHz), among about 6 GHz to about 100 GHz through the first antenna array 710 and/or the second antenna array 720. According to an embodiment, the first wireless communication circuit 730 may up-convert or down-convert a frequency of a signal transmitted or received through wireless communication. Referring to FIGS. 5A, 5B, and 7B, for example, the first wireless communication circuit 730 may receive an IF signal from a second wireless communication circuit 5022 of the second wireless communication module 502 disposed in the second printed circuit board 540, and may up-convert the received IF signal to a radio frequency (RF) signal. For example, the first wireless communication circuit 730 may down-convert an RF signal (e.g., a millimeter wave) received through the first antenna array 710 or the second antenna array 720 to an IF signal, and the IF signal may be provided to the second wireless communication circuit 5022 disposed in the second printed circuit board 540.

According to an embodiment, at least some of the plurality of conductive layers included in the first printed circuit board 611 may include a transmission line (e.g., an RF line) between one or more antenna arrays 710 and 720 and the first wireless communication circuit 730. The transmission line is a structure for delivering a frequency signal (e.g., a voltage or a current), and may be referred to as a conductor system that uses an operation of delivering waves by an electrical medium parameter (e.g., a resistance, an inductance, a conductance, or a capacitance per unit length). For example, at least some of the plurality of conductive layers included in the first printed circuit board 611 may include an electrical path (or a wiring line) for supplying electric power to the one or more antenna arrays 710 and 720 between the one or more antenna arrays 710 and 720 and the first wireless communication circuit 730.

According to an embodiment, the first connector 750 may be disposed on or coupled to the second surface 611b of the first printed circuit board 611 through a conductive bonding member such as solder, and may be electrically connected to the first printed circuit board 611. The first connector 750 may be electrically connected to various other elements disposed in the first wireless communication circuit 730, the power management circuit 740, or the first printed circuit board 611 through at least one wiring line included in the first printed circuit board 611. The electronic device 500, for example, may include a second connector (not illustrated) mounted to the second printed circuit board 540. According to an embodiment, the electronic device 500 may include an electrical path (not illustrated) such as a flexible printed circuit board (FPCB) or a coaxial cable that electrically connects the first connector 750 and the second connector.

Referring to FIG. 5A, in an embodiment, the electronic device 500 may include a second wireless communication module 502 (e.g., the wireless communication module 192 of FIG. 1) electrically connected to the second printed circuit board 540, a processor 504 (e.g., the processor 120 of FIG. 1), a memory 505 (e.g., the memory 130 of FIG. 1), a power management module 506 (e.g., the power management module 188 of FIG. 1), or at least one antenna 507.

The second printed circuit board 540, for example, may include a third surface 540a and a fourth surface (not illustrated) that face opposite directions. In an embodiment, referring to FIGS. 5A, 5B, 7A, and 7B, the second surface 611b of the first printed circuit board 611 may face the third surface 540a of the second printed circuit board 540. The first wireless communication module 501, the second wireless communication module 502, the processor 504, the power management module 506, or the memory 505 may be disposed in or coupled to the second printed circuit board 540 through a conductive bonding member (not illustrated) such as solder.

According to an embodiment, at least one antenna 507 (e.g., the first antenna module 242 or the second antenna module 244 of FIG. 2) may be electrically connected to the second printed circuit board 540 through various electrical paths. In some embodiments, the at least one antenna 507 may be disposed in the second printed circuit board 540 or may be realized in a conductive pattern (e.g., a micro-strip) included in the second printed circuit board 540. According to various embodiments, the at least one antenna 507 may be disposed in a housing (not illustrated) that defines an external appearance of the electronic device 500 or may be realized by at least a portion (e.g., at least a portion of the side bezel structure 510) of the housing.

According an embodiment, the processor 504 may control at least one element (e.g., a hardware or software element) of the electronic device 500 electrically connected to the processor 504 by executing software, and may perform various data processing or calculations. According to an embodiment, the processor 504 may process a command or data stored in the memory 505. For example, the processor 504 may transmit and/or receive a signal through the first wireless communication module 501 or the second wireless communication module 502. The processor 504 may write and read data to and from the memory 505. The processor 504 may perform functions of a protocol stack required by communication standards. A portion of the second wireless communication module 502 and/or the processor 504 may be referred to as a communication processor (CP).

According to an embodiment, the second wireless communication module 502 may perform functions for transmitting and receiving a signal through a wireless channel. For example, the second wireless communication module 502 may perform a conversion function between a baseband signal and/or a bit array according to a physical layer standard of a system. For example, when data are transmitted, the second wireless communication module 502 may generate complex symbols by encoding and modulating a transmission bit array. When data are received, the second wireless communication module 502 may restore a bit array by decoding and demodulating a baseband signal. The second wireless communication module 502 may up-convert an RF signal and transmit the RF signal through at least one antenna, and may down-convert the RF signal received through the at least one antenna to a baseband signal. For example, the second wireless communication module 502 may include elements such as a transmission filter, a reception filter, an amplifier, a mixer, an oscillator, a digital-to-analog converter (DAC), and an analog-to-digital converter (ADC).

According to an embodiment, the second wireless communication module 502 may include a plurality of wireless communication circuits to process signals of different frequency bands. For example, the second wireless communication module 502 may include a plurality of wireless communication circuits to support a plurality of different wireless connection technologies. For example, the different wireless connection technologies may include Bluetooth low energy (BLE), Wi-Fi, Wi-Fi Gigabyte (WiGig) or a cellular network (e.g., LTE (long term evolution)). Further, the different frequency bands may include a super high frequency (SHF) (e.g., about 2.5 GHz or about 5 GHz) band or a millimeter wave (e.g., about 60 GHz) band.

According to an embodiment, the second wireless communication module 502 may include a baseband processor, at least one communication circuit (e.g., an intermediate frequency integrated circuit (IFIC)), or an RFIC. The second wireless communication module 502, for example, may include a baseband processor that is separate from the processor 504 (e.g., an application processor (AP)).

According to an embodiment, the first wireless communication module 501 may include a first wireless communication circuit 730. The second wireless communication module 502 may include at least one of a second wireless communication circuit 5022 or a third wireless communication circuit 5032. The electronic device 500 may further include one or more interfaces for supporting communication between chips, between the second wireless communication module 502 and the processor 504. The processor 504, the first wireless communication circuit 730, the second wireless communication circuit 5022, or the third wireless communication circuit 5023 may transmit or receive data (or a signal) by using an interface (e.g., an inter processor communication channel) between chips.

According to an embodiment, the second wireless communication circuit 5022 or the third wireless communication circuit 5023 may provide an interface for performing communication with other objects. The second wireless communication circuit 5022, for example, may support wireless communication for a second network (e.g., the second cellular network 294 of FIG. 2) that utilizes an antenna module 610. The third wireless communication circuit 5023, for example, may support wireless communication for a first network (e.g., the first cellular network 292 of FIG. 2) that utilizes at least one antenna 507. According to an embodiment, the first network may include a 4th generation (4G) network, and the second network may include a 5th generation (5G) network. The 4G network, for example, may support a long term evolution (LTE) protocol ruled by 3GPP. The 5G network, for example, may support a new radio (NR) protocol ruled by 3GPP. According to various embodiments, the first network may be related to Wi-Fi or a global positioning system (GPS).

According to an embodiment, the third wireless communication circuit 5023 may receive a signal (hereinafter, a radio frequency (RF) signal) of high frequency for the first network (e.g., the 4G network) through at least one antenna 507, and may modulate (e.g., down-convert) the received RF signal to a signal (hereinafter, a baseband signal) of low frequency and transmit the modulated RF signal to the processor 504. The third wireless communication circuit 5023 may receive a baseband signal for the first network from the processor 504, and may modulate (e.g., up-convert) the received baseband signal to an RF signal and transmit the modulated baseband signal to the outside through at least one antenna 507. According to an embodiment, the first wireless communication circuit 730 of the first wireless communication module 501 may include an RFIC. According to various embodiments, when the RF signal is modulated to a baseband signal or a baseband signal is modulated to an RF signal, an input by a local oscillator (LO) may be utilized.

According to an embodiment, the second wireless communication circuit 5022 may receive a baseband signal for the second network from the processor 504. The second wireless communication circuit 5022 may up-convert a baseband signal to an IF signal by utilizing an input (hereinafter, an LO signal) by the LO, and transmit an IF signal to the antenna module 610. The antenna module 610 may receive an IF signal from the second wireless communication circuit 5022. The antenna module 610 may up-convert an IF signal to an RF signal by utilizing an LO signal, and may transmit the RF signal to the outside through one or more antenna arrays 710 and 720 included in the antenna module 610.

According to an embodiment, the antenna module 610 may receive an RF signal through one or more antenna arrays 710 and 720. The antenna module 610 may down-convert an RF signal to an IF signal by utilizing an LO signal, and may transmit the IF signal to the second wireless communication circuit 5022. The second wireless communication circuit 5022 may receive an IF signal from the antenna module 610. The second wireless communication circuit 5022 may down-convert an IF signal to a baseband signal by utilizing an LO signal, and may transmit a baseband signal to the processor 504. According to an embodiment, the second wireless communication circuit 5022 may include an IFIC. The second wireless communication circuit 5022 may transmit and/or receive a second signal of a frequency band of about 5 GHz to about 15 GHz.

According to an embodiment, the second wireless communication circuit 5022 or the first wireless communication circuit 730 may include a plurality of transmission/reception paths. For example, the second wireless communication circuit 5022 or the first wireless communication circuit 730 may include a beam forming system that processes a transmitted or received signal such that energy radiated from the plurality of antenna elements of the first antenna array 710 or the second antenna array 720 are concentrated on a specific direction in a space. The beam forming system may allow a strong signal to be received in a desired direction or delivered in a desired direction, or may prevent a signal coming from an undesired direction from being received. The beam forming system may adjust the form and the direction of beam by using a difference between the amplitudes or phases of carrier signals in an RF band. According to an embodiment, the second wireless communication circuit 5022 or the first wireless communication circuit 730 may be controlled to have a phase difference for the antenna elements. For example, the second wireless communication circuit 5022 or the first wireless communication circuit 730 may include a first electrical path electrically connected to a first point on the first antenna element and a second electrical path electrically connected to a second point on the second antenna element. The processor 504, the second wireless communication circuit 5022, or the first wireless communication circuit 730 may provide a phase difference between a first signal at the first point and a second signal at the second point. According to various embodiments (not illustrated), the electronic device 500 may include one or more phase shifters disposed in the antenna module 610 (or the first wireless communication circuit 730) or the first printed circuit board 540. The one or more phase shifters may adjust the phases for the plurality of antenna elements of the first array 710 or the second antenna array 720.

For example, the beam forming system may form a beam pattern (e.g., the width and the direction of a beam) by adjusting the phases of current supplied to the plurality of antenna elements 711, 712, 713, and 714 of the first antenna array 710 and the plurality of antenna elements 721, 722, 723, and 724 of the second antenna array 720. According to an embodiment, by the beam forming system, the plurality of antenna elements 711, 712, 713, and 714 of the first antenna array 710 may form a beam that radiates a relatively large amount of energy in the first direction (e.g., a +z axis direction), which the first surface 611a of the first printed circuit board 611 faces. According to an embodiment, by the beam forming system, the plurality of antenna elements 721, 722, 723, and 724 of the second antenna array 720 may form a beam that radiates a relatively large amount of energy in the second direction (e.g., a +y axis direction), which is perpendicular to the first direction and faces the third side surface part 513.

According to an embodiment, the memory 505 may store codebook information on beam forming. The processor 504, the first wireless communication circuit 730, or the second wireless communication circuit 5022 may efficiently control (e.g., allocate or dispose) a plurality of beams through the plurality of antenna elements of the first antenna array 710 or the second antenna array 720, based on the codebook information.

According to various embodiments, the second wireless communication module 502 including the second wireless communication circuit 5022 and/or the third wireless communication circuit 5023 may form one module together with the processor 504. For example, the second wireless communication module 502 may be integrally formed with the processor 504. In some embodiments, the second wireless communication circuit 5022 and/or the third wireless communication circuit 5023 may be disposed in one chip or may be formed in the form of independent chips.

According to an embodiment, the processor 504 and one wireless communication circuit (e.g., the second wireless communication circuit 5022) may be integrally formed in one chip (SoC chip), and another wireless communication circuit (e.g., the third wireless communication circuit 5023) may be formed in the form of an independent chip.

According to an embodiment, the power management module 506 may manage electric power supplied to the electronic device 500 by using a battery (e.g., the battery 189 of FIG. 1) electrically connected to the second printed circuit board 540.

Referring to FIG. 7B, in an embodiment, the power management circuit 740 may be disposed on or coupled to the second surface 611b of the first printed circuit board 611 through a conductive bonding member such as solder, and may be electrically connected to the first printed circuit board 611. The power management circuit 740 may be electrically connected to various other elements (e.g., a passive element) (not illustrated) disposed in the first wireless communication circuit 730, the first connector 750, or the first printed circuit board 611 through at least one wiring line included in the first printed circuit board 611. The power management circuit 740 may receive electric power from the power management module 506 of FIG. 5A through an electrical path such as an FPCB or a coaxial cable, and may manage electric power supplied to the antenna module 610 by using the received electric power. According to an embodiment, the power management circuit 740, for example, may be implemented as at least a part of a power management integrated circuit (PMIC).

According to some embodiments, the power management circuit 740 may be omitted from the antenna module 610. For example, the power management module 506 may manage the electric power supplied to the antenna module 610.

According to an embodiment, the rear plate 580 may be formed of an insulator such as glass or a polymer or a dielectric material. According to an embodiment, the conductive layer 620a may be disposed between the rear plate 580 and the second printed circuit board 540. According to an embodiment, the conductive layer 620a may be disposed in or coupled to the rear plate 580. For example, the conductive layer 620a may be formed by coating a conductive material on the rear plate 580 or by attaching a conductive film (e.g., a copper film) or a conductive plate (e.g., a copper plate) to the rear plate 580.

According to an embodiment, when viewed from the top of the rear plate 580, the conductive layer 620a may not overlap the antenna module 610. According to various embodiments, the rear plate 580 may not overlap one or more antenna arrays 710 and 720.

Referring to FIG. 5B, a film 620b may be disposed between the rear plate 580 and the second printed circuit board 540. The film 620b may include a specific pattern or color, and may be viewed from the outside through the rear plate 580. The film 620b may include a first area 621 formed of a nonconductive material and a second area 622 treated to have conductive characteristics in an area which does not overlap the antenna module 610. The film 620b may be formed to include a conductive material through a method of coating a conductive material in the second area 622 or depositing a conductive material.

Referring to FIG. 6, in an embodiment, when viewed from the top of the rear plate 580, the antenna module 610 may be disposed at least partially between the third side surface part 513 and the conductive layer 620 (or the conductive area).

Hereinafter, unless described otherwise, the conductive layer 620 may be understood as a concept including an area (e.g., the second area 622 of FIG. 5B) which, among the conductive layer 620a and the film 620b of FIG. 5B, includes a conductive material.

Referring to FIG. 6, in an embodiment, the electronic device 500 may include an antenna 570 (e.g., the at least one antenna 507) disposed between the rear plate 580 and the battery (e.g., the battery 450 of FIG. 4). According to an embodiment, the antenna 570 may be disposed in the rear plate 580. The antenna 570 (e.g., the antenna 470 of FIG. 4), for example, may include an NFC antenna, a wireless charging antenna, and/or an MST antenna. The antenna 570, for example, may perform near field communication with an external device, or may wirelessly transmit and receive electric power that is necessary for charging. According to an embodiment, when viewed from the top of the rear plate 580, the conductive layer 620 may be disposed between the antenna module 610 and the antenna 570.

In an embodiment, the antenna 570 may include a coil as an antenna radiator. In an embodiment, the antenna 570 may include a plurality of coils. For example, each of the coils may be configured to support one of NFC, wireless charging, or MST. In an embodiment, the antenna 570 may include a printed circuit board in which coils are disposed.

In the disclosure, unless described otherwise, the antenna 570 may be understood as a concept including an antenna radiator, a communication circuit that feeds electric power to the antenna radiator, and/or a ground connected to the antenna radiator. For example, the antenna 570 may include a printed circuit board including a communication circuit, and an antenna radiator (e.g., a conductive pattern or a conductive patch) integrally formed with the printed circuit board.

In an embodiment, the antenna 570 may include a nonconductive member disposed at a location that is adjacent to the rear plate. For example, the antenna 570 may include a conductive protective film laminated on the antenna radiator, and the conductive protective film may be attached to the rear plate. In an embodiment, when the antenna 570 includes a printed circuit board, the antenna may include a nonconductive member disposed between the printed circuit board and the rear plate. In an embodiment, the nonconductive member may include a dielectric material, such as polyimide or plastic.

In an embodiment, a printed circuit board including electronic components and conductive patterns related to an operation of the antenna 570 may be provided. The printed circuit board of the antenna 570 may include a material having a permittivity that is different from that of the rear plate 580. For example, when the rear plate 580 includes a material having a first permittivity, the printed circuit board of the antenna 570 may include a material having a second permittivity that is higher than the first permittivity.

Although not illustrated, in an embodiment of the disclosure, the antenna 570 disposed under the rear plate 580 may be replaced by another component. For example, the antenna 570 may be replaced by an electronic component, such as a camera module or a speaker module, which is disposed in an electronic device. As another example, the antenna 570 may be replaced by an antenna module that supports a millimeter wave that is different from that of the antenna module 610. As another example, the antenna 570 may be replaced by an antenna radiator integrally formed with the rear plate 580. In the embodiments, which will be described below, the antenna 570 may be understood as a concept that includes the components. For example, in FIGS. 5A to 30, the antenna 570 may be replaced by a speaker module.

In an embodiment, the antenna 570 (or a component that replaces the antenna 570, hereinafter, the same) may include a dielectric member. A dielectric member may include a dielectric material having a permittivity that is different from that of the rear plate. For example, the rear plate 580 may include a dielectric material having a first permittivity, and the dielectric member may include a dielectric material having a second permittivity. Because the antenna 570 includes the dielectric member, the antenna may have a permittivity that is different from that of the rear plate 580.

Referring to FIG. 5A, according to an embodiment, the conductive layer 620a may reduce an electrical influence, by the rear plate 580, on the antenna radiation characteristics (e.g., a beam pattern or a polarization state of electromagnetic waves) of the antenna module 610. This is because the conductive layer 620 can shield electromagnetic waves (or electromagnetic fields). In an embodiment, the conductive layer 620a may include a material, such as aluminum (Al), copper (Cu), and silver (Ag), which can shield electromagnetic waves.

According to an embodiment, the conductive layer 620a can prevent electromagnetic waves radiated from the first antenna array 710 and/or the second antenna array 720 of the antenna module 610 from propagating through the rear plate 580 to be delivered to electrical elements such as the antenna 570, and can reduce electrical influences, by the electromagnetic waves, on an electrical element such as the antenna 570.

For example, when the conductive layer 620a is omitted, the rear plate 580 is a waveguide, through which electromagnetic waves radiated from the first antenna array 710 and/or the second antenna array 720 of the antenna module 610 propagate, and may be operated as a path for a medium that allows the electromagnetic waves to propagate by using a total reflection property. The antenna radiation characteristics of the antenna module 610, for example, may include an antenna radiation pattern or a beam pattern that is a directional function which represents a relative distribution of electric power radiated from the antenna element 711, 712, 713, 714, 721, 722, 723, or 724, and a polarization state (or an antenna polarization) of electromagnetic waves radiated from the antenna element 711, 712, 713, 714, 721, 722, 723, or 724. When the rear plate 580 is operated as a waveguide, it may be difficult for the antenna module 610 to have antenna radiation characteristics corresponding to a selected or specified frequency, and accordingly, the antenna performance may deteriorate. When the electromagnetic waves radiated from the antenna module 610 is guided through the rear plate 580 and is delivered to the antenna 570, the antenna performance may deteriorate.

According to an embodiment, the antenna module 610 may form a first beam pattern, in which the beam patterns formed in the plurality of antenna elements 711, 712, 713, and 714 of the first antenna array 710 are combined with each other. The first beam pattern is an effective area in which the first antenna array 710 may radiate or detect electromagnetic waves, and may be formed by combining the radiated electric power of the plurality of antenna elements 711, 712, 713, and 714 of the first antenna array 710. According to an embodiment, the antenna module 610 may have a directivity by which electromagnetic wave energy may be concentrated or waves may be transmitted and received in a specific direction. For example, by the beam forming system, the first antenna array 710 may form a beam that radiates a relatively large amount of energy in the first direction (e.g., the +z axis direction), which the first surface 611a of the first printed circuit board 611 faces. For example, the first beam pattern may be in the form of a broadside. The first beam pattern in the form of a broadside may include a main lobe in a direction in which radiation energy becomes maximal substantially without side lobes. According to an embodiment, the first beam pattern may include a main lobe that is formed substantially in the first direction (e.g., the +z axis direction) that faces the first surface 611a of the first printed circuit board 611. When the conductive layer 620 is omitted, at least some of the electromagnetic fields formed by the first antenna array 710 may be reflected on the rear plate 580, and the reflected components may cause compensations and/or interferences in the maximal radiation direction (boresight) (e.g., the direction of the main lobe), causing deformation (distortion) of the first beam pattern. The deformation (distortion) of the first beam pattern, for example, may include a null formed between the lobes (e.g., radiation groups in which energy distributions of the electromagnetic waves are divided in various directions) of the first beam pattern. The null, for example, may indicate an ineffective area in which the first antenna array 710 cannot radiate or detect the electromagnetic waves. The null, for example, may indicate a direction in which the radiation intensity is substantially 0. According to an embodiment, the conductive layer 620 can prevent deformation (e.g., distortion) of the first beam pattern by reducing propagation of the electromagnetic waves (or waves) radiated from the first antenna array 710 through the rear plate 580 by total reflection.

When there is no conductive layer 620, the electromagnetic waves generated in the antenna module 610 and propagating through the rear plate 580 may be total-reflected in the interior of the rear plate 580. The electromagnetic waves radiated to the outside of the electronic device again as a part of the electromagnetic waves total-reflected in the interior of the rear plate 580 may lower the performance of the main beam (that is, a first beam) of the antenna module 610.

According to an embodiment, the conductive layer 620 can prevent electromagnetic waves (or waves) radiated from the first antenna array 710 from propagating through the rear plate 580 to be delivered to electrical elements such as the antenna 570, and can reduce electrical influences, by the electromagnetic waves, on an electrical element such as the antenna 570. For example, the conductive layer 620 may shield or damp the electromagnetic waves (or waves) radiated from the first antenna array 710 between the antenna module 610 and the antenna 570. According to an embodiment, the conductive layer 620 may reduce electrical influences on the frequency bands for the antenna 570 by the electromagnetic waves (or waves) radiated from the first antenna array 710.

According to an embodiment, the electromagnetic waves radiated from the first antenna array 710 may include dually polarized waves. For example, the antenna module 610 may radiate horizontally polarized waves (H-pols) and vertically polarized waves (V-pols) through the first antenna array 710. The polarizations may be in the direction of electric fields of the antenna. According to an embodiment, the horizontally polarized waves are linear polarizations in which the directions of the electric field vectors are horizontal, and may be parallel to the ground plane (e.g., a ground plane that is parallel to the x-y plane) included in the first printed circuit board 611. According to an embodiment, the vertically polarized waves may be linear polarizations in which the directions of the electric field vectors are vertical, and may be perpendicular to the ground plane included in the first printed circuit board 611. The ground plane may be related to the radiation characteristics of the antenna module 610. For example, the radiation characteristics of the antenna module 610 may be determined based on a distance, by which the plurality of antenna elements included in the first antenna array 710 or the second antenna array 720 are spaced apart from the ground plane. For example, the radiation characteristics of the antenna module 610 may be determined based on the form (e.g., the width, the length, or the thickness) of the ground plane. For example, the radiation characteristics of the antenna module 610 may be determined based on an insulating material (e.g., the permittivity) between the plurality of antenna elements included in the first antenna array 710 or the second antenna array 720 and the ground plane.

According to an embodiment, the plurality of antenna elements 711, 712, 713, and 714 of the first antenna array 710 may form horizontally polarized waves and vertically polarized waves through single feeding or multiple feeding. According to an embodiment, the location or the number of the feeding parts for the plurality of antenna elements 711, 712, 713, and 714 of the first antenna array 710 may be variously set in consideration of impedance matching.

According to an embodiment, the film 620b including the conductive layer 620a or the conductive material is not limited to the form illustrated in FIG. 5A or 5B, and may be variously formed according to a boundary condition of the horizontally polarized waves for the rear plate 580 such that the deformation (or distortion) of the horizontally polarized waves radiated from the first antenna array 710 and the horizontally polarized waves can reduce an influence on an electrical element such as the antenna 570.

According to an embodiment, the form of the conductive layer 620 may be related to the length of a wave that may shield noise (e.g., at least some of electromagnetic waves radiated from the antenna module 610) for a frequency selected or specified by an antenna system that utilizes the antenna 570. For example, when the selected or specified frequency is 2.4 GHz, the length of the conductive layer 620 in the y axis direction may be realized at a wavelength (about 30 mm) of 2.4 GHz or its threshold range. According to various embodiments, the antenna system may transmit or receive a frequency signal on Wi-Fi, 2G, 3G, LTE, 5G, or other various networks, and the conductive layer 620 may be formed to have a wavelength for the corresponding frequency.

In an embodiment, the conductive layer 620 may be located on waveguide paths (p) of, among the electromagnetic waves radiated from the antenna module 610, the electromagnetic waves that face the y axis direction. In an embodiment, the conductive layer 620 may be configured to shield electromagnetic fields that face the y axis direction or substantially the y axis direction from the antenna module 610. Accordingly, in an embodiment, the conductive layer 620 may have a width that is larger than that of the antenna module 610. Referring to FIG. 6, the antenna module 610 may have a first width w1 in a second direction (that is, the +x axis direction) that is substantially perpendicular to the first direction (that is, the y axis direction) that faces the antenna 570 from the antenna module 610. The width w2 in the second direction of the conductive layer 620 may be larger than the first width w1 of the antenna module 610. Because the conductive layer 620 is configured to have a width that is larger than that of the antenna module 610, the electromagnetic fields that propagate in the first direction from the antenna module 610 through the rear plate 580 can be shielded.

In an embodiment, a first distance d1 between the conductive layer 620 and the antenna module 610 may be shorter than the second distance d2 between the conductive layer 620 and the antenna 570.

According to an embodiment, although not illustrated, the electronic device 500 may include an additional conductive layer between the antenna module 610 and the first side surface part 511. For example, the conductive layer 620 may extend between the antenna module 610 and the first side surface part 511. The conductive layer disposed between the antenna module 610 and the first side surface part 511 can prevent deformation (or distortion) of the vertically polarized waves, and can reduce an electrical influence on at least one electrical element between the first side surface part 511 and the antenna module 610 by the horizontally polarized waves.

According to an embodiment, the antenna module 610 may form a second beam pattern, in which the beam patterns formed in the plurality of antenna elements 721, 722, 723, and 724 of the second antenna array 72—are combined with each other. The second beam pattern is an effective area in which the second antenna array 720 may radiate or detect electromagnetic waves, and may be formed by combining the radiation power of the plurality of antenna elements 721, 722, 723, and 724 of the second antenna array 720. For example, the second beam pattern may be in the form of an end-fire. A main lobe and a side lobe that are radiation groups, in which energy distributions of electromagnetic waves radiated from the second antenna array 720 are divided in several directions, may be provided. For example, in the main lobe of the second beam pattern, the radiation energy may be formed substantially in the second direction (e.g., the +y axis direction) that faces the third side surface part 513.

Figure 8:
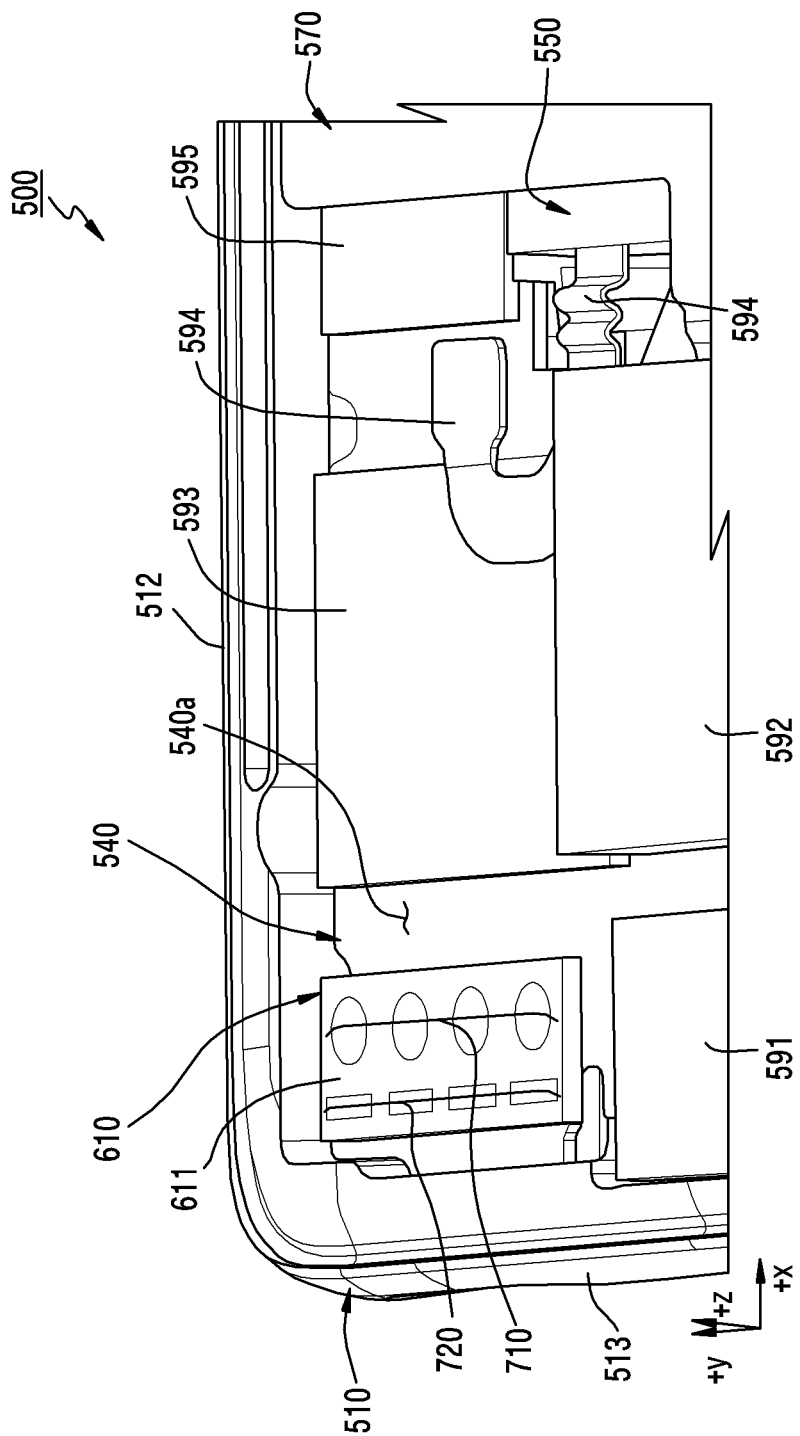
FIG. 8 is a perspective view of the electronic device of FIG. 5A according to an embodiment of the disclosure.

FIG. 8 is a perspective view of the electronic device of FIG. 5A according to an embodiment of the disclosure.

Figure 9:
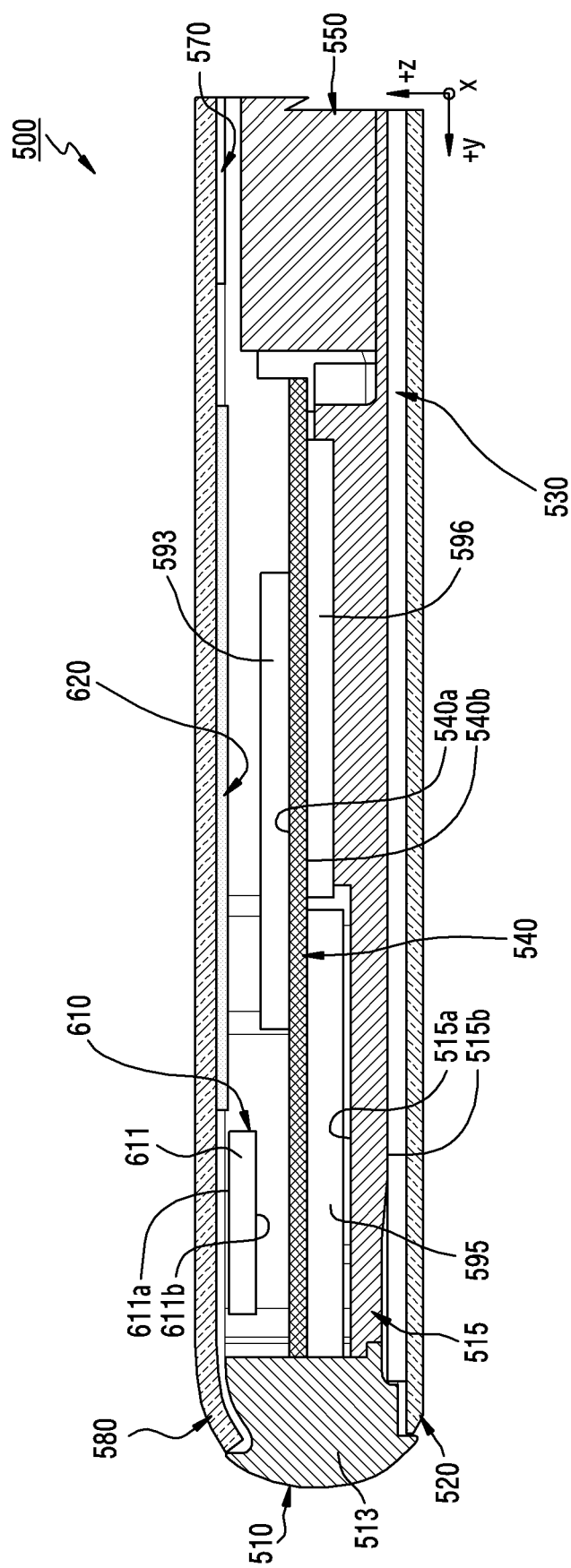
FIG. 9 is a cross-sectional view of the electronic device of FIG. 8 according to an embodiment of the disclosure.

FIG. 9 is a cross-sectional view of the electronic device of FIG. 8 according to an embodiment of the disclosure.

Referring to FIGS. 8 and 9, in an embodiment, an electronic device 500 may include a front plate 520, a side bezel structure 510, a support member 515, a display 530, a second printed circuit board 540, a battery 550, an antenna 570, a rear plate 580, an antenna module 610 or a conductive layer 620. At least one of the elements of the electronic device 500 may be the same as or similar to at least one of the elements illustrated in FIG. 5A, and a repeated description thereof will be omitted below.

The front plate 520, for example, may be the front plate 302 of FIG. 3A or the front plate 420 of FIG. 4. The support member 515, for example, may be the first support member 411 of FIG. 4. The support member 515 may be connected to the side bezel structure 510 or may be integrally formed with the side bezel structure 510.

According to an embodiment, the support member 515 may include one surface 515a, on which the second printed circuit board 540 is disposed, and an opposite surface 515b, on which the display 530 (e.g., the display 430 of FIG. 4) is disposed. The battery 550 may be electrically connected to the second printed circuit board 540 through an electrical path 594 such as an FPCB.

The electronic device 500 may include various electrical elements 591, 592, 593, and 595 disposed in the second printed circuit board 540. For example, the electrical elements 591, 592, and 593 may include an audio receiver 591, a camera 592 (e.g., the second camera device 312 of FIG. 3B), a communication circuit (e.g., the Wi-Fi integrated circuit (IC)) 593, or a memory card connector (e.g., an SIM card connector) 595. The second printed circuit board 540 may include a third surface 540a that faces the rear plate 580, and a fourth surface 540b that faces the front plate 520. The various electrical elements such as the audio receiver 591, the camera 592, or the communication circuit 593 may be disposed on the third surface 540a. The various elements such as the memory card connector 595 or the IC 596 may be disposed on the fourth surface 540b. The other various electrical elements (e.g., the elements included in the electronic device 101 of FIG. 1) may be disposed on the third surface 540a or the fourth surface 540b of the first printed circuit board 540.

According to an embodiment, the antenna module 610 may be disposed between the rear plate 580 and the second printed circuit board 540. Although not illustrated, the antenna module 610 may be disposed in (or coupled to) a part that is connected to the support member 515 or extends from the support member 515. The antenna module 610 may include a second printed circuit board 611 including the first antenna array 710 and/or the second antenna array 720. The first printed circuit board 611 may include a first surface 611a that faces the rear plate 580, and a second surface 611b that faces the second printed circuit board 540. According to an embodiment, the first surface 611a (or the second surface 611b) of the first printed circuit board 611 may be substantially parallel to the third surface 540a or the fourth surface 540b of the second printed circuit board 540.

In the illustrated embodiment, the antenna module 610 may be spaced apart from the rear plate 580 by a predetermined interval. For example, an air gap may be present between the antenna module 610 and the rear plate 580. In another embodiment, the antenna module 610 may be adjacent to the rear plate 580. For example, the antenna module 610 may be attached to the rear plate 580.

The conductive layer 620, for example, may be attached to the rear plate 580. According to an embodiment, when viewed from the top of the rear plate 580, the conductive layer 620 may be disposed in the rear plate 580 not to overlap the antenna module 610. According to an embodiment, when viewed from the top of the rear plate 580, the antenna module 610 may be disposed between the third side surface part 513 and the conductive layer 620.

The antenna 570, for example, may be attached to the rear plate 580. According to another embodiment, the antenna 570 may be attached to the battery 550. According to an embodiment, when viewed from the top of the rear plate 580, the conductive layer 620 may be disposed between the antenna module 610 and the antenna 570.

According to an embodiment, the conductive layer 620 can reduce propagation of the electromagnetic waves (e.g., the horizontally polarized waves or the vertically polarized waves) radiated from the first antenna array 710 or the second antenna array 720 through the rear plate 580 by total reflection to prevent deformation (e.g., distortion) of the electromagnetic waves. For example, when the conductive layer 620 is omitted, the electromagnetic waves can be reflected on the rear plate 580, and the reflected components can cause deformation (or distortion) of the electromagnetic waves while causing compensations and/or interference.

According to an embodiment, the conductive layer 620 can prevent electromagnetic waves (or horizontally polarized waves or vertically polarized waves) radiated from the first antenna array 710 or the second antenna array 720 from propagating through the rear plate 580 to be delivered to electrical elements such as the antenna 570, and can reduce electrical influences, by the electromagnetic waves, on an electrical element such as the antenna 570. For example, the conductive layer 620 can shield or damp the electromagnetic waves between the antenna module 610 and the antenna 570. According to an embodiment, the conductive layer 620 can reduce electrical influences, by the electromagnetic waves, on the frequency bands for the antenna 570.

According to an embodiment, when viewed from the top of the rear plate 580, the conductive layer 620 may be disposed at least to overlap the communication circuit (e.g., the Wi-Fi IC) 593. The conductive layer 620 can reduce electrical influences, by the electromagnetic waves radiated from the first antenna array 710 or the second antenna array 720, on the communication circuit 593, and then can secure the performance of the communication circuit 593.

Figure 10:
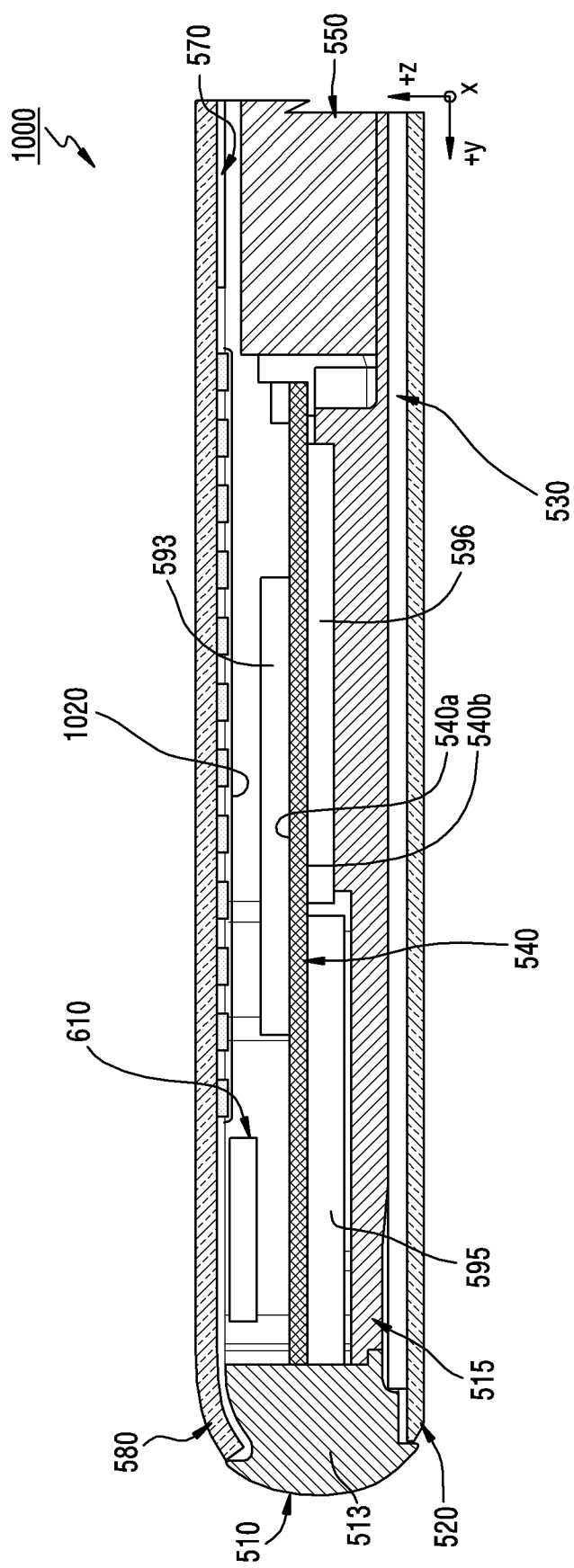
FIG. 10 is a perspective view of the electronic device of FIG. 5A according to an embodiment of the disclosure.

FIG. 10 is a perspective view of the electronic device of FIG. 5A according to an embodiment of the disclosure.

Referring to FIG. 10, in an embodiment, an electronic device 1000 may include a front plate 520, a side bezel structure 510, a support member 515, a display 530, a second printed circuit board 540, electrical elements 591, 592, 593, and 595, a battery 550, an antenna 570, a rear plate 580, an antenna module 610 or a conductive layer 1020. At least one of the elements of the electronic device 1000 may be the same as or similar to at least one of the elements illustrated in FIG. 9, and a repeated description thereof will be omitted below.

According to an embodiment, the conductive layer 1020 may replace the conductive layer 620 of FIG. 9. In an embodiment, the conductive layer 1020 may include a plurality of conductive patterns that are physically separated from each other. According to another embodiment (not illustrated), the conductive layer 1020 may be in the form including a plurality of openings. According to an embodiment, the conductive layer 1020 may be an electromagnetic band gap (EBG) structure for preventing an electromagnetic band gap (EBG) phenomenon. The EBG structure, for example, may be a structure that prevents at least some of the electromagnetic waves radiated from the antenna module 610 from being delivered to the antenna 570 as noise.

According to an embodiment, the plurality of conductive patterns included in the conductive layer 1020 may be arranged in the y axis direction at a predetermined interval. According to an embodiment, the interval between the plurality of patterns or the widths of the conductive patterns may be related to the length of a wave that may shield noise (e.g., at least some of electromagnetic waves radiated from the antenna module 610) for a frequency selected or specified by an antenna system that utilizes the antenna 570.

Figure 11:
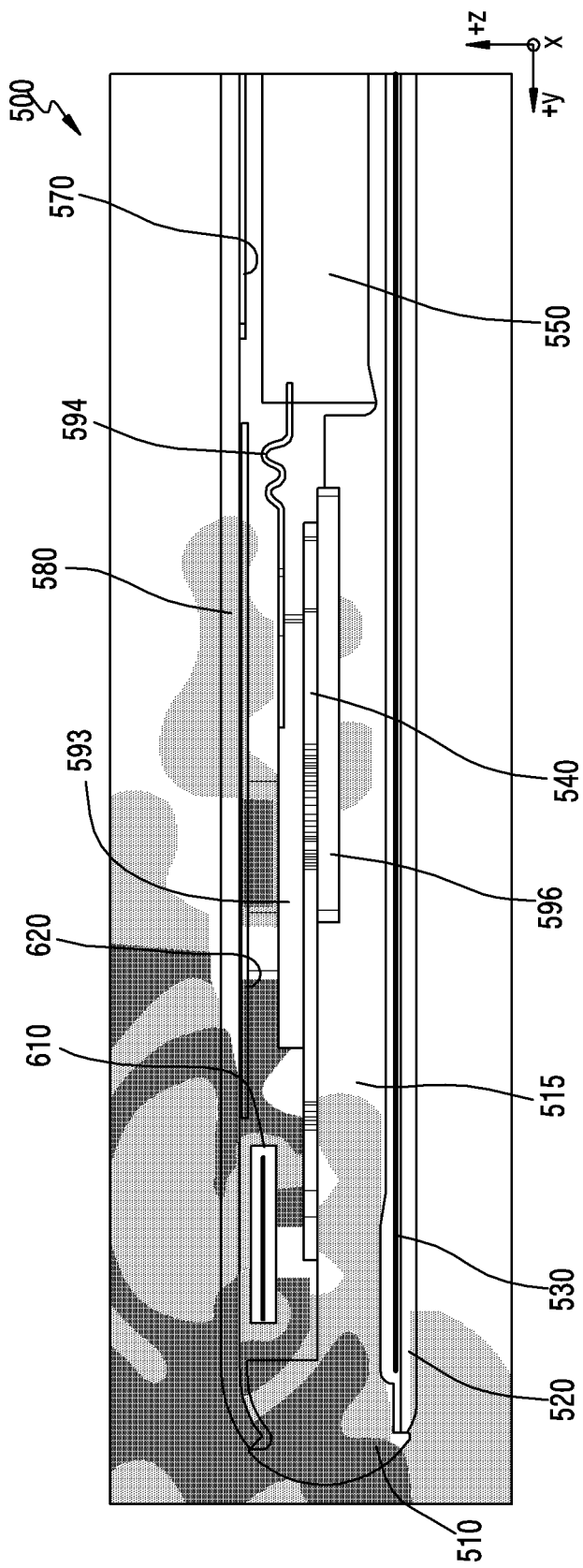
FIG. 11 illustrates a radiation pattern for horizontally polarized waves radiated from an antenna module in the electronic device of FIG. 9 according to an embodiment of the disclosure.
Figure 12:
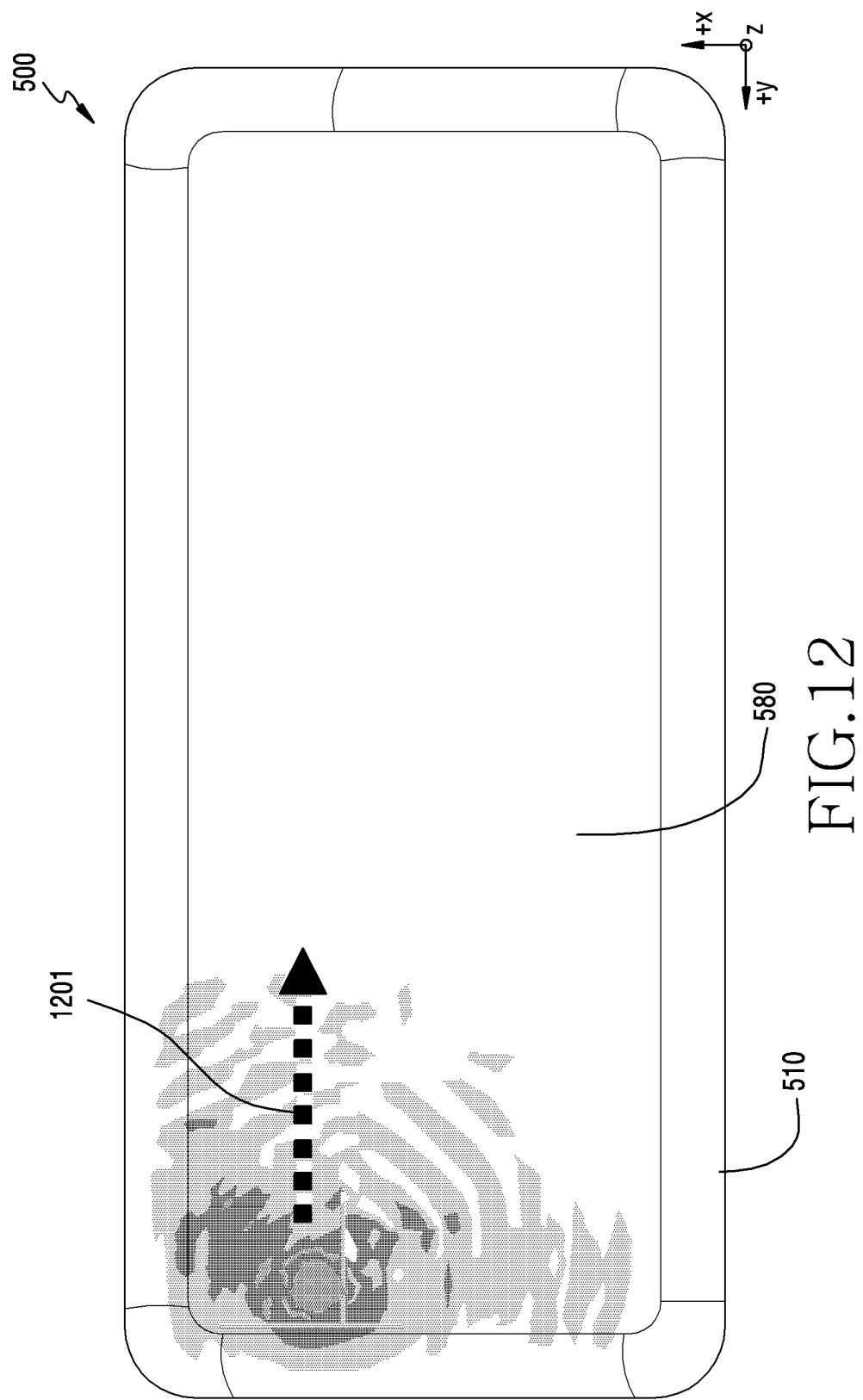
FIG. 12 illustrates a radiation pattern for horizontally polarized waves radiated from an antenna module in the electronic device of FIG. 9 according to an embodiment of the disclosure.

FIG. 11 illustrates a radiation pattern for horizontally polarized waves radiated from an antenna module in the electronic device of FIG. 9 according to an embodiment of the disclosure, and FIG. 12 illustrates a radiation pattern for a horizontally polarized waves radiated from an antenna module in the electronic device of FIG. 9 according to an embodiment of the disclosure.

Figure 13:
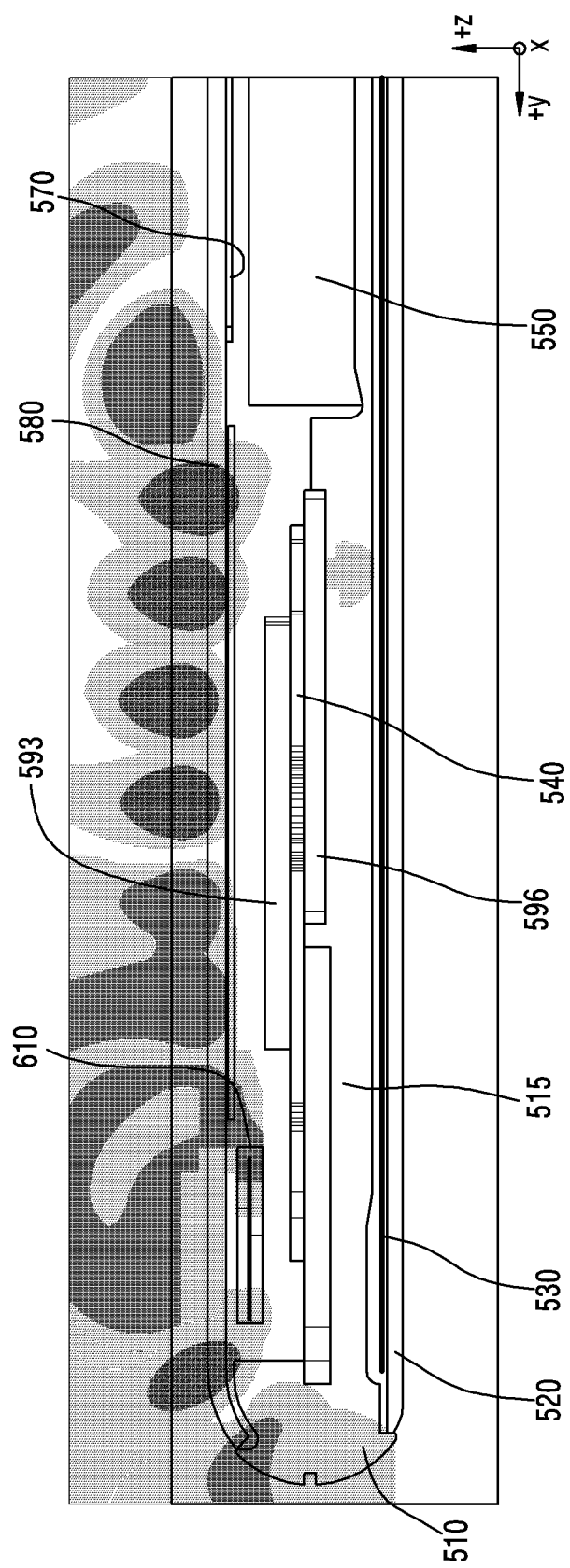
FIG. 13 illustrates a radiation pattern for vertically polarized waves radiated from an antenna module, for example, when a conductive layer is omitted from the electronic device of FIG. 9, according to an embodiment of the disclosure.
Figure 14:
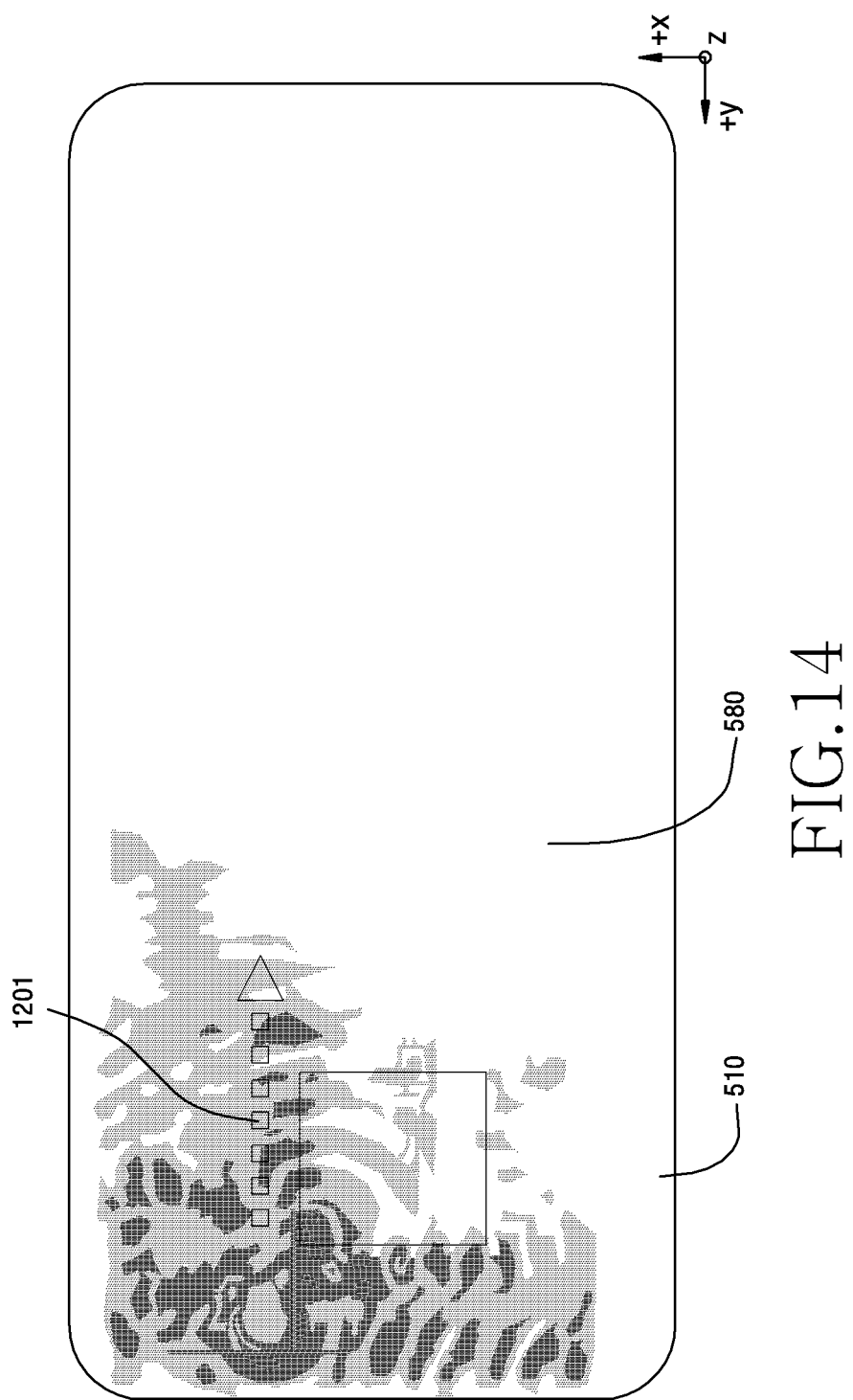
FIG. 14 illustrates a radiation pattern for vertically polarized waves radiated from an antenna module, for example, when a conductive layer is omitted from the electronic device of FIG. 9, according to an embodiment of the disclosure.

FIG. 13 illustrates a radiation pattern for vertically polarized waves radiated from an antenna module, for example, when a conductive layer is omitted from the electronic device of FIG. 9, according to an embodiment of the disclosure, and FIG. 14 illustrates a radiation pattern for vertically polarized waves radiated from an antenna module, for example, when a conductive layer is omitted from the electronic device of FIG. 9, according to an embodiment of the disclosure.

Referring to FIG. 11, in an embodiment, an electronic device 500 may include a front plate 520, a side bezel structure 510, a support member 515, a display 530, a second printed circuit board 540, electrical elements 591, 592, 593, 595, and 596, a battery 550, an antenna 570, a rear plate 580, an antenna module 610 or a conductive layer 620.

Referring to FIGS. 13 and 14, when the conductive layer 620 is omitted, at least some of the electromagnetic waves (e.g., the horizontally polarized waves or the vertically polarized waves) radiated from the antenna module 610 may be reflected on the rear plate 580, and the reflected components may cause deformation (or distortion) of the electromagnetic waves while causing compensations and/or interferences.

When the conductive layer 620 is omitted, at least some of the horizontally polarized waves radiated from the antenna module 610 may be guided in the −y axis direction 1201 through the rear plate 580 that is operated as a waveguide. The deformation (or distortion) of the horizontally polarized waves, for example, may include a null formed between the lobes of the horizontally polarized waves.

When there is no conductive layer 620, the electromagnetic waves generated in the antenna module 610 and propagating through the rear plate 580 may be total-reflected in the interior of the rear plate 580. The electromagnetic waves radiated to the outside of the electronic device again as a part of the electromagnetic waves total-reflected in the interior of the rear plate 580 may lower the performance of the main beam of the antenna module 610. Referring to FIG. 13, several circular electric waves may be formed along the rear plate 580 by the electromagnetic waves radiated to the outside of the electronic device again.

Referring to FIGS. 11 and 12, the conductive layer 620 can reduce propagation of the electromagnetic waves radiated from the antenna module 610 through the rear plate 580 by total reflection to prevent deformation (e.g., distortion) of the electromagnetic waves For example, the conductive layer 620 can reduce propagation of the horizontally polarized waves radiated from the antenna module 610 to the −y axis direction 1201 through the rear plate 580. According to an embodiment, the conductive layer 620 can prevent electromagnetic waves radiated from the antenna module 610 from propagating through the rear plate 580 to be delivered to electrical elements such as the antenna 570, and can reduce electrical influences, by the electromagnetic waves, on an electrical element such as the antenna 570.

Figure 15:
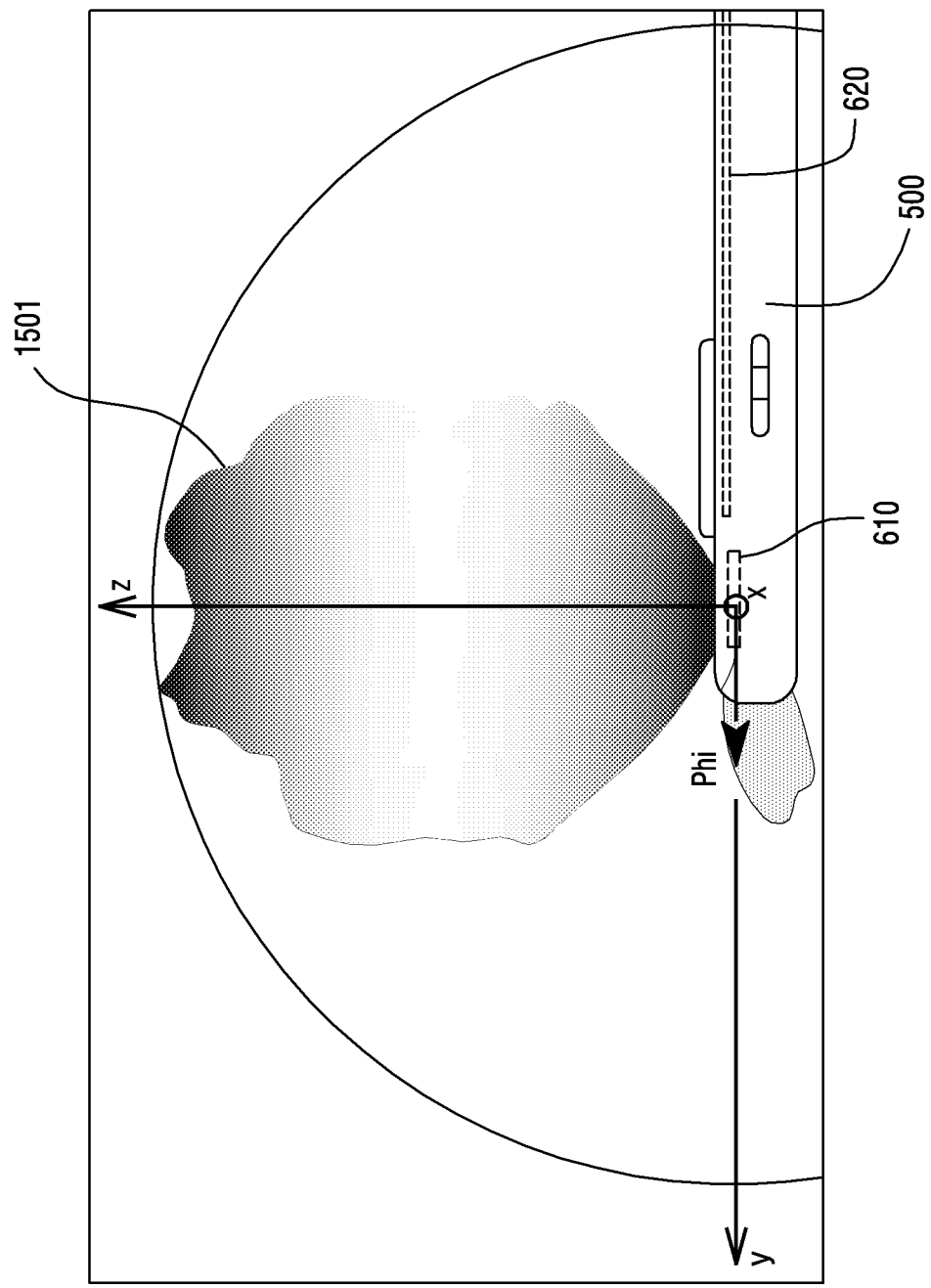
FIG. 15 illustrates a beam pattern for horizontally polarized waves radiated from an antenna module in the electronic device of FIG. 9 according to an embodiment of the disclosure.
Figure 16:
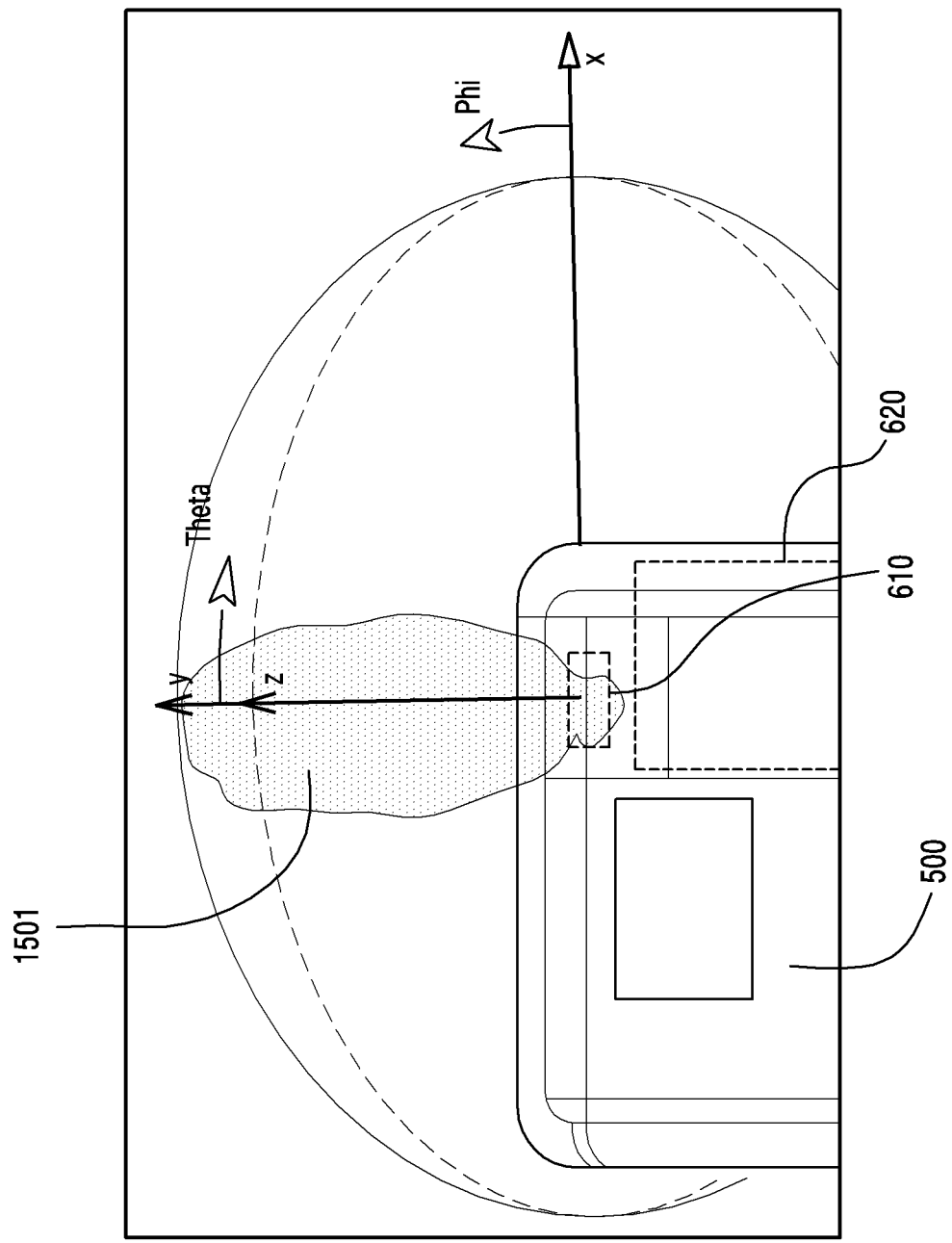
FIG. 16 illustrates a beam pattern for horizontally polarized waves radiated from an antenna module in the electronic device of FIG. 9 according to an embodiment of the disclosure.

FIG. 15 illustrates a beam pattern for horizontally polarized waves radiated from an antenna module in the electronic device of FIG. 9 according to an embodiment of the disclosure, and FIG. 16 illustrates a beam pattern for horizontally polarized waves radiated from an antenna module in the electronic device of FIG. 9 according to an embodiment of the disclosure.

Figure 17:
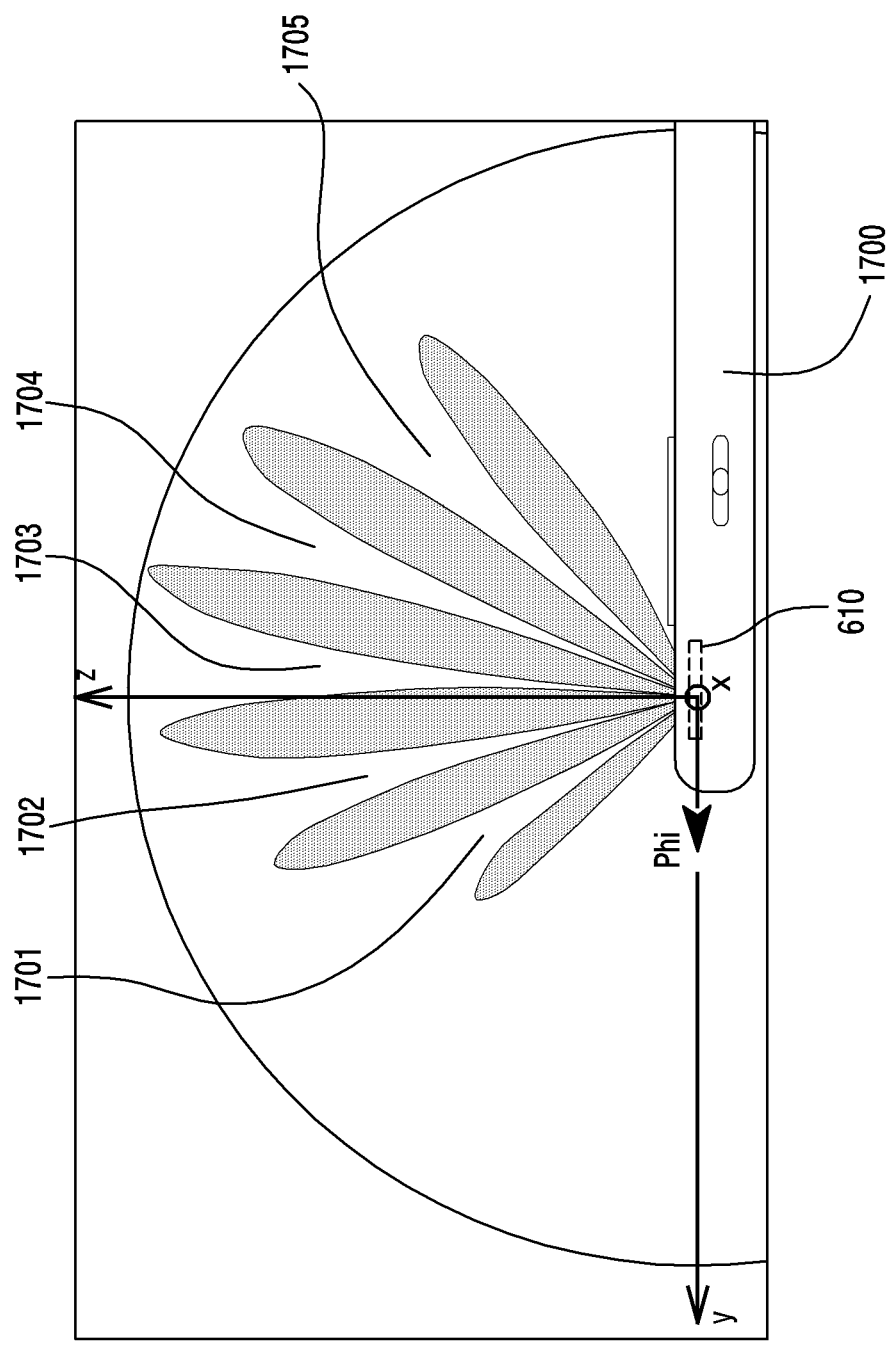
FIG. 17 illustrates a beam pattern for vertically polarized waves radiated from an antenna module, for example, when a conductive layer is omitted from the electronic device of FIG. 9, according to an embodiment of the disclosure.
Figure 18:
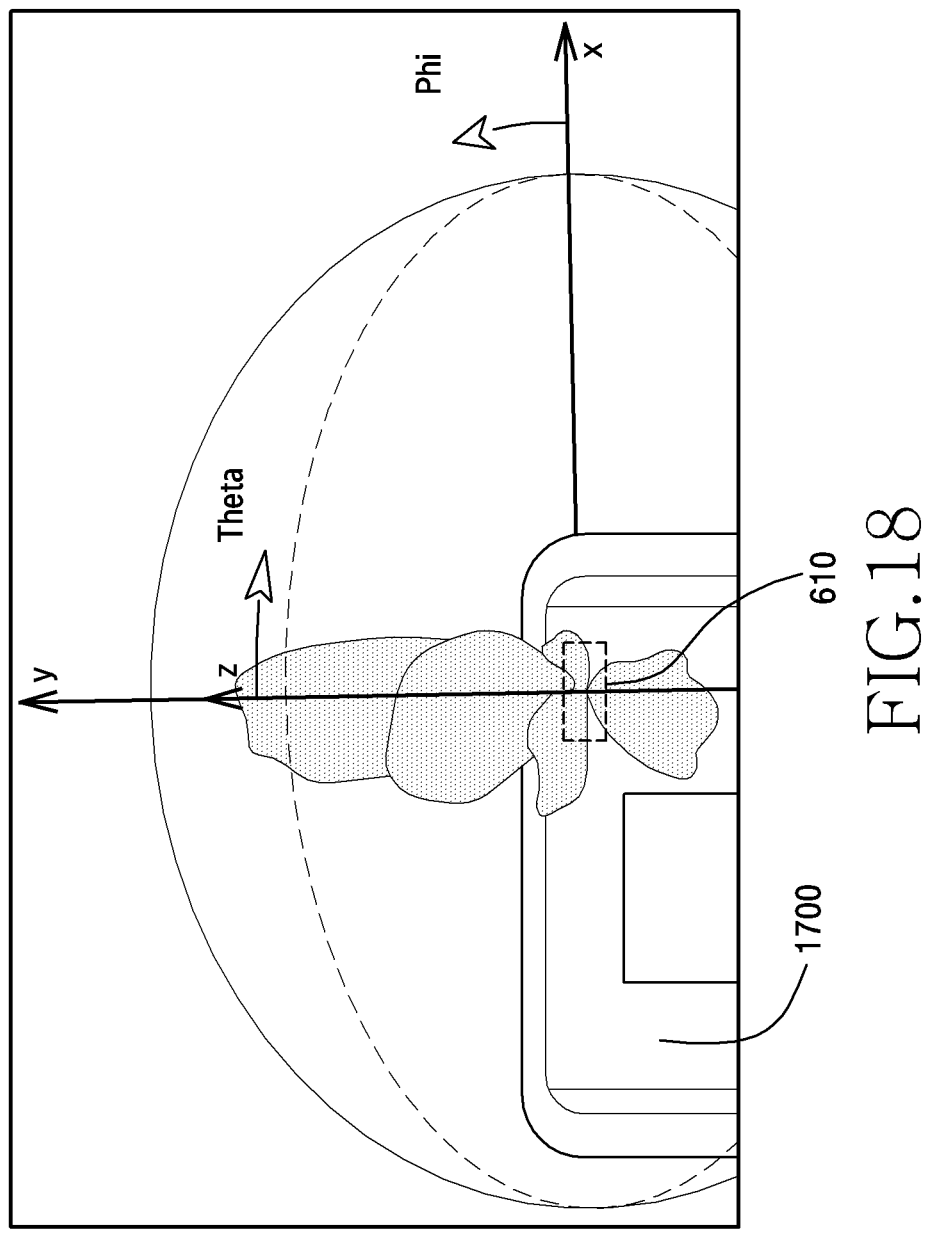
FIG. 18 illustrates a beam pattern for vertically polarized waves radiated from an antenna module, for example, when a conductive layer is omitted from the electronic device of FIG. 9, according to an embodiment of the disclosure.

FIG. 17 illustrates a beam pattern for horizontally polarized waves radiated from an antenna module, for example 1700, when a conductive layer 620 is omitted from the electronic device of FIG. 9, according to an embodiment of the disclosure, and FIG. 18 illustrates a beam pattern for horizontally polarized waves radiated from an antenna module, for example 1700, when a conductive layer 620 is included in the electronic device of FIG. 9, according to an embodiment of the disclosure.

Referring to FIGS. 15 and 16, the antenna module 610 may form a beam pattern 1501 of the horizontally polarized waves, in which the beam patterns formed in the plurality of antenna elements of the first antenna array 710 of FIG. 5A are combined with each other. The beam pattern 1501 of the horizontally polarized waves is an effective area in which the first antenna array 710 may radiate or detect electromagnetic waves, and may be formed by combining the radiated electric power of the plurality of antenna elements of the first antenna array 710. According to an embodiment, by the beam forming system, the antenna module 610 may form a beam pattern 1501 of the horizontally polarized waves, in which a relatively large amount of energy is radiated in a direction (e.g., the −z axis direction) that faces the rear plate 580. For example, the beam pattern 1501 of the horizontally polarized waves may be in the form of a broadside. The beam pattern of the horizontally polarized waves in the form of a broadside may include a main lobe in a direction in which radiation energy becomes maximal substantially without side lobes. According to an embodiment, the conductive layer 620 can prevent deformation (e.g., distortion) of the horizontally polarized waves by reducing propagation of the horizontally polarized waves radiated from the antenna module 610 through the rear plate 580 by total reflection.

Referring to FIGS. 17 and 18, when the conductive layer 620 is omitted, at least some of the horizontally polarized waves radiated from the antenna module 610 may be reflected on the rear plate 580, and the reflected components may cause deformation (or distortion) of the horizontally polarized waves while causing compensations and/or interferences. The deformation (or distortion) of the horizontally polarized waves, for example, may form nulls 1701, 1702, 1703, 1704, and 1705 that indicate an ineffective area, in which electromagnetic waves cannot be radiated or detected or a direction, in which radiation intensity is substantially 0.

Figure 19:
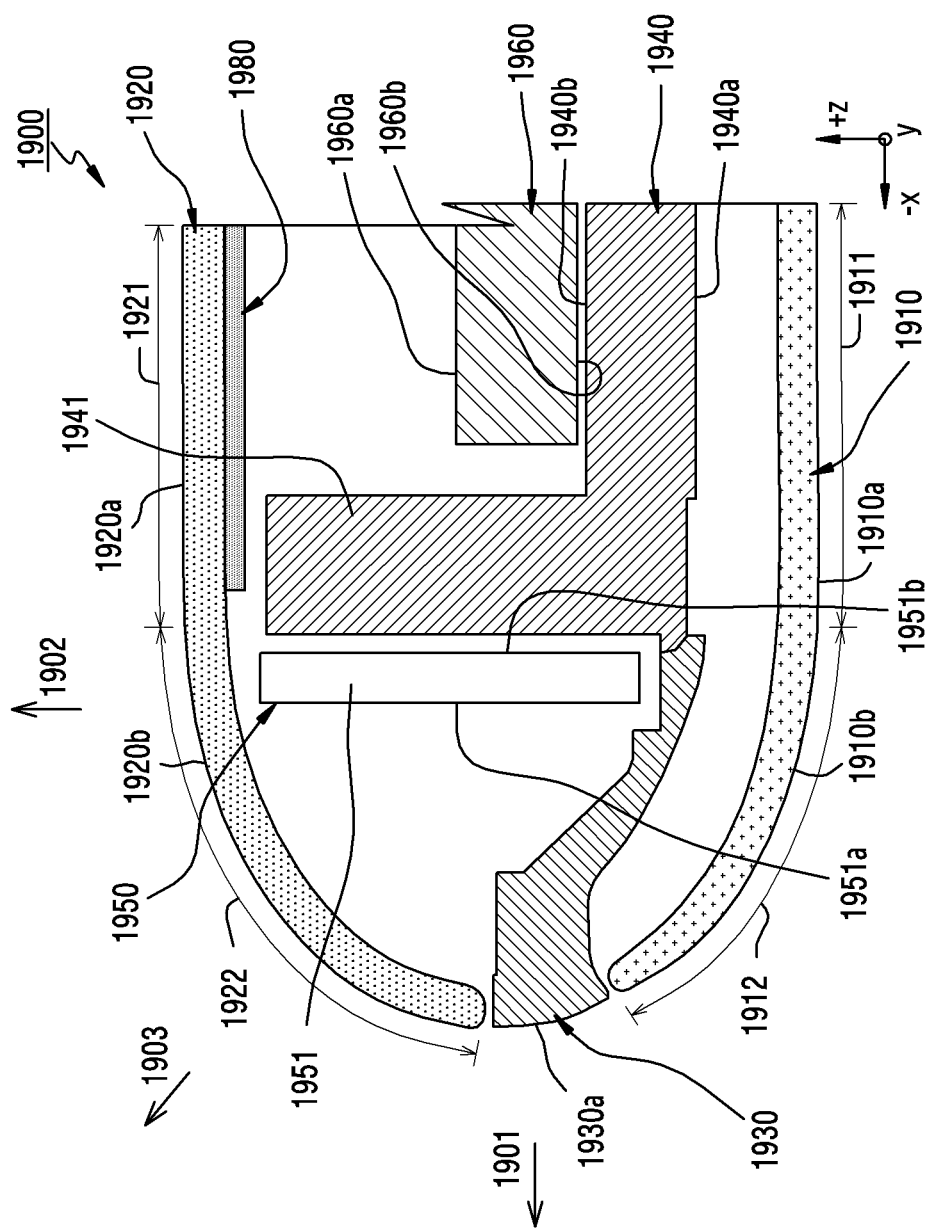
FIG. 19 is a cross-sectional view of an electronic device including an antenna module according to an embodiment of the disclosure.

FIG. 19 is a cross-sectional view of an electronic device including an antenna module according to an embodiment of the disclosure.

Figure 20:
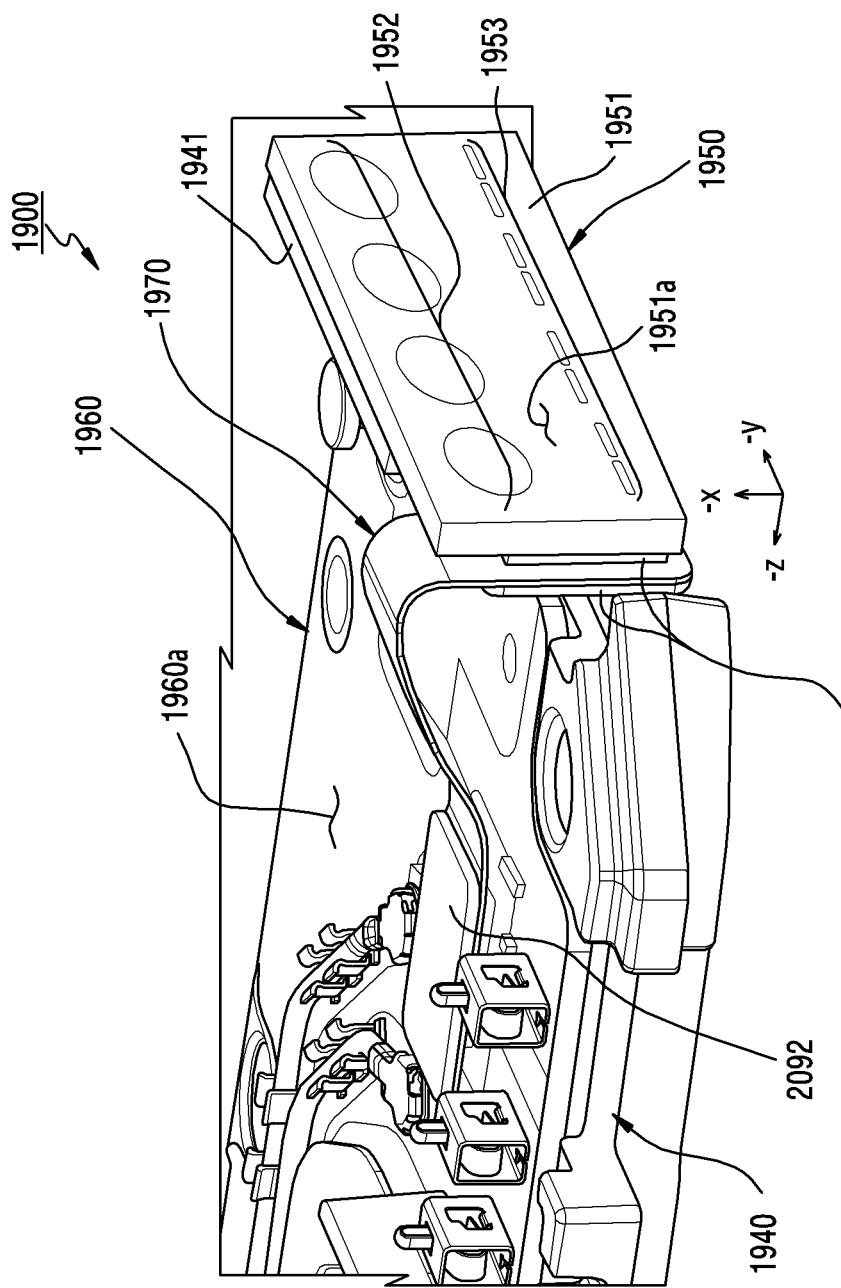
FIG. 20 is a perspective view, for example, of the electronic device of FIG. 19, according to an embodiment of the disclosure.

FIG. 20 is a perspective view, for example, of the electronic device of FIG. 19, according to an embodiment of the disclosure.

Referring to FIGS. 19 and 20, in an embodiment, an electronic device 1900 (e.g., the electronic device 101 of FIG. 1, the electronic device 300 of FIG. 3A or 3B, or the electronic device 400 of FIG. 4) may include at least one of a front plate 1910 (e.g., the front plate 420 of FIG. 4), a rear plate 1920 (e.g., the rear plate 480 of FIG. 4), a side bezel structure 1930 (e.g., the side bezel structure 410 of FIG. 4), a support member 1940 (e.g., the first support member 411 of FIG. 4), an antenna module 1950 (e.g., the antenna module 610 of FIG. 7A or 7B), a conductive layer 1980 (e.g., the conductive layer 620 of FIG. 9), a second printed circuit board 1960 (e.g., the printed circuit board 440 of FIG. 4), or a flexible printed circuit board 1970. At least one of the elements of the electronic device 1900 may be the same as or similar to at least one of the elements illustrated in FIG. 4, and a repeated description thereof will be omitted below.

For example, the front plate (or a window) may define a front surface of the electronic device 1900, and the rear plate (or a rear cover) 1920 may define a rear surface of the electronic device 1900. The side bezel structure 1930 may at least partially surround a space between the front plate 1910 and the rear plate 1920, and may define a side surface 1930a of the electronic device 1900.

According to an embodiment, the front plate 1910 may include a first planar portion 1911 and a first curved portion 1912. The first curved portion 1912 may extend from the first planar portion 1911, and may be curved toward the rear plate 1920. The front surface of the electronic device 1900 may include a first planar surface 1910a defined by the first planar portion 1911, and a first curved surface 1910b defined by the first curved portion 1912 and extending from an edge (not illustrated) of the first planar surface 1910a. According to various embodiments, the first planar surface 1910a may be the front surface 310A of FIG. 3A, and the first curved surface 1910b may be one of the two first areas 310D of FIG. 3A.

According to an embodiment, the rear plate 1920 may include a second planar portion 1921 and a second curved portion 1922. The second curved portion 1922 may extend from the second planar portion 1921, and may be curved toward the front plate 1910. The rear surface of the electronic device 1900 may include a second planar surface 1920a defined by the second planar portion 1921, and a second curved surface 1920b defined by the second curved portion 1922 and extending from an edge (not illustrated) of the second planar surface 1920a. According to various embodiments, the second planar surface 1920a may be the rear surface 310B of FIG. 3A, and the second curved surface 1920b may be one of the two second areas 310E of FIG. 3B.

The side surface 1930a (e.g., the side surface 310C of FIG. 3A) of the electronic device 1900 may connect the first curved surface 1910b of the front plate 1910 and the second curved surface 1920b of the rear plate 1920. According to some embodiments (not illustrated), the first curved portion 1912 of the front plate 1910 and/or the second curved portion 1922 of the rear plate 1920 may be formed to be planar.

According to an embodiment, the support member 1940 (e.g., the bracket) may be disposed in the interior of the electronic device 1900 to be connected to the side bezel structure 1930 or to be integrally formed with the side bezel structure 1930. The support member 1940, for example, may be formed of a metallic material and/or a nonmetallic material (e.g., a polymer). The support member 1940 may include one surface 1940a, on which the display (not illustrated) (e.g., the display 430 of FIG. 4) is disposed, and an opposite surface 1940b, on which the second printed circuit board 1960 is disposed. The display may be disposed at least partially along the front plate 1911. For example, the display may be a flexible display, and may include a planar area disposed along the first planar portion 1911 and a curved area disposed along the first curved portion 1912.

According to an embodiment, the second printed circuit board 1960 may include a fourth surface 1960b that faces the support member 1940 and a third surface 1960a that faces a direction that is opposite to the direction the fourth surface 1960b faces. According to an embodiment, the antenna module 1950 (e.g., the third antenna module 246 of FIG. 2 or the antenna module 610 of FIG. 7A) may include a first printed circuit board 1951 (e.g., the first printed circuit board 611 of FIG. 7A). The first printed circuit board 1951 may include a first surface 1951a, and a second surface 1951b that faces a direction that is opposite to the first surface 1951a. According to an embodiment, the second printed circuit board 1960 may be disposed to be substantially perpendicular to the first printed circuit board 1951. For example, the third surface 1960a (or the fourth surface 1960b) of the second printed circuit board 1960 may define an angle of substantially 90° with the first surface 1951a or the second surface 1951b of the first printed circuit board 1951. According to an embodiment, the support member 1940 may include a portion 1941 extending between the second printed circuit board 1960 and the first printed circuit board 1951, and the first printed circuit board 1951 may be disposed at the portion 1941.

According to an embodiment, the first printed circuit board 1951 may be perpendicular to a first planar portion 1911 of the front plate 1910 and/or a second planar portion 1921 of the rear plate 1920. According to an embodiment, the second curved portion 1922 of the rear plate 1920 may extend from the second planar portion 1921 to be curved to the front side of the first surface 1951a of the first printed circuit board 1951.

According to an embodiment, the first printed circuit board 1951 may be disposed to define an acute angle or an obtuse angle with the second printed circuit board 1960. For example, the third surface 1960a (or the fourth surface 1960b) of the second printed circuit board 1960 may define an acute angle or an obtuse angle with the first surface 1951a or the second surface 1951b of the first printed circuit board 1951.

Referring to FIGS. 19 and 20, the electronic device 1900 may include a third connector 2091 disposed at one end of the flexible printed circuit board 1970, and a fourth connector 2092 disposed at an opposite end of the flexible printed circuit board 1970. The third connector 2091 may be electrically connected to the first connector (e.g., the first connector 750 of FIG. 7B) disposed in the first printed circuit board 1951, and the fourth connector 2092 may be electrically connected to the second connector (not illustrated) disposed in the second printed circuit board 1960.

The antenna module 1950, for example, may include at least a portion of the antenna module 610 illustrated in FIG. 7A or 7B. According to an embodiment, the antenna module 1950 may include a first antenna array 1952 (e.g., the first antenna array 710 of FIG. 7A) and/or a second antenna array 1953 (e.g., the second antenna array 720 of FIG. 7A). According to an embodiment, the antenna module 1950 may include a first wireless communication circuit (e.g., the first wireless communication circuit 730 of FIG. 7B) mounted on the second surface 1951b.

According to an embodiment, the first antenna array 1952 and/or the second antenna array 1953 may be disposed closer to the first surface 1951a than to the second surface 1951b or may be disposed on the first surface 1951a. According to an embodiment, the plurality of antenna elements included in the first antenna array 1952 may include a patch antenna, and the plurality of antenna elements included in the second antenna array 1953 may include a dipole antenna. According to an embodiment, the locations or the number of the antenna arrays or the antenna elements included in the antenna arrays are not limited to the example illustrated in FIG. 20, and may be variously set.

According to an embodiment, the first antenna array 1952 may be disposed to be closer to the rear plate 1920 than the second antenna array 1953. The second antenna array 1953 may be disposed to be closer to the front plate 1910 than the first antenna array 1952.

According to an embodiment, the beam forming system may form the direction of a beam by adjusting the phase of a current supplied to the plurality of antenna elements of the first antenna array 1952 or the plurality of antenna elements of the second antenna array 1953. For example, referring to FIG. 19, by the beam forming system, the antenna module 1950 may form a beam, from which a relatively large amount of energy is radiated, in a first direction 1901 (e.g., the +x axis direction) which the first surface 1951a of the first printed circuit board 1951 faces, and/or in a second direction 1902 (e.g., the −z axis direction) which is perpendicular to the first direction 1901 to face the rear plate 1920. As another example, by the beam forming system, the antenna module 1950 may form a beam, from which a relatively large amount of energy is radiated, in a third direction 1903 between the first direction 1901 and the second direction 1902. For example, the third direction 1903 may define an angle of about 45° with the first direction 1901 or the second direction 1902. According to an embodiment, by the beam forming system, the antenna module 1950 may form a beam, from which a relatively large amount of energy is radiated, in other various directions.

According to an embodiment, the rear plate 1920 may be formed of an insulator such as glass or a polymer or a dielectric material. According to an embodiment, the conductive layer 1980 may be disposed between the rear plate 1920 and the second printed circuit board 1960. According to an embodiment, the conductive layer 1980 may be disposed in or coupled to the rear plate 1920. For example, the conductive layer 1980 may be formed by coating a conductive material on the rear plate 1920 or attaching a conductive film or a conductive plate.

According to an embodiment, when viewed from the top of the rear plate 1920, the conductive layer 1980 may at least partially overlap the second printed circuit board 1960. According to an embodiment, when viewed from the top of the rear plate 1920, the conductive layer 1980 may be disposed not to overlap the first printed circuit board 1951.

According to an embodiment, the conductive layer 1980 may be disposed at the second planar portion of the rear plate 1920. According to some embodiments (not illustrated), the conductive layer 1980 may be expanded to the second curved portion 1922 of the rear plate 1920 in a range that does not cover the first surface 1951a of the antenna module 1950.

According to an embodiment, the antenna module 1950 may have a directivity by which electromagnetic wave energy may be concentrated or waves may be transmitted and received in a specific direction. According to an embodiment, the antenna module 1950 may form a beam pattern in which beam patterns formed in the plurality of antenna elements of the first antenna array 1952 or the second antenna array 1953 are combined with each other. The beam pattern is an effective area in which the first antenna array 1952 or the second antenna array 1953 may radiate or detect electromagnetic waves, and may be formed by combining radiated electric power of the plurality of antenna elements of the first antenna array 1952 or the second antenna array 1953. According to an embodiment, the antenna module 1950 may form a beam, from which a relatively large amount of energy is radiated, in at least one of the first direction 1901 (e.g., the +x axis direction) and the second direction 1902 (e.g., the −z axis direction) through the first antenna array 1952 or the second antenna array 1953. According to an embodiment, the antenna module 1950 may form a beam, from which a relatively large amount of energy is radiated, in at least one of the first direction 1901 and the third direction 1903 through the first antenna array 1952 or the second antenna array 1953. According to an embodiment, the antenna module 1950 may form a beam, from which a relatively large amount of energy is radiated, in at least one of the second direction 1902 and the third direction 1903 through the first antenna array 1952 or the second antenna array 1953. According to an embodiment, the electromagnetic waves radiated from the first antenna array 1952 or the second antenna array 1953 may include horizontally polarized waves and vertically polarized waves. According to an embodiment, the horizontally polarized waves are linear polarizations in which the directions of the electric field vectors are horizontal, and may be parallel to the ground plane (e.g., a ground plane that is parallel to the x-y plane) included in the first printed circuit board 1951. According to an embodiment, the vertically polarized waves may be linear polarizations in which the vector directions of the electric fields are vertical, and may be perpendicular to the ground plane included in the first printed circuit board 1951. For example, the electromagnetic waves (e.g., the horizontally polarized waves or the vertically polarized waves) radiated from the first antenna array 1952 or the second antenna array 1953 may face the rear plate 1920 by directivity, and the electromagnetic waves may be reflected on the rear plate 1920 and the reflected components may cause compensations and/or interferences in a maximum radiation direction (boresight), causing deformation (or distortion) of the electromagnetic waves. According to an embodiment, the conductive layer 1980 may reduce deformation (or distortion) of the electromagnetic waves by changing a border condition of the electromagnetic waves for the rear plate 1920.

For example, when the conductive layer 1980 is omitted, the rear plate 1920 is a waveguide, through which electromagnetic waves radiated from the first antenna array 1952 and/or the second antenna array 1953 of the antenna module 1950 propagate, and for example, may be operated as a path for a medium that allows the electromagnetic waves to propagate by using a total reflection property. When the rear plate 1920 is operated as a waveguide, it may be difficult for the antenna module 1950 to secure antenna radiation characteristics corresponding to a selected or specified frequency, and accordingly, the antenna performance of the antenna module 1950 may deteriorate. When the electromagnetic waves radiated from the antenna module 1950 propagate through the rear plate 1920, accordingly, the performance of the electrical element, such as the antenna 570 of FIG. 8 or 9 can deteriorate.

According to an embodiment, the conductive layer 1980 can prevent deformation (e.g., distortion) of the antenna radiation characteristics by reducing propagation of the electromagnetic waves radiated from the antenna module 1950 through the rear plate 1920.

According to an embodiment, the conductive layer 1980 can secure the performance of an electrical element, such as the antenna 570 of FIG. 8 or 9 by reducing propagation of the electromagnetic waves radiated from the antenna module 1950 through the rear plate 1920. For example, the conductive layer 1980 may shield or damp the electromagnetic waves (or waves) radiated from the first antenna array 1952 or the second antenna array 1953 between the electrical elements such as the antenna module 1950 and the antenna 570.

According to an embodiment, the conductive layer 1980 is not limited to the form illustrated in FIG. 19, and may be variously formed according to a border condition of the electromagnetic waves for the rear plate 1920 such that deformation (or distortion) of the electromagnetic waves (e.g., the horizontally polarized waves or the vertically polarized waves) radiated from the antenna module 1950 and an influence, by the electromagnetic waves, on other electrical elements (e.g., the antenna 570 of FIG. 8 or 9). According to an embodiment (not illustrated), the conductive layer 1980 may be realized by a plurality of conductive patterns physically separated as in the conductive layer 1020 of FIG. 10. According to an embodiment (not illustrated), the conductive layer 1980 may be realized in the form including a plurality of openings. For example, the conductive layer 1980 may be formed in an EBG structure.

Figure 21:
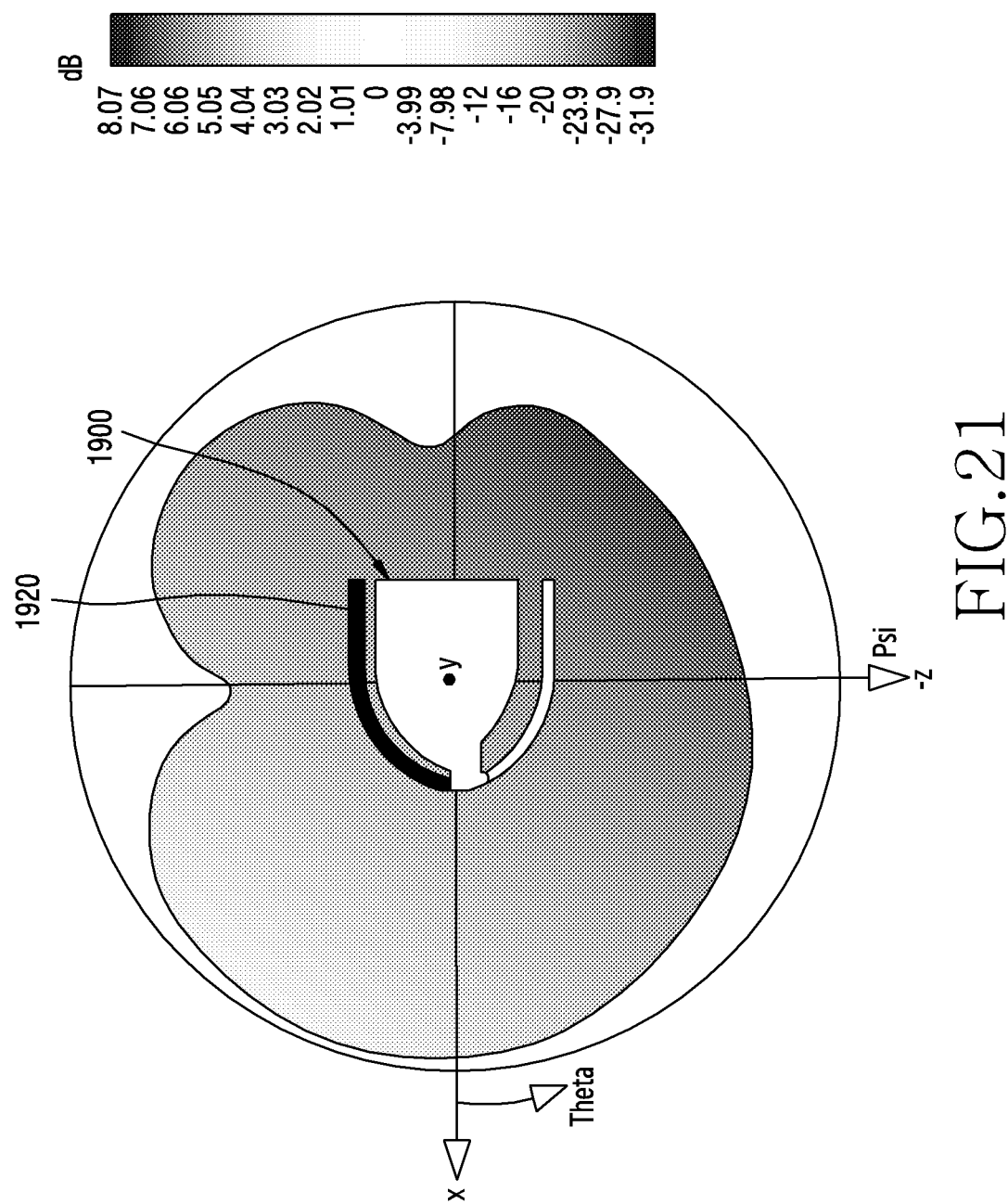
FIG. 21 illustrates a beam pattern for electromagnetic waves radiated from an antenna module in the electronic device of FIG. 19 or 20 according to an embodiment of the disclosure.

FIG. 21 illustrates a beam pattern for electromagnetic waves radiated from an antenna module in the electronic device of FIG. 19 or 20 according to an embodiment of the disclosure.

Figure 22:
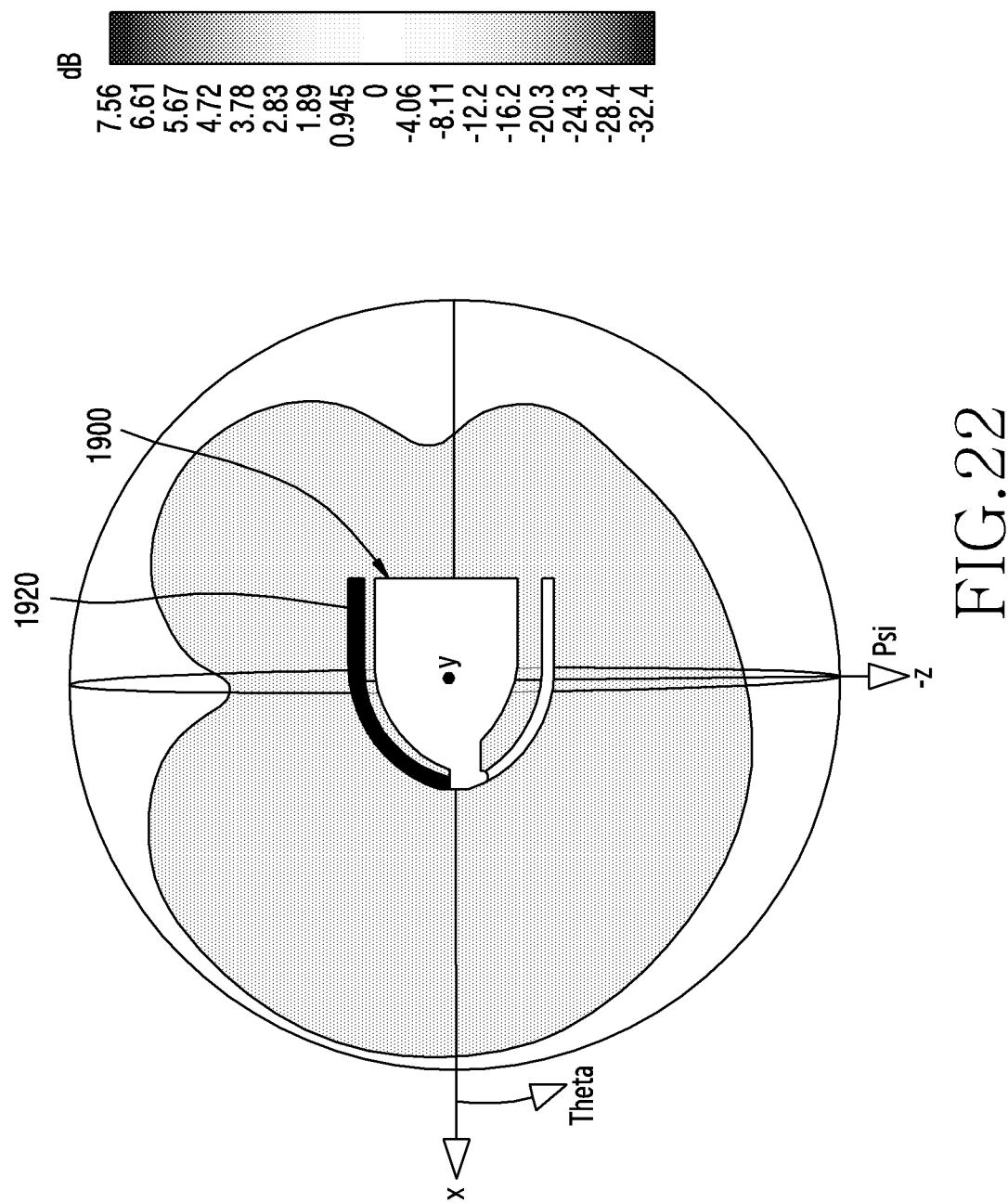
FIG. 22 illustrates a beam pattern for electromagnetic waves radiated from an antenna module, for example, when a conductive layer is omitted from the electronic device of FIG. 19 or 20, according to an embodiment of the disclosure.

FIG. 22 illustrates a beam pattern for electromagnetic waves radiated from an antenna module, for example, in an example 2200 in which a conductive layer 1980 is omitted from the electronic device of FIG. 19 or 20, according to an embodiment of the disclosure.

Figure 23:
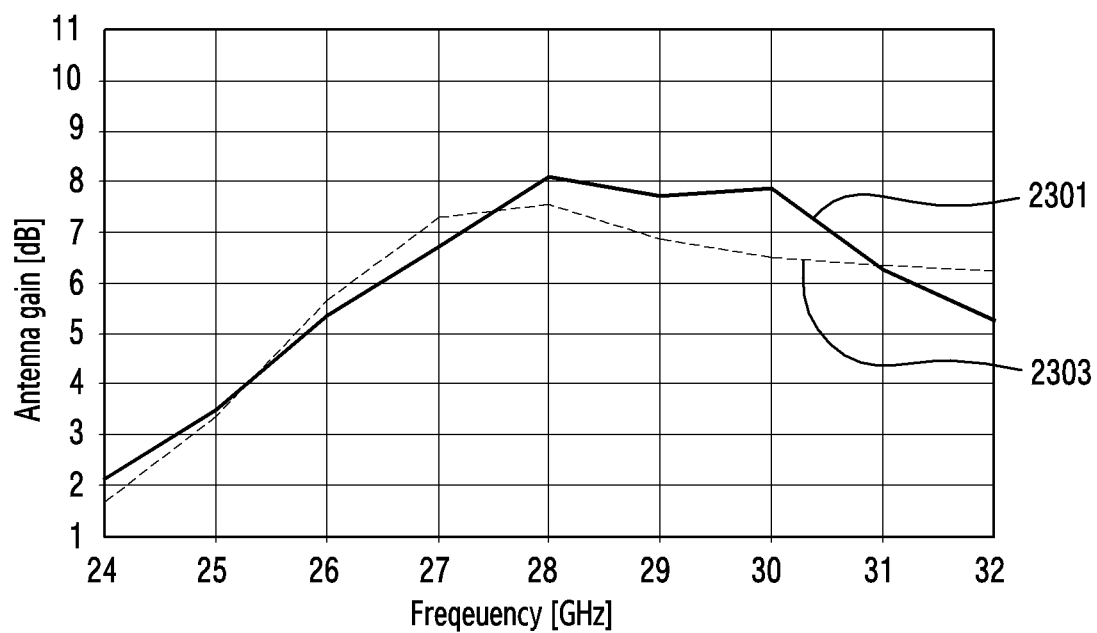
FIG. 23 is a graph depicting an antenna gain in a frequency distribution in the electronic device of FIG. 19, 20, or 22 according to an embodiment of the disclosure.

FIG. 23 is a graph depicting an antenna gain in a frequency distribution in the electronic device of FIG. 19 or 20 according to an embodiment and in the embodiment of FIG. 22.

Referring to FIG. 22, the electromagnetic waves (e.g., the vertically polarized waves) radiated from the antenna module 1950 may have a beam that faces the rear plate 1920 by directivity. The beam is reflected on the rear plate 1920, and the reflected components may cause compensations and/or interferences in a maximum radiation direction (boresight), causing deformation (or distortion) of the beam pattern as in FIG. 22. Referring to FIG. 21, in an embodiment, the conductive layer 1980 may reduce deformation of the electromagnetic waves by changing a border condition of the electromagnetic waves for the rear plate 1920. Referring to FIG. 21, in an embodiment, the conductive layer 1980 can reduce deformation of a beam pattern and secure an antenna gain by shielding or damping at least some of the electromagnetic waves guided to the rear plate 1920.

Referring to FIG. 23, reference numeral 2301 denotes an antenna gain on a frequency distribution for the electronic device of FIG. 19 or 20, and reference numeral 2303 denotes an antenna gain on a frequency distribution for the embodiment of FIG. 22. In comparison of 2301 and 2303, the conductive layer 1980 of FIG. 19 according to an embodiment can increase a peak gain.

Figure 24:
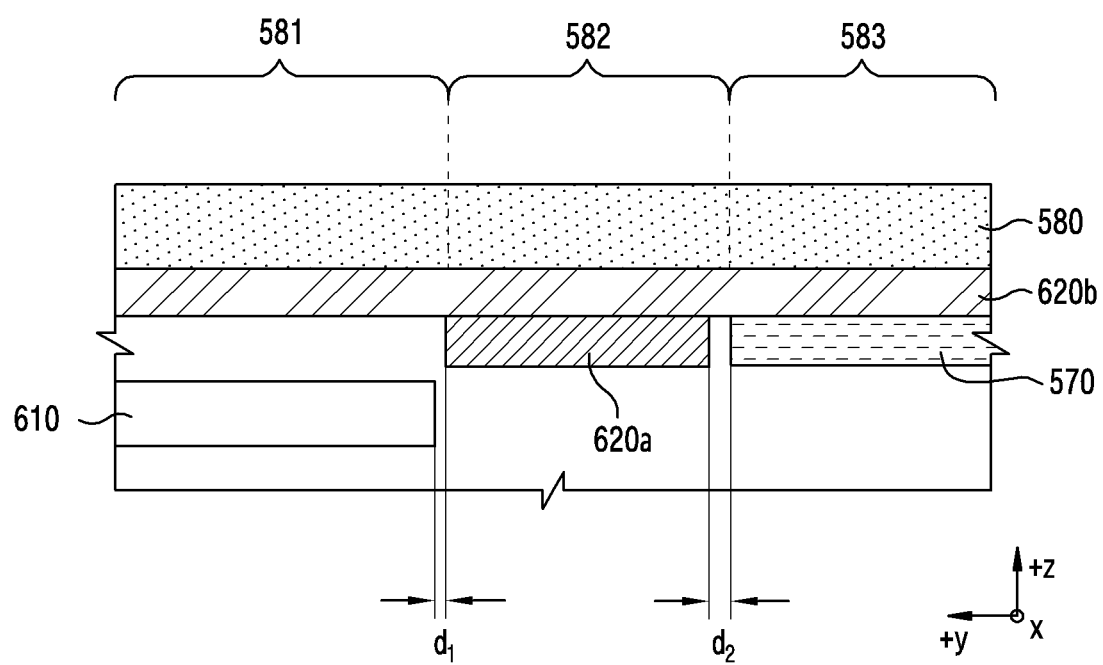
FIG. 24 is a cross-sections of an electronic device, taken along line I-I of FIG. 6, according to an embodiment of the disclosure.

FIG. 24 is a cross-section of an electronic device, taken along line I-I of FIG. 6, according to an embodiment of the disclosure.

Figure 25:
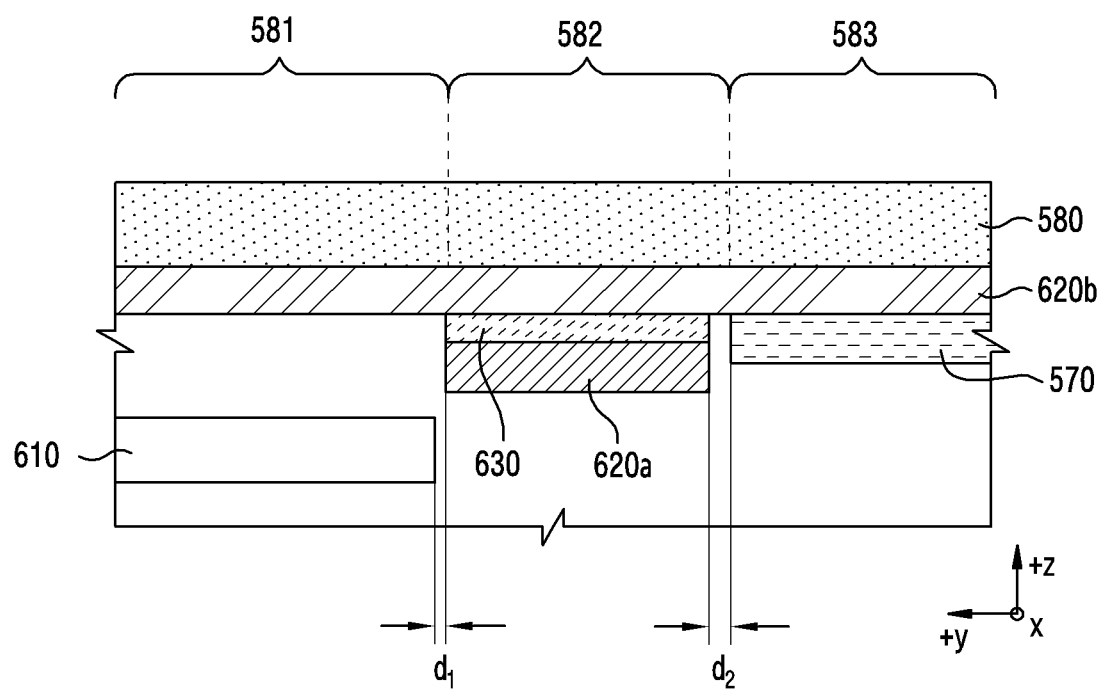
FIG. 25 is a cross-sections of an electronic device, taken along line I-I of FIG. 6, according to an embodiment of the disclosure.
Figure 26:
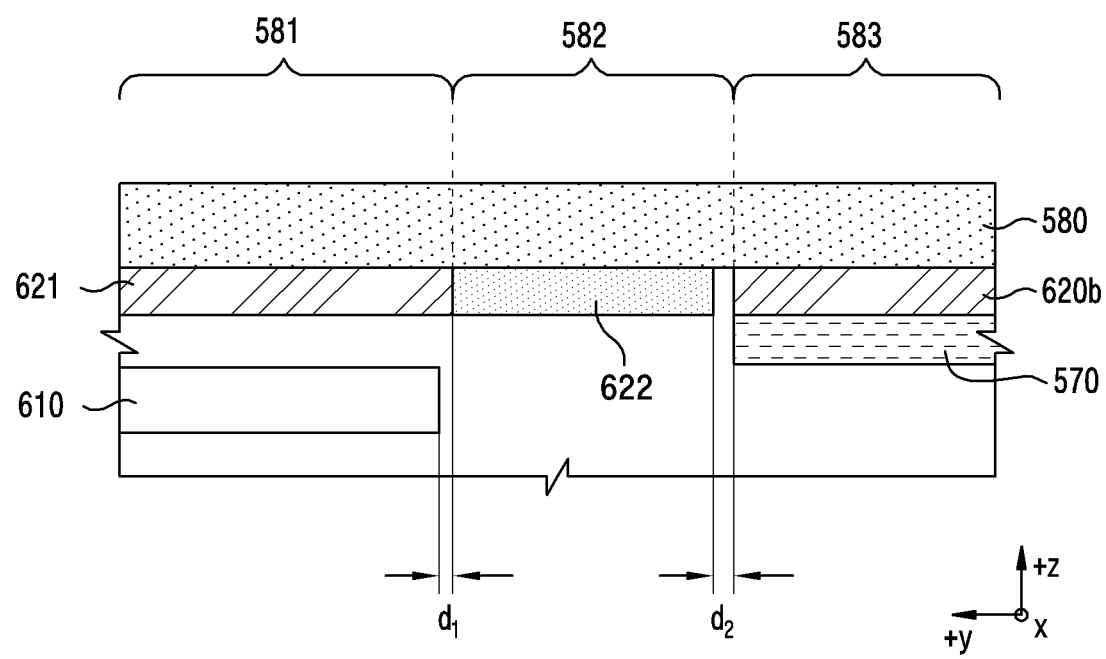
FIG. 26 is a cross-sections of an electronic device, taken along line I-I of FIG. 6 according to an embodiment of the disclosure.

FIG. 25 is a cross-section of an electronic device, taken along line I-I of FIG. 6, according to an embodiment of the disclosure, and FIG. 26 is a cross-section of an electronic device, taken along line I-I of FIG. 6, according to an embodiment of the disclosure.

Referring to FIGS. 24 to 26, in an embodiment, the antenna module 610 may be disposed at a location corresponding to the first portion 581 of the rear plate 580. The electromagnetic waves of the antenna module 610 may pass through the first portion 581 of the rear plate 580 and may be radiated to the outside of the electronic device. Accordingly, a member (e.g., a conductive member or a ferrite film) that may shield electromagnetic waves may not be disposed between the first portion 581 of the rear plate 580 and the antenna module 610.

Referring to FIGS. 24 and 25, the antenna 570 (or a component that replaces the antenna 570, see the description of FIG. 6) may be disposed under the rear plate 580. The antenna 570 may be located to be spaced apart from the antenna module 610 in a direction (e.g., the −y axis direction) that is parallel to the rear plate 580. For example, the antenna 570 may be disposed under the third portion 583 of the rear plate 580.

Referring to FIGS. 24 and 25, in an embodiment, when the x-y plane is viewed, the conductive layer 620*a* may not overlap the antenna module 610. For example, the conductive layer 620*a* may be disposed under the second portion 582 of the rear plate 580, which is adjacent to the first portion 581 of the rear plate 580. The conductive layer 620*a* can shield electromagnetic fields that are generated in the antenna module 610 and propagate to the second portion 582 of the rear plate 580 along the rear plate 580.

Referring to FIGS. 24 and 25, in an embodiment, the conductive layer 620*a* may be disposed between the antenna module 610 and the antenna 570. In an embodiment, the conductive layer 620*a* may extend toward the antenna 570 at a portion that is adjacent to the antenna module 610. For example, the antenna 570 may be disposed under the third portion 583 of the rear plate 580, which is adjacent to the second portion 582. In an embodiment, the conductive layer 620*a* may be disposed to be closer to the antenna module 610 than to the antenna 570. For example, an interval d1 between the conductive layer 620*a* and the antenna module 610 may be smaller than an interval d2 between the conductive layer 620*a* and the antenna 570.

In an embodiment, the rear plate 580 may include a first surface that faces the outside of the electronic device, and a second surface that faces the interior of the electronic device. In an embodiment, the antenna module 610 may be disposed at a location of the second surface of the rear plate 580, which is adjacent to the first area corresponding to the first portion 581, and a conductive member may be disposed at a location of the second surface of the rear plate 580, which is adjacent to the second area corresponding to the second portion 582. For example, the antenna module 610 and the conductive layer 620*a* may be attached onto the first area and the second area, respectively. The conductive layer 620*a* can shield electromagnetic fields that are generated in the antenna module 610 and propagate to the second portion 582 of the rear plate 580 along the rear plate 580.

In an embodiment, a component including a dielectric material may be disposed at a location of the second surface, which is adjacent to the third area corresponding to the third portion 583. For example, the antenna 570 may be attached to the third area of the rear plate 580.

Referring to FIGS. 24 and 25, in an embodiment, the electronic device may include a film 620b disposed between the conductive layer 620a and the rear plate 580. The film 620b is a layer deposited or coating under the rear plate 580, and may be viewed from the outside of the electronic device through the rear plate 580. In an embodiment, the conductive layer 620a may be realized by directly depositing (or coating) a conductive material on one surface of the film 620b or attaching a conductive member to the film 620b. In the embodiment illustrated in FIG. 25, the conductive layer 620a may be attached under the film 620b through a bonding member 630.

Although not illustrated, in an embodiment, the conductive layer 620a may be disposed directly under the rear plate 580. For example, the conductive layer 620a may be realized by attaching a film including a conductive material to one surface of the rear plate 580. A bonding member may be attached between the conductive layer 620a and the rear plate 580. As another example, the conductive layer 620a may be realized by depositing (or coating) a conductive material on the rear plate 580.

Although not illustrated, in an embodiment, the conductive layer 620a may be electrically connected to a ground in the interior of the electronic device. In an embodiment, the conductive layer 620a may be grounded to a component including the ground in the electronic device. For example, the electronic device may include a bracket configured to support the display therein and including a conductive material, and the conductive layer 620a may be electrically connected to the bracket. As another example, the electronic device may include a printed circuit board (e.g., the second printed circuit board 540 of FIG. 5A) including a ground therein, and the conductive layer 620a may be electrically connected to the ground of the printed circuit board.

Referring to FIG. 26, the film 620b may include a first area 621 formed of a nonconductive material and a second area 622 treated to have conductive characteristics in an area which does not overlap the antenna module 610. The second area 622 may be located under the second portion 582 of the rear plate 580. In this case, the second area 622 of the film 620b may replace the conductive layer 620a of FIGS. 24 and 25. This is because the film 620b can shield electromagnetic fields that propagate from the antenna module 610 in the −y axis direction when the film 620b includes a conductive material.

Figure 27:
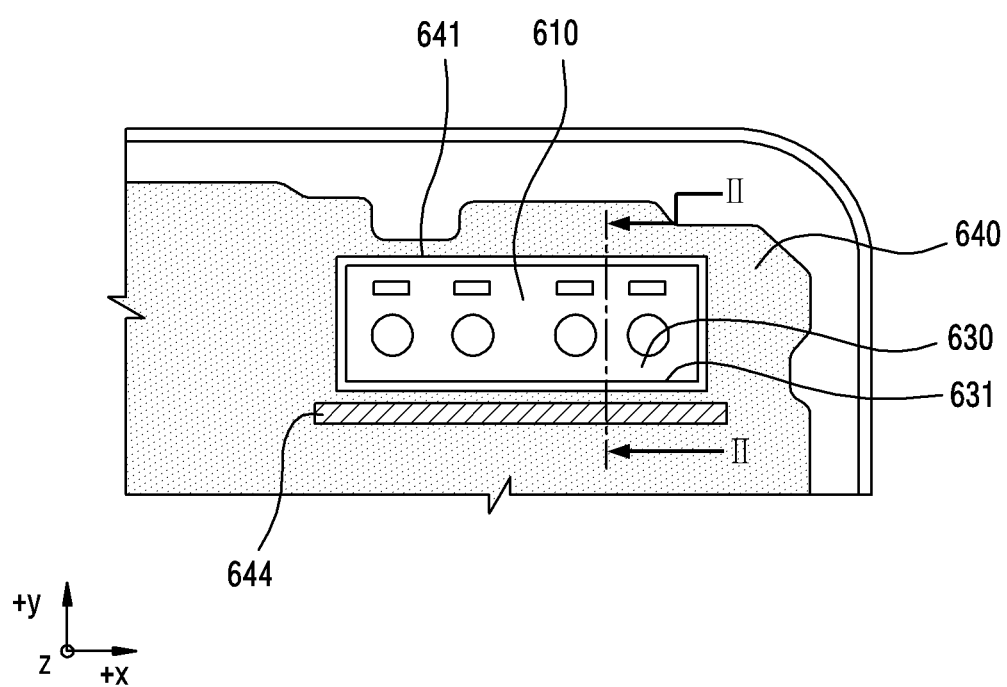
FIG. 27 illustrates an electronic device including an antenna module seated in a mid-frame according to an embodiment of the disclosure.

FIG. 27 illustrates an electronic device including an antenna module seated in a mid-frame according to an embodiment of the disclosure.

Figure 28:
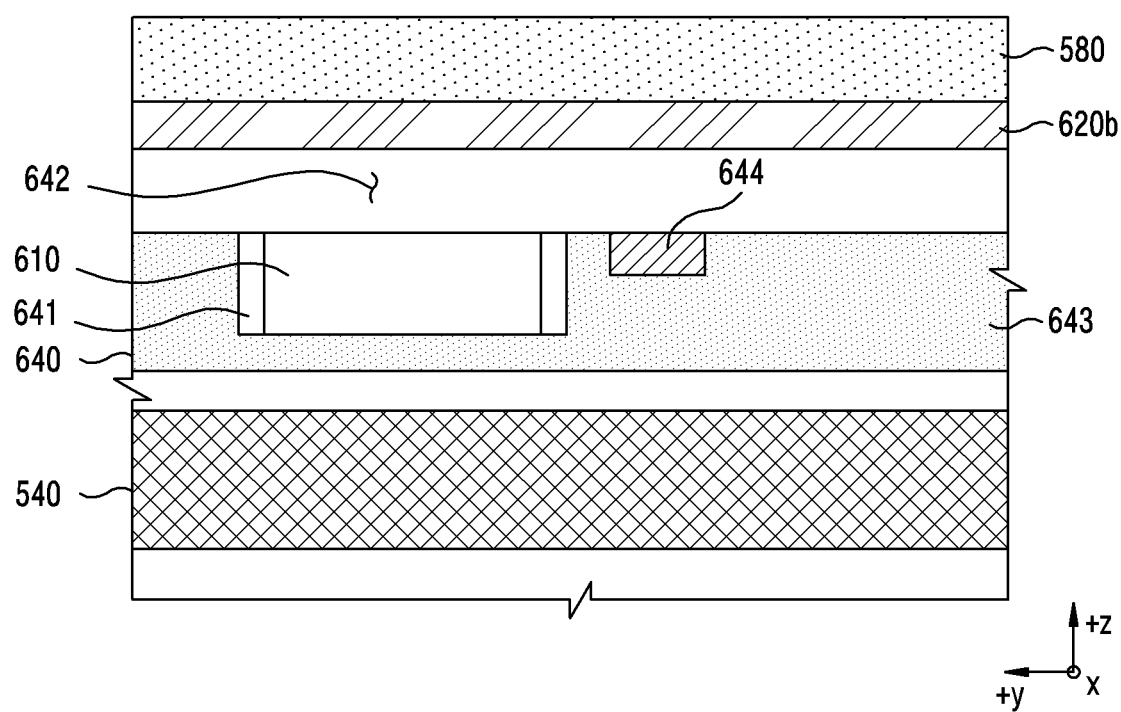
FIG. 28 is a cross-sectional view of the electronic device of FIG. 27, taken along line II-II, according to an embodiment of the disclosure.

FIG. 28 is a cross-sectional view of the electronic device of FIG. 27, taken along line II-II, according to an embodiment of the disclosure.

In an embodiment, the antenna module 610 may be disposed on a mid-frame 640 disposed between the second printed circuit board 540 and the rear plate 580. In an embodiment, the antenna module 610 may be electrically connected to the second printed circuit board 540 through a conductive path that passes through or detour the mid-frame 640.

In an embodiment, the antenna module 610 may be seated on a recessed portion (or a recess) 641 formed in the mid-frame 640. In an embodiment, the recessed portion 641 may be disposed such that an air gap 642 is present between the antenna module 610 and the rear plate 580 when the antenna module 610 is seated in the recessed portion 641.

In an embodiment, the mid-frame 640 may include a nonconductive member 643 and a conductive member (or a conductive pattern or a shield member) 644. In an embodiment, the conductive member 644 may include a radiator of an antenna that is different from the antenna module 610. For example, a radiator of a Wi-Fi antenna and/or a GPS antenna may be disposed on the mid-frame 640. In an embodiment, the nonconductive member 643 and the conductive member 644 may be integrally formed with each other through dual injection-molding or insert injection-molding.

In an embodiment, the conductive member 644 of the mid-frame 640 may be disposed around the recessed portion 641. For example, the conductive member 644 may be disposed at a location that is adjacent to the recessed portion 641. In an embodiment, the conductive member 644 may at least partially surround a border of the recessed portion 641. In an embodiment, two or more conductive members that are separated from each other may at least partially surround a border of the recessed portion 641.

In an embodiment, when the antenna module 610 is seated in the recessed portion 641, the conductive member 644 may be adjacent to the border of the antenna module 610. The conductive member 644 may be disposed along at least a portion of the border of the antenna module 610. Accordingly, at least a portion of the antenna module 610 may be surrounded by the conductive member 644. In an embodiment, the conductive member 644 may be disposed to surround a −y axis direction border 631 of the antenna module 610. In this case, the electromagnetic fields that propagate from the antenna module 610 in the −y axis direction can be shielded by the conductive member 644.

According to an embodiment, the conductive member 644 of the mid-frame 640 may reduce an electrical influence, by the rear plate 580, on the antenna radiation characteristics (e.g., a beam pattern or a polarization state of electromagnetic waves) of the antenna module 610. This is because the conductive member 644 prevents propagation of the electromagnetic fields radiated from the antenna module 610 through the rear plate 580.

Figure 29:
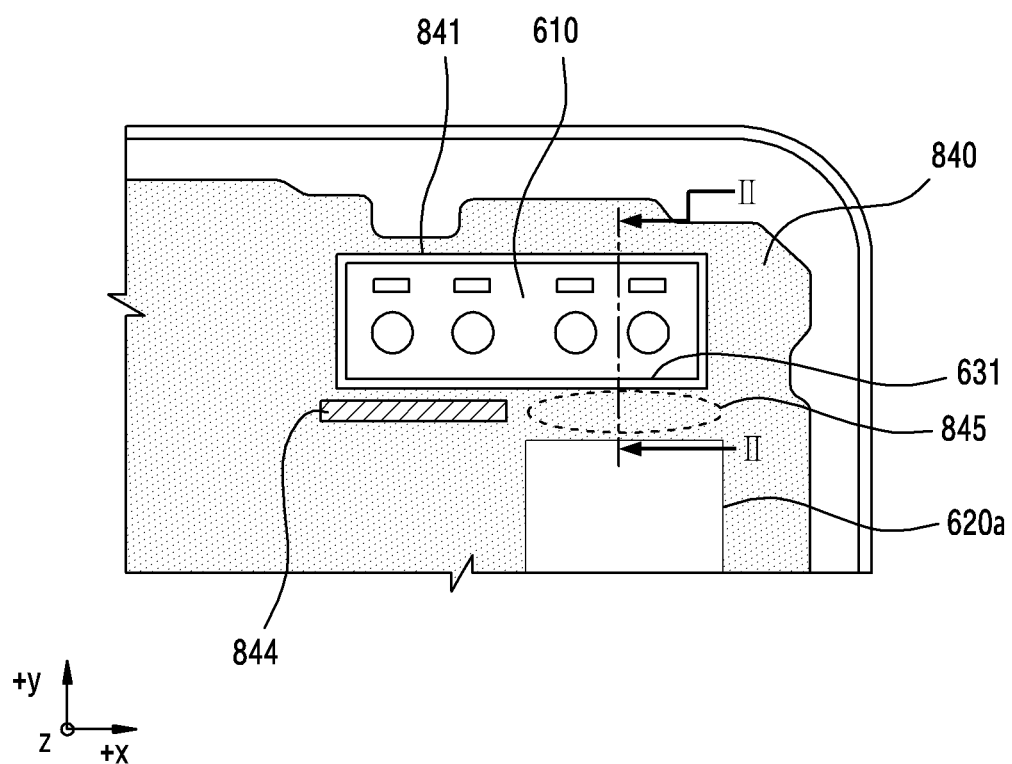
FIG. 29 illustrates an electronic device including a conductive layer of a mid-frame and a conductive layer attached to a rear frame according to an embodiment of the disclosure.

FIG. 29 illustrates an electronic device including a conductive layer of a mid-frame and a conductive layer attached to a rear frame according to an embodiment the disclosure.

Figure 30:
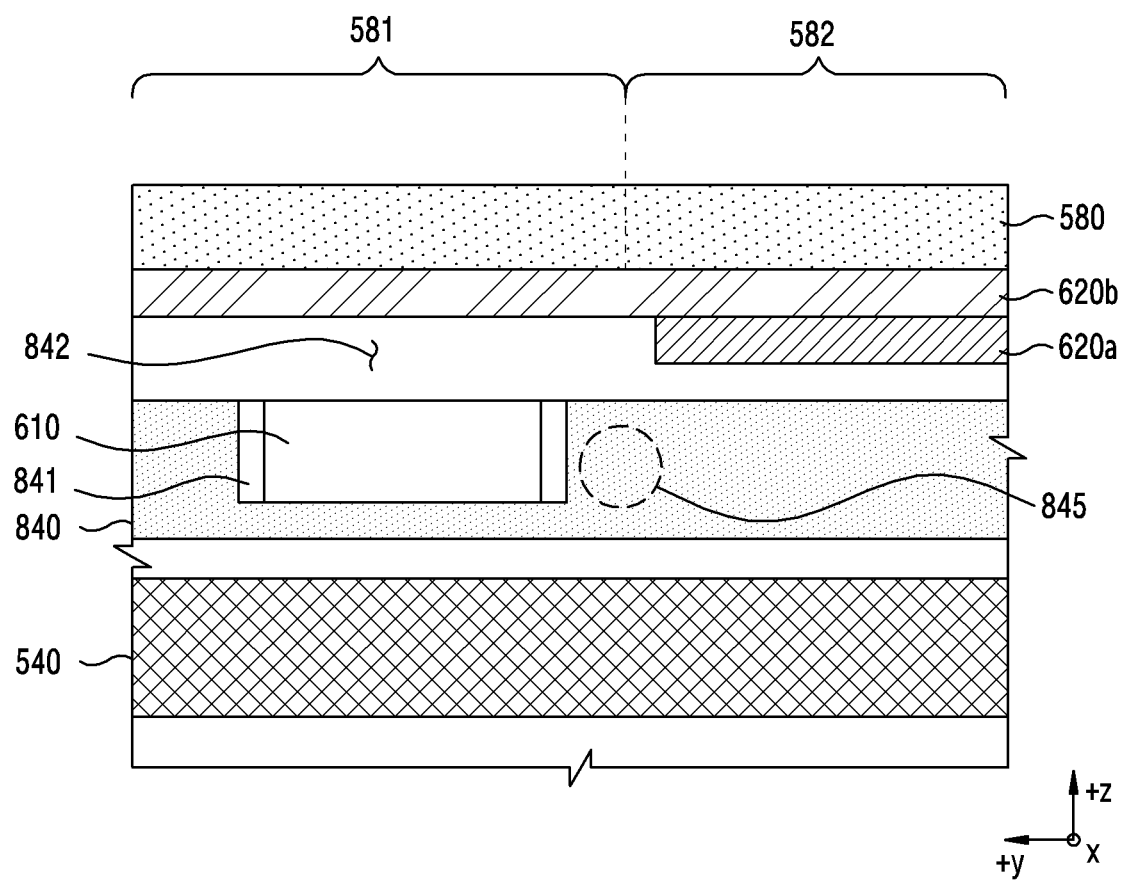
FIG. 30 is a cross-sectional view of the electronic device of FIG. 29, taken along line III-III, according to an embodiment of the disclosure.

FIG. 30 is a cross-sectional view of the electronic device of FIG. 29, taken along line III-III, according to an embodiment of the disclosure.

Referring to FIG. 30, the arrangement of the antenna module 610 at the recessed portion 841 of the mid-frame 840 is the same as in the embodiment illustrated in FIG. 27. However, referring to FIG. 29, differently from in the embodiment of FIG. 27, in an embodiment, the conductive member 844 may be opened in the −y axis direction. For example, the conductive member 844 of the mid-frame 840 may surround only a portion of the −y direction border 631 of the antenna module 610. The form and the location of the conductive member 844 illustrated in FIG. 29 correspond to a simple example. For example, the length, by which the conductive member 844 extends along the border of the antenna module 610, may be different from that illustrated in FIG. 29.

Some of the electromagnetic fields generated in the antenna module 610 may pass through a portion 845, which is not surrounded by the conductive member 844, and may be guided in the −y axis direction. The electromagnetic fields that were guided in the −y axis direction may propagate through the rear plate 580, which may cause deterioration of the performance of the antenna module 610. In an embodiment, the electromagnetic fields that are guided from the antenna module 610 in the −y axis direction can be shielded by the conductive layer 620a, which will be described below.

In an embodiment, the electronic device may include a conductive layer 620a disposed under the rear plate 580. The conductive layer 620a of FIG. 29 is substantially the same as the conductive layer 620a illustrated in FIGS. 6 to 11, and a repeated description thereof will be omitted. For example, when the x-y plane is viewed, the conductive layer 620a may be attached under the second portion 582 of the rear plate 580 not to overlap the antenna module 610 disposed under the first portion 581 of the rear plate 580.

In an embodiment, the conductive layer 620a may be located in an area of the border of the antenna module 610, which corresponds to the portion 845 that is not surrounded by the conductive member 844. For example, the conductive layer 620a may be disposed along a path of some of the electromagnetic fields generated in the antenna module 610, which pass through the portion 845 that is not surrounded by the conductive member 844. In an embodiment, the width of the conductive layer 620a may correspond to the length of the portion 845 of the −y axis border 631 of the antenna module 610, which is not surrounded by the conductive member 844. Accordingly, the electromagnetic fields that are guided from the antenna module 610 in the −y axis direction can be shielded by the conductive layer 620a.

In an embodiment, a portable communication device (e.g., the electronic device 500 of FIG. 5A) may include a display (e.g., the display 530 of FIG. 8) defining a front surface of the portable communication device, a plate (e.g., the rear plate 580 of FIG. 6) defining a rear surface of the portable communication device and including a nonconductive material, the plate including a first surface facing the outside of the portable communication device and a second surface facing the inside of the portable communication device, a first antenna module (e.g., the antenna module 610 of FIG. 24) attached to a first area (e.g., the first portion 581 of FIG. 24) of the second surface or positioned to be adjacent to the first area, a second antenna module (e.g., the antenna 570 of FIG. 24) attached to a second area (e.g., the third portion 583 of FIG. 24) of the second surface or positioned to be adjacent to the second area, and a conductive member (e.g., the conductive layer 620a of FIG. 24) disposed in or attached to a third area (e.g., the second portion 582 of FIG. 24) between the first area and the second area of the second surface, and among electric waves radiated from the first antenna module, some electric waves that travel towards the second antenna module through the plate may be at least partially interrupted by the conductive member.

In an embodiment, the first antenna module may have a first width in a second direction (e.g., the x axis direction of FIG. 6) that is substantially perpendicular to a first direction (e.g. the y axis direction of FIG. 6) facing the second antenna module from the first antenna module and is substantially parallel to the rear surface, and the conductive member may have a second width (e.g., the second width w2 of FIG. 6) in the second direction, which is larger than the first width.

In an embodiment, the conductive member may be grounded through, except for the first antenna module and the second antenna module, another component in the portable communication device.

In an embodiment, the other component may include a bracket at least partially supporting the plate or the display, and the conductive member may be electrically connected to a ground of the bracket.

In an embodiment, the conductive member may be spaced apart from the first antenna module by a first distance (e.g., the first distance d1 of FIG. 6), and may be spaced apart from the second antenna module by a second distance (e.g., the second distance d2 of FIG. 6) that is larger than the first distance.

In an embodiment, the conductive member may be deposited in the third area.

In an embodiment, the portable communication device may further include a film (e.g., the film 620b of FIG. 25) positioned between the third area and the conductive member, and a bonding layer positioned between the third area and the film.

In an embodiment, the plate may include glass.

In an embodiment, the first antenna module may include a first printed circuit board (e.g., the first printed circuit board 611 of FIG. 7A) and a first antenna (e.g., the first array 710 of FIG. 7A) positioned in the first printed circuit board, and the second antenna module may include a second printed circuit board and a second antenna positioned in the second printed circuit board.

In an embodiment, the second antenna may include a coil configured to support near field communication.

In an embodiment, the second antenna module may include a nonconductive member positioned between the plate and the second printed circuit board.

In an embodiment, a portable communication device may include a display defining a front surface of the portable communication device, a plate defining a rear surface of the portable communication device and including a nonconductive material, the plate including a first surface facing the outside of the portable communication device and a second surface facing the inside of the portable communication device, an antenna disposed in or attached to a first area of the second surface or positioned to be adjacent to the first area, a component disposed in or attached to a second area of the second surface, and a conductive member disposed in or attached to a third area between the first area and the second area of the second surface, and among electric waves radiated from the antenna, some electric waves that travel toward the component through the plate may be at least partially interrupted by the conductive member.

In an embodiment, the antenna may have a first width in a second direction that is substantially perpendicular to a first direction facing the component from the antenna and is substantially parallel to the rear surface, and the conductive member may have a second width in the second direction, which is larger than the first width.

In an embodiment, the conductive member may be spaced apart from the antenna by a first distance, and may be spaced apart from the component by a second distance that is larger than the first distance.

In an embodiment, the portable communication device may further include a film positioned between the third area and the conductive member, and a bonding layer positioned between the third area and the film.

In an embodiment, the portable communication device may further include a first printed circuit board, in which the antenna is positioned, and the component may include a second printed circuit board and a second antenna positioned in the second printed circuit board.

In an embodiment, the portable communication device may further include a shield member positioned adjacent to the antenna, and the shield member may include a conductive pattern, which is opened in a first direction facing the second antenna from the antenna and at least a portion of which is disposed in a second direction that is different from the first direction.

In an embodiment, a portable communication device may include a display defining a front surface of the portable communication device, a plate defining a rear surface of the portable communication device and including a dielectric material, an antenna module positioned below the plate to be spaced apart from the plate, wherein electric waves generated by the antenna module pass through the plate and are radiated to the outside of the portable communication device, a dielectric member positioned under the plate and having a permittivity that is different from the permittivity of the plate, the dielectric member being spaced apart from the antenna module in a direction that is parallel to the plate, and a conductive member positioned under the plate and extending from a portion, which is adjacent to the antenna module, toward the dielectric member.

In an embodiment, the antenna module may have a first width in a second direction that is substantially perpendicular to a first direction facing the dielectric member from the antenna module and is substantially parallel to the plate, and the conductive member may have a second width in the second direction, which is larger than the first width.

In an embodiment, the conductive member may be grounded through, except for the antenna module, another component in the portable communication device.

While the disclosure has been shown and described with reference to various embodiments thereof, it will be understood by those skilled in the art that various changes in form and details may be made therein without departing from the spirit and scope of the disclosure as defined by the appended claims and their equivalent.

What is claimed is:

1. A portable communication device comprising:
   a display defining a front surface of the portable communication device;
   a plate defining a rear surface of the portable communication device and comprising a nonconductive material, wherein the plate is configured to have a first surface facing an outside of the portable communication device and a second surface facing an inside of the portable communication device;
   a first antenna module attached to a first area of the second surface or disposed adjacent to the first area;
   a second antenna module attached to a second area of the second surface or disposed adjacent to the second area; and
   a conductive member disposed in or attached to a third area between the first area and the second area,
   wherein the conductive member at least partially interrupts some electric waves, among electric waves radiated from the first antenna module, that travel towards the second antenna module through the plate.

2. The portable communication device of claim 1,
   wherein the first antenna module has a first width in a second direction that is substantially perpendicular to a first direction facing the second antenna module from the first antenna module and is substantially parallel to the rear surface, and
   wherein the conductive member has a second width in the second direction, the second width being greater than the first width.

3. The portable communication device of claim 1, wherein the conductive member is grounded through, except for the first antenna module and the second antenna module, another component in the portable communication device.

4. The portable communication device of claim 3, wherein the other component comprises a bracket at least partially supporting the plate or the display, and the conductive member is electrically connected to a ground of the bracket.

5. The portable communication device of claim 1, wherein the conductive member is spaced apart from the first antenna module by a first distance and is spaced apart from the second antenna module by a second distance which is greater than the first distance.

6. The portable communication device of claim 1, wherein the conductive member is deposited in the third area.

7. The portable communication device of claim 1, further comprising:
   a film disposed between the third area and the conductive member; and
   a bonding layer disposed between the third area and the film.

8. The portable communication device of claim 1, wherein the plate comprises glass.

9. The portable communication device of claim 1,
   wherein the first antenna module comprises a first printed circuit board and a first antenna disposed in the first printed circuit board, and
   wherein the second antenna module comprises a second printed circuit board and a second antenna disposed in the second printed circuit board.

10. The portable communication device of claim 9, wherein the second antenna comprises a coil configured to support near field communication (NFC).

11. The portable communication device of claim 9, wherein the second antenna module comprises a nonconductive member disposed between the plate and the second printed circuit board.

12. A portable communication device comprising:
    a display defining a front surface of the portable communication device;
    a plate defining a rear surface of the portable communication device and comprising a nonconductive material, wherein the plate is configured to have a first surface facing an outside of the portable communication device and a second surface facing an inside of the portable communication device;
    an antenna disposed in or attached to a first area of the second surface or disposed adjacent to the first area;
    an electronic component disposed in or attached to a second area of the second surface; and
    a conductive member mounted on a third area of the second surface of the plate,
    wherein the third area is between the first area and the second area, and
    wherein the conductive member at least partially interrupts some electric waves, among electric waves radiated from the antenna, that travel toward the electronic component through the plate.

13. The portable communication device of claim 12,
    wherein the antenna has a first width in a second direction that is substantially perpendicular to a first direction facing the electronic component from the antenna and is substantially parallel to the rear surface, and
    wherein the conductive member has a second width in the second direction, the second width being greater than the first width.

14. The portable communication device of claim 12, wherein the conductive member is spaced apart from the antenna by a first distance, and is spaced apart from the electronic component by a second distance which is greater than the first distance.

15. The portable communication device of claim 12, further comprising:
   a film disposed between the third area and the conductive member; and
   a bonding layer disposed between the third area and the film.

16. The portable communication device of claim 12, further comprising:
   a first printed circuit board, in which the antenna is disposed,
   wherein the electronic component comprises a second printed circuit board and a second antenna disposed in the second printed circuit board.

17. The portable communication device of claim 16, further comprising:
   a shield member disposed adjacent to the antenna,
   wherein the shield member comprises a conductive pattern, which opens in a first direction facing the second antenna from the antenna, at least a portion of the conductive pattern being disposed in a second direction which is different from the first direction.

* * * * *